(12) United States Patent
Green et al.

(10) Patent No.: US 10,643,087 B2
(45) Date of Patent: May 5, 2020

(54) SYSTEMS AND METHODS OF BIOMETRIC ANALYSIS TO DETERMINE A LIVE SUBJECT

(71) Applicant: Princeton Identity, Inc., Hamilton, NJ (US)

(72) Inventors: John Timothy Green, Lisbon, CT (US); David Alan Ackerman, Hopewell, NJ (US)

(73) Assignee: Princeton Identity, Inc., Hamilton, NJ (US)

( * ) Notice: Subject to any disclaimer, the term of this patent is extended or adjusted under 35 U.S.C. 154(b) by 41 days.

(21) Appl. No.: 15/661,267

(22) Filed: Jul. 27, 2017

(65) Prior Publication Data

US 2017/0337440 A1    Nov. 23, 2017

Related U.S. Application Data

(63) Continuation of application No. PCT/US2017/013110, filed on Jan. 12, 2017.
(Continued)

(51) Int. Cl.
*G06K 9/00* (2006.01)
*G06K 9/20* (2006.01)
(Continued)

(52) U.S. Cl.
CPC ....... *G06K 9/00906* (2013.01); *G06K 9/0061* (2013.01); *G06K 9/00201* (2013.01); *G06K 9/00255* (2013.01); *G06K 9/00288* (2013.01); *G06K 9/00604* (2013.01); *G06K 9/00617* (2013.01); *G06K 9/00892* (2013.01);
(Continued)

(58) Field of Classification Search
None
See application file for complete search history.

(56) References Cited

U.S. PATENT DOCUMENTS 3,852,592 A    12/1974   Scoville et al.
3,993,888 A    11/1976   Fellman
(Continued)

FOREIGN PATENT DOCUMENTS

CN    102708357 A    10/2012
CN    103048848 A    4/2013
(Continued)

OTHER PUBLICATIONS

Aziz, Abd, and Azim Zaliha Binti. Vision-based spoofing face detection using polarised light. Diss. University of Reading, 2017. APA (Year: 2017).*
(Continued)

*Primary Examiner* — Michelle M Entezari
(74) *Attorney, Agent, or Firm* — McCarter & English LLP

(57) ABSTRACT

Exemplary embodiments are directed to biometric analysis systems generally including one or more illumination sources, a camera, and an analysis module. The illumination sources are configured to illuminate at least a portion of a face of a subject. The camera is configured to capture one or more images of the subject during illumination of the face of the subject. The analysis module is configured to analyze the one or more images captured by the camera to determine an indication of liveliness of the subject and prevent spoofing.

17 Claims, 18 Drawing Sheets

Related U.S. Application Data

(60) Provisional application No. 62/295,554, filed on Feb. 16, 2016, provisional application No. 62/277,630, filed on Jan. 12, 2016.

(51) Int. Cl.
  *G06K 9/46*     (2006.01)
  *G06T 7/00*     (2017.01)
  *G06T 7/90*     (2017.01)
  *G06T 7/40*     (2017.01)
  *G06T 7/62*     (2017.01)
  *H04N 5/225*    (2006.01)

(52) U.S. Cl.
  CPC ......... *G06K 9/2027* (2013.01); *G06K 9/2036* (2013.01); *G06K 9/4661* (2013.01); *G06T 7/40* (2013.01); *G06T 7/62* (2017.01); *G06T 7/90* (2017.01); *G06T 7/97* (2017.01); *H04N 5/2256* (2013.01); *G06K 9/4652* (2013.01); *G06T 2207/10016* (2013.01); *G06T 2207/10024* (2013.01); *G06T 2207/10048* (2013.01); *G06T 2207/10152* (2013.01); *G06T 2207/30041* (2013.01)

(56) References Cited

U.S. PATENT DOCUMENTS

| | | |
|---|---|---|
| 4,109,237 A | 8/1978 | Hill |
| 4,641,349 A | 2/1987 | Flom et al. |
| 5,291,560 A | 3/1994 | Daugman |
| 5,337,104 A | 8/1994 | Smith et al. |
| 5,481,622 A | 1/1996 | Gerhardt et al. |
| 5,572,596 A | 11/1996 | Wildes et al. |
| 5,835,616 A | 11/1998 | Lobo et al. |
| 5,861,940 A | 1/1999 | Robinson et al. |
| 5,933,515 A | 8/1999 | Pu et al. |
| 5,953,440 A | 9/1999 | Zhang et al. |
| 5,966,197 A | 10/1999 | Yee |
| 5,987,459 A | 11/1999 | Swanson et al. |
| 6,055,322 A | 4/2000 | Salganicoff et al. |
| 6,081,607 A | 6/2000 | Mori et al. |
| 6,119,096 A | 9/2000 | Mann et al. |
| 6,144,754 A | 11/2000 | Okano et al. |
| 6,204,858 B1 | 3/2001 | Gupta |
| 6,229,907 B1 | 5/2001 | Okano et al. |
| 6,247,813 B1 | 6/2001 | Kim et al. |
| 6,252,976 B1 | 6/2001 | Schildkraut et al. |
| 6,301,370 B1 | 10/2001 | Steffens et al. |
| 6,307,954 B1 | 10/2001 | Suzaki |
| 6,320,610 B1 | 11/2001 | Van Sant et al. |
| 6,421,462 B1 | 7/2002 | Christian et al. |
| 6,424,727 B1 | 7/2002 | Musgrave et al. |
| 6,433,326 B1 | 8/2002 | Levine et al. |
| 6,525,303 B1 | 2/2003 | Gladnick |
| 6,526,160 B1 | 2/2003 | Ito |
| 6,542,624 B1 | 4/2003 | Oda |
| 6,549,644 B1 | 4/2003 | Yamamoto |
| 6,614,919 B1 | 9/2003 | Suzaki et al. |
| 6,681,056 B1 | 1/2004 | Tseng et al. |
| 6,714,665 B1 | 3/2004 | Hanna et al. |
| 6,765,581 B2 | 7/2004 | Cheng |
| 6,836,554 B1 | 12/2004 | Bolle et al. |
| 6,850,252 B1 | 2/2005 | Hoffberg |
| 6,895,103 B2 | 5/2005 | Chen et al. |
| 6,912,298 B1 | 6/2005 | Wilensky |
| 6,977,989 B2 | 12/2005 | Bothe et al. |
| 7,015,955 B2 | 3/2006 | Funston et al. |
| 7,095,901 B2 | 8/2006 | Lee et al. |
| 7,099,495 B2 | 8/2006 | Kodno et al. |
| 7,118,042 B2 | 10/2006 | Moore et al. |
| 7,130,453 B2 | 10/2006 | Kondo et al. |
| 7,146,027 B2 | 12/2006 | Kim et al. |
| 7,295,686 B2 | 11/2007 | Wu |
| 7,310,443 B1 | 12/2007 | Kris et al. |
| 7,380,938 B2 | 6/2008 | Chmielewski, Jr. et al. |
| 7,428,320 B2 | 9/2008 | Northcott et al. |
| 7,466,308 B2 | 12/2008 | Dehlin |
| 7,466,847 B2 | 12/2008 | Komura |
| 7,542,628 B2 | 6/2009 | Lolacono et al. |
| 7,574,021 B2 | 8/2009 | Matey |
| 7,583,823 B2 | 9/2009 | Jones et al. |
| 7,599,524 B2 | 10/2009 | Camus et al. |
| 7,627,147 B2 | 12/2009 | Lolacono et al. |
| 7,634,114 B2 | 12/2009 | Zappia |
| 7,657,127 B2 | 2/2010 | Lolacono et al. |
| 7,751,598 B2 | 7/2010 | Matey et al. |
| 7,925,059 B2 | 4/2011 | Hoyos et al. |
| 7,986,816 B1 | 7/2011 | Hoanca et al. |
| 8,050,463 B2 | 11/2011 | Hamza |
| 8,170,293 B2 | 5/2012 | Tosa et al. |
| 8,189,879 B2 | 5/2012 | Cambier |
| 8,195,576 B1 | 6/2012 | Grigg et al. |
| 8,200,980 B1 | 6/2012 | Robinson et al. |
| 8,317,325 B2 | 11/2012 | Raguin et al. |
| 8,337,104 B2 | 12/2012 | Takiguchi et al. |
| 8,374,404 B2 | 2/2013 | Williams et al. |
| 8,553,948 B2 | 10/2013 | Hanna |
| 8,603,165 B2 | 12/2013 | Park |
| 8,639,058 B2 | 1/2014 | Bergen et al. |
| 8,682,073 B2 | 3/2014 | Bergen |
| 8,755,607 B2 | 6/2014 | Bergen et al. |
| 8,854,446 B2 | 10/2014 | Bergen et al. |
| 8,934,005 B2 | 1/2015 | De Bruijn |
| 9,100,825 B2 | 8/2015 | Schultz et al. |
| 9,131,141 B2 | 9/2015 | Tinker et al. |
| 9,195,890 B2 | 11/2015 | Bergen |
| 9,361,507 B1* | 6/2016 | Hoyos ............... G06K 9/00073 |
| 9,414,037 B1* | 8/2016 | Solh ..................... H04N 9/74 |
| 9,514,365 B2 | 12/2016 | Tinker et al. |
| 9,665,772 B2 | 5/2017 | Bergen |
| 9,836,647 B2 | 12/2017 | Perna et al. |
| 9,836,648 B2 | 12/2017 | Perna et al. |
| 10,025,982 B2 | 7/2018 | Perna et al. |
| 2002/0080141 A1 | 6/2002 | Imai et al. |
| 2002/0118864 A1 | 8/2002 | Kondo et al. |
| 2002/0150280 A1 | 10/2002 | Li |
| 2002/0154794 A1 | 10/2002 | Cho |
| 2002/0159621 A1 | 10/2002 | Callies et al. |
| 2002/0164054 A1 | 11/2002 | McCartney et al. |
| 2002/0180586 A1 | 12/2002 | Kitson et al. |
| 2003/0046553 A1 | 3/2003 | Angelo |
| 2003/0103652 A1 | 6/2003 | Lee et al. |
| 2003/0123711 A1 | 7/2003 | Kim et al. |
| 2003/0169334 A1 | 9/2003 | Braithwaite et al. |
| 2003/0174211 A1 | 9/2003 | Imaoka et al. |
| 2004/0037452 A1 | 2/2004 | Shin |
| 2004/0088584 A1 | 5/2004 | Shachar et al. |
| 2004/0146187 A1 | 7/2004 | Jeng |
| 2004/0170304 A1 | 9/2004 | Haven |
| 2004/0213437 A1 | 10/2004 | Howard et al. |
| 2004/0236549 A1 | 11/2004 | Dalton |
| 2005/0047655 A1 | 3/2005 | Luo et al. |
| 2005/0063582 A1 | 3/2005 | Park et al. |
| 2005/0084179 A1 | 4/2005 | Hanna et al. |
| 2005/0088200 A1 | 4/2005 | Takekuma et al. |
| 2005/0165327 A1 | 7/2005 | Thibault et al. |
| 2005/0210267 A1 | 9/2005 | Sugano et al. |
| 2005/0265585 A1* | 12/2005 | Rowe ............... G06K 9/00046 382/124 |
| 2005/0270386 A1 | 12/2005 | Saitoh et al. |
| 2006/0008125 A1 | 1/2006 | Lauper et al. |
| 2006/0028617 A1 | 2/2006 | Matsumura et al. |
| 2006/0098097 A1 | 5/2006 | Wach et al. |
| 2006/0105806 A1 | 5/2006 | Vance et al. |
| 2006/0120570 A1 | 6/2006 | Azuma et al. |
| 2006/0140454 A1 | 6/2006 | Northcott et al. |
| 2006/0147094 A1* | 7/2006 | Yoo .................... G06K 9/00604 382/117 |
| 2006/0150928 A1 | 7/2006 | Lehmann et al. |
| 2006/0184243 A1 | 8/2006 | Yilmaz |
| 2006/0202036 A1 | 9/2006 | Wang et al. |
| 2006/0210123 A1 | 9/2006 | Kondo et al. |
| 2006/0222212 A1 | 10/2006 | Du et al. |

(56) References Cited

U.S. PATENT DOCUMENTS

| | | |
|---|---|---|
| 2006/0245623 A1 | 11/2006 | Loiacono et al. |
| 2006/0274918 A1 | 12/2006 | Amantea et al. |
| 2007/0014439 A1 | 1/2007 | Ando |
| 2007/0025598 A1 | 2/2007 | Kobayashi et al. |
| 2007/0036397 A1 | 2/2007 | Hamza |
| 2007/0047770 A1 | 3/2007 | Swope et al. |
| 2007/0092115 A1 | 4/2007 | Usher et al. |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0198850 A1 | 8/2007 | Martin et al. |
| 2007/0201728 A1 | 8/2007 | Monro |
| 2007/0206935 A1 | 9/2007 | Ono |
| 2007/0236567 A1 | 10/2007 | Pillman et al. |
| 2007/0285537 A1 | 12/2007 | Dwinell et al. |
| 2008/0021331 A1 | 1/2008 | Grinvald et al. |
| 2008/0044063 A1 | 2/2008 | Friedman et al. |
| 2008/0049185 A1 | 2/2008 | Huffman et al. |
| 2008/0069411 A1 | 3/2008 | Friedman et al. |
| 2008/0121721 A1 | 5/2008 | Chen et al. |
| 2008/0180544 A1 | 7/2008 | Drader et al. |
| 2008/0187174 A1 | 8/2008 | Metaxas et al. |
| 2008/0219515 A1 | 9/2008 | Namgoong |
| 2008/0253622 A1 | 10/2008 | Tosa et al. |
| 2008/0271116 A1 | 10/2008 | Robinson et al. |
| 2009/0041309 A1 | 2/2009 | Kim |
| 2009/0092292 A1 | 4/2009 | Carver et al. |
| 2009/0208064 A1 | 8/2009 | Cambier |
| 2009/0216606 A1 | 8/2009 | Coffman et al. |
| 2009/0220126 A1 | 9/2009 | Claret-Tournier et al. |
| 2009/0232418 A1 | 9/2009 | Lolacono et al. |
| 2009/0278922 A1 | 11/2009 | Tinker et al. |
| 2010/0026853 A1 | 2/2010 | Mokhnatyuk |
| 2010/0034529 A1 | 2/2010 | Jelinek |
| 2010/0046808 A1 | 2/2010 | Connell et al. |
| 2010/0063880 A1 | 3/2010 | Atsmon et al. |
| 2010/0082398 A1 | 4/2010 | Davis et al. |
| 2010/0142938 A1 | 6/2010 | Zhang |
| 2010/0176802 A1 | 7/2010 | Huguet |
| 2010/0238316 A1 | 9/2010 | Kim et al. |
| 2010/0278394 A1 | 11/2010 | Raguin et al. |
| 2010/0287053 A1 | 11/2010 | Ganong et al. |
| 2010/0290668 A1 | 11/2010 | Friedman et al. |
| 2010/0301113 A1 | 12/2010 | Bohn et al. |
| 2010/0310133 A1 | 12/2010 | Mason et al. |
| 2010/0328420 A1 | 12/2010 | Roman |
| 2011/0007205 A1 | 1/2011 | Lee |
| 2011/0043683 A1 | 2/2011 | Beach et al. |
| 2011/0075893 A1 | 3/2011 | Connel, II et al. |
| 2011/0081946 A1 | 4/2011 | Singh |
| 2011/0134268 A1 | 6/2011 | MacDonald |
| 2011/0142297 A1 | 6/2011 | Yu et al. |
| 2011/0187878 A1 | 8/2011 | Mor et al. |
| 2011/0304721 A1 | 12/2011 | Determan et al. |
| 2011/0317991 A1 | 12/2011 | Tsai |
| 2012/0086645 A1 | 4/2012 | Zheng et al. |
| 2012/0154536 A1 | 6/2012 | Stoker et al. |
| 2012/0155716 A1 | 6/2012 | Kim |
| 2012/0163783 A1 | 6/2012 | Braithwaite et al. |
| 2012/0243729 A1 | 9/2012 | Pasquero |
| 2012/0293642 A1 | 11/2012 | Berini et al. |
| 2013/0014153 A1 | 1/2013 | Bhatia et al. |
| 2013/0027664 A1 | 1/2013 | Kishida |
| 2013/0044199 A1 | 2/2013 | Nanu et al. |
| 2013/0051631 A1 | 2/2013 | Hanna |
| 2013/0081119 A1 | 3/2013 | Sampas |
| 2013/0083185 A1 | 4/2013 | Coleman, III |
| 2013/0089240 A1 | 4/2013 | Northcott et al. |
| 2013/0091520 A1 | 4/2013 | Chen |
| 2013/0106685 A1* | 5/2013 | Davis ............... G06F 16/00 345/156 |
| 2013/0147603 A1 | 6/2013 | Malhas et al. |
| 2013/0150120 A1 | 6/2013 | Wu et al. |
| 2013/0162798 A1 | 6/2013 | Hanna et al. |
| 2013/0188943 A1 | 7/2013 | Wu |
| 2013/0194407 A1 | 8/2013 | Kim |
| 2013/0215228 A1 | 8/2013 | Stoker et al. |
| 2013/0250085 A1 | 9/2013 | MacKinnon |
| 2013/0293456 A1* | 11/2013 | Son ............... G06F 3/013 345/156 |
| 2013/0329115 A1 | 12/2013 | Palmeri |
| 2014/0046772 A1 | 2/2014 | Raman |
| 2014/0055337 A1 | 2/2014 | Karlsson |
| 2014/0059607 A1 | 2/2014 | Upadhyay et al. |
| 2014/0071547 A1 | 3/2014 | O'Neill et al. |
| 2014/0078389 A1 | 3/2014 | Merz |
| 2014/0161325 A1 | 6/2014 | Bergen |
| 2014/0169642 A1 | 6/2014 | Law et al. |
| 2014/0171150 A1 | 6/2014 | Hurst et al. |
| 2014/0232930 A1 | 8/2014 | Anderson |
| 2014/0285420 A1 | 9/2014 | Kamimura et al. |
| 2014/0327815 A1 | 11/2014 | Auger |
| 2014/0369575 A1 | 12/2014 | Riopka et al. |
| 2015/0037935 A1 | 2/2015 | Kim et al. |
| 2015/0042776 A1 | 2/2015 | Davis |
| 2015/0098629 A1 | 4/2015 | Perna et al. |
| 2015/0098630 A1 | 4/2015 | Perna et al. |
| 2015/0126245 A1 | 5/2015 | Barkan et al. |
| 2015/0193666 A1 | 7/2015 | Derakhshani et al. |
| 2015/0227790 A1 | 8/2015 | Smits |
| 2015/0262342 A1* | 9/2015 | Matsunaga ........ G06K 9/00268 382/195 |
| 2015/0286864 A1 | 10/2015 | Gottemukkula et al. |
| 2015/0338915 A1 | 11/2015 | Publicover et al. |
| 2015/0347841 A1* | 12/2015 | Mears ................ G06K 9/00604 348/46 |
| 2015/0356351 A1* | 12/2015 | Saylor ................ G01S 17/89 348/164 |
| 2015/0379325 A1 | 12/2015 | Tinker et al. |
| 2016/0012275 A1 | 1/2016 | Bergen |
| 2016/0012292 A1 | 1/2016 | Perna et al. |
| 2016/0014121 A1 | 1/2016 | Perna et al. |
| 2016/0019421 A1* | 1/2016 | Feng ................ G06K 9/00604 382/117 |
| 2016/0063305 A1* | 3/2016 | Matsunaga ............... G06T 7/11 382/167 |
| 2016/0117544 A1 | 4/2016 | Hoyos et al. |
| 2016/0140405 A1 | 5/2016 | Graumann et al. |
| 2016/0148384 A1 | 5/2016 | Bud et al. |
| 2016/0180169 A1 | 6/2016 | Bae et al. |
| 2016/0274660 A1 | 9/2016 | Publicover et al. |
| 2016/0345818 A1 | 12/2016 | Suzuki et al. |
| 2016/0364609 A1 | 12/2016 | Ivanisov et al. |
| 2017/0076078 A1* | 3/2017 | Kim ................ G06F 21/32 |
| 2017/0111568 A1 | 4/2017 | Hsieh et al. |
| 2017/0124314 A1 | 5/2017 | Laumea |
| 2017/0132399 A1 | 5/2017 | Pawluk et al. |
| 2017/0185760 A1* | 6/2017 | Wilder ................ G06F 21/36 |
| 2017/0231491 A1 | 8/2017 | Tanassi et al. |
| 2017/0286790 A1 | 10/2017 | Mapen et al. |
| 2017/0286792 A1 | 10/2017 | Ackerman et al. |
| 2017/0323167 A1 | 11/2017 | Mapen et al. |
| 2017/0337439 A1 | 11/2017 | Ackerman et al. |
| 2017/0337441 A1 | 11/2017 | Mapen et al. |
| 2017/0347000 A1 | 11/2017 | Perna et al. |
| 2018/0025244 A1 | 1/2018 | Bohl et al. |
| 2018/0121724 A1* | 5/2018 | Ovsiannikov ...... G06K 9/00617 |
| 2018/0165537 A1 | 6/2018 | Ackerman |
| 2019/0197331 A1* | 6/2019 | Kwak .................... G06N 3/02 |

FOREIGN PATENT DOCUMENTS

| | | |
|---|---|---|
| CN | 103099624 A | 5/2013 |
| EP | 0821912 A2 | 2/1998 |
| EP | 1324259 A1 | 7/2003 |
| JP | 2007011667 A | 1/2007 |
| JP | 2008-538425 A | 10/2008 |
| JP | 4372321 B2 | 11/2009 |
| KR | 2003-0066512 A | 8/2003 |
| KR | 10-2011-0134848 A | 12/2011 |
| WO | WO-1996/19132 A1 | 6/1996 |
| WO | WO-1997/14873 A1 | 4/1997 |
| WO | WO-1997/21188 A1 | 6/1997 |

(56) References Cited

FOREIGN PATENT DOCUMENTS

| WO | WO-1998/08439 A1 | 3/1998 |
|---|---|---|
| WO | WO-1999/31183 A1 | 6/1999 |
| WO | WO-2000/39760 A1 | 7/2000 |
| WO | WO-2013/056001 A1 | 4/2013 |
| WO | WO-2014/093227 A1 | 6/2014 |
| WO | WO-2014/100250 A2 | 6/2014 |
| WO | WO-2015/102704 A2 | 7/2015 |
| WO | WO-2017/172695 A1 | 10/2017 |
| WO | WO-2017/173228 A1 | 10/2017 |

OTHER PUBLICATIONS

Annapoorani et al., Accurate and Fast Iris Segmentation. International Journal of Engineering Science and Technology. 2010;2(6):1492-1499.
Arfken, G., "Mathematical Methods for Physicists," Academic Press, NY 6.sup.th Ed. (2005).
Atos Origin, "UK Passport Service, Biometrics Enrollment Trial." Atos Origin Report (May 2005).
Bertalmio et al., Navier-Stokes, Fluid Dynamics, and Image and Video Inpainting. Proceedings of the 2001 IEEE Computer Society Conferenc on Computer Vision and Pattern Recognition. CVPR 2001, 8 pages, (2001).
Betke, et al., "Preliminary Investigation of Real-time Monitoring of a Driver in City Traffic," IEEE Intelligent Vehicles Syposium, Oct. 3-5, 2000, Dearborn, MI, 563-568.
Boehnen et al., A Multi-Sample Standoff Multimodal Biometric System, Theory, Aoolications and Systems (BTAS), Sep. 23, 2012, pp. 127-134.
Bowyer et al., Image Understanding for Iris Biometrics: A Survey. Computer Vision and Image Understanding. 2008;110:281-307.
Braithwaite, Michael et al., "Application-Specific Biometric Templates," AutoID 2002 Workshop, Tarrytown, NY, pp. 1-10 (2002).
Burt, et al., "The Laplacian Pyramid as a Compact Image Code," IEEE Transactions on Communications, 31(4): 532-540, 1983.
Canadian Offic Action for Application 2,833, 740 dated Jan. 15, 2018.
Office Action dated Nov. 19, 2018, issued in connection with U.S. Appl. No. 15/661,297 (22 pages).
Office Action dated Oct. 30, 2018, issued in connection with U.S. Appl. No. 15/514,098 (35 pages).
Office Action dated Sep. 26, 2018, issued in connection with U.S. Appl. No. 15/471,131 (15 pages).
Daugman John, "How Iris Recognition Works," IEEE Transactions on Circuits and Systems for Video Teohnology, vol. 14, No. 1 (Jan. 2004).
Daugman, J., "High confidence visual recognition of persons by a test of statistical independence", IEEE Transactions on Pattern Analysis and Machine Intelligence, 15 (11), pp. 1148-1161 (1993).
Daugman, J., "Recognizing Persons by Their Iris Patterns," in Biometrics: Personal Indentification in a Networked Society, A.K. Jain, et al., eds. Kluwer Academic Pub. 1999.
Daugman, John et al., "Iris recognition border-crossing system in the UAE," International Airport Review, Issue 2 (2004).
Daugman, John."How Iris Recognition Works".Jun. 13, 2003. IEEE Transactions on Circuits and Systems for Video technology, vol. 14, No. 1.
Daugman, The Importance of Being Random: Statistical Principles of Iris Recognition. Pattern Recognition. Pre-publication version. 13 pages, Dec. 21, 2001.
DellaVecchia, et al., "Methodology and apparatus for using the human iris as a robust biometric," Ophthalmic Technologies VIII, SPIE Biomedical Optics Society, Photonics West Conference, San Jose, CA Jan. 24, 1998.
Du et al., Analysis of Partial Iris Recognition Using a 1-D Approach. Proceedings, IEEE International Conference on Acoustics, Speech, and Signal Processing. Mar. 18, 2005—23;2;961-964.
European Office Action for Application 12719332.4 dated Jan. 29, 2018.
European Search Report for Apllication 14876521.7 dated Oct. 19, 2017.
Extended European Search Report in connection with European Patent Application No. 15864635.6 dated Jun. 6, 2018 (8 pages).
Fan, et al., "An Efficient Automatic Iris Image Acquisition and Preprocessing System," Proceedings of the 2006 IEEE International Conference on Mechatronics and Automation, pp. 1779-1784 (6 pages).
Final Office Action dated Aug. 18, 2016 from U.S. Appl. No. 14/858,715, filed Sep. 18, 2015 (6 pages).
Final Office Action dated Aug. 4, 2016 from U.S. Appl. No. 14/509,366, filed Oct. 8, 2014 (24 pages).
Final Office Action dated Mar. 21, 2017 from U.S. Appl. No. 14/863,936, filed Sep. 24, 2015 (17 pages).
Final Office Action dated Mar. 22, 2017 from U.S. Appl. No. 14/863,950, filed Sep. 24, 2015 (16 pages).
Final Office Action dated Mar. 22, 2017 from U.S. Appl. No. 14/863,960, filed Sep. 24, 2015 (21 pages).
Final Office Action for U.S. Appl. No. 10/818,307, dated Jan. 21, 2009, 28 pages.
Final Office Action for U.S. Appl. No. 10/818,307, dated Jan. 30, 2008, 19 pages.
Final Office Action for U.S. Appl. No. 11/377,042, dated Nov. 14, 2008, 20 pages.
Final Office Action for U.S. Appl. No. 11/510,197, dated May 5, 2009, 16 pages.
Final Office Action for U.S. Appl. No. 12/464,369, dated Aug. 5, 2014, 22 pages.
Final Office Action for U.S. Appl. No. 12/464,369, dated Oct. 3, 2012, 27 pages.
Final Office Action for U.S. Appl. No. 12/576,644, dated Oct. 13, 2010, 11 pages.
Final Office Action for U.S. Appl. No. 14/100,615, dated Sep. 1, 2015, 22 pages.
Final Office Action for U.S. Appl. No. 14/509,356, dated Sep. 28, 2016, 20 pages.
Final Office Action for U.S. Appl. No. 14/509,366, dated Aug. 4, 2016, 29 pages.
Final Office Action for U.S. Appl. No. 14/846,090, dated Jun. 15, 2016, 17 pages.
Final Office Action for U.S. Appl. No. 14/858,715, dated Aug. 18, 2016, 29 pages.
Final Office Action for U.S. Appl. No. 14/858,715, dated Aug. 18, 2016, 6 pages.
Final Office Action for U.S. Appl. No. 14/863,936, dated Mar. 21, 2017, 17 pages.
Final Office Action for U.S. Appl. No. 14/863,950, dated Mar. 22, 2017, 16 pages.
Final Office Action for U.S. Appl. No. 14/863,960, dated Mar. 22, 2017, 21 pages.
First Japanese Office Action for Application 2015-545911 dated Feb. 26, 2018 ( with English translation).
FIT Validation Studies, http://www.pmifit.com/validation.htm, Mar. 2, 2004.
Google Scholar Search—"Rida Hadma" pp. 1 of 2.
Haro, et al., "Detecting and Tracking Eyes by Using Their Physiological Properties, Dynamics and Appearance," CVPR 2000, 163-168.
Hutchinson, et al., "Human-Computer Interaction Using Eye-Gaze Input," IEEE Transaction on Systems, Man and Cybernetics, 19(6): 1527-1534, 1989.
International Biometrics Group, "Independent Testing of Iris Recognition Technology, Final Report," Study Commissioned by the US Department of Homeland Security (May 2005).
International Preliminary Report on Patentability for Application No. PCT/US2015/051863, dated Mar. 28, 2017, 6 pages.
International Search Report and Written Opinion for Application No. PCT/US17/13110, dated May 18, 2017, 12 pages.
International Search Report and Written Opinion for Application No. PCT/US17/24444, dated Jun. 19, 2017, 9 pages.
International Search Report and Written Opinion for Application No. PCT/US2013/073887, dated Mar. 20, 2014, 11 pages.
International Search Report and Written Opinion for Application No. PCT/US2017/025303, dated Jun. 16, 2017, 11 pages.

(56) References Cited

OTHER PUBLICATIONS

International Search Report and Written Opinion for PCT/US2017/24444 dated Jun. 19, 2017 pp. 1-15.
International Search Report and Written Opinion for PCT/US2018/042807, dated Sep. 27, 2018, pp. 1-19.
International Search Report and Written Opinionf for PCT/US2017/025303 dated Jun. 16, 2017.
International Search Report for Application No. PCT/US2015/051863, dated Dec. 10, 2015, 1 page.
International Search Report for Application No. PCT/US2017/065793, dated Feb. 16, 2018, 3 pages.
International Search Report for PCT/US2015061024, dated Mar. 31, 2016.
International Search Report of the International Searching Authority dated Jun. 28, 2018, issued in connection with International Application No. PCT/US2018/025895 (3 pages).
Iwai, Daisuke, Shoichiro Mihara, and Kosuke Sato. "Extended depth-of-field projector by fast focal sweep projection." IEEE transactions on visualization and computer graphics 21.4 (2015): 462-470.
Jacob, R., "The Use of Eye Movements in Human-Computer Interaction Techniques: What you Look At is What you Get," ACM Trans. Info.Sys., 9(3):152-169.
Japanese Office Action for Application No. 2015-545911, dated Feb. 20, 2018, 6 pages.
Li, Zexi, "An Iris Recognition Algorithm Based on Coarse and Fine Location," 2017 IEEE 2nd International Conference on Big Data Analysis, pp. 744-747 (4 pages).
Ma et al., "Efficient Iris Recognition by Characterizing Key Local Variations", IEEE Transactions on Image Processing, vol. 13, No. 6, Jun. 2004, 12 pages.
Ma., et al. "Iris Recognition Using Circular Symmetric Filters," Pattern Recognition, 2002, Proceedings 16th International Conference on vol. 2 IEEE, 2002 (4 pages).
Ma., et al., "Iris Recognition Based on Multichannel Gabor Filtering" ACCV2002: The 5th Asian Conference on Computer Vision, Jan. 23-25, 2002, Melbourne, Australia (5 pages).
Mansfield, Tony et al., "Biometric Product Testing Final Report," CESG Contract X92A/4009309, CESG/BWG Biometric Test Programme; Centre for Mathematics & Scientific Computing, National Physical Laboratory (2001).
Matey et al., Iris on the Move: Acquisition of Images for Iris Recognition in Less Constrained Environments. Proceedings of the IEEE. Nov. 2006;94(11):1936-1947.
Miyazawa et al., Iris Recognition Algorithm Based on Phase-Only Correlation, The Institute of Image Information and Television Engineers, JapanJun. 27, 2006, vol. 30, No. 33, pp. 45-48.
Monro et al., An Effective Human Iris Code with Low Complexity. IEEE International Conference on Image Processing. Sep. 14, 2005;3:277-280.
Narayanswamy, et al., "Extended Depth-of-Field Iris Recognition System for a Workstation Environment," Proc. SPIE. vol. 5779 (2005) (10 pages).
Negin, et al., "An Iris Biometric System for Public and Personal Use," IEEE Computer, pp. 70-75, Feb. 2000.
Nguyen, et al., "Quality-Driven Super-Resolution for Less Constrained Iris Recognition at a Distance and on the Move," IEEE Transactions on Information Forensics and Security 6.4 (2011) pp. 1248-1558 (11 pages).
Non-Final Office Action for U.S. Appl. No. 10/809,471, dated Mar. 19, 2007, 12 pages.
Non-Final Office Action for U.S. Appl. No. 10/818,307, dated Jul. 10, 2008, 28 pages.
Non-Final Office Action for U.S. Appl. No. 10/818,307, dated Mar. 20, 2007, 22 pages.
Non-Final Office Action for U.S. Appl. No. 11/334,968, dated Jan. 6, 2009, 28 pages.
Non-Final Office Action for U.S. Appl. No. 11/377,042, dated Apr. 8, 2009, 22 pages.
Non-Final Office Action for U.S. Appl. No. 11/377,042, dated Jan. 7, 2008, 13 pages.
Non-Final Office Action for U.S. Appl. No. 11/510,197, dated Oct. 10, 2008, 36 pages.
Non-Final Office Action for U.S. Appl. No. 11/510,197, dated Oct. 8, 2009, 21 pages.
Non-Final Office Action for U.S. Appl. No. 11/849,969, dated Dec. 19, 2008, 17 pages.
Non-Final Office Action for U.S. Appl. No. 11/857,432, dated Dec. 30, 2008, 23 pp.
Non-Final Office Action for U.S. Appl. No. 12/429,695, dated Sep. 2, 2009, 11 pages.
Non-Final Office Action for U.S. Appl. No. 12/464,369, dated Jan. 2, 2015, 23 pages.
Non-Final Office Action for U.S. Appl. No. 12/464,369, dated May 9, 2012, 33 pages.
Non-Final Office Action for U.S. Appl. No. 12/576,644, dated Jul. 14, 2010, 14 pages.
Non-Final Office Action for U.S. Appl. No. 13/096,716, dated May 23, 2013, 16 pages.
Non-Final Office Action for U.S. Appl. No. 13/096,724, dated Jan. 16, 2014, 29 pages.
Non-Final Office Action for U.S. Appl. No. 13/096,728, dated May 7, 2013, 33 pages.
Non-Final Office Action for U.S. Appl. No. 13/096,728, dated Nov. 8, 2012, 37 pages.
Non-Final Office Action for U.S. Appl. No. 14/100,615, dated Mar. 4, 2015, 19 pages.
Non-Final Office Action for U.S. Appl. No. 14/509,356, dated Feb. 29, 2016, 19 pages.
Non-Final Office Action for U.S. Appl. No. 14/509,356, dated Mar. 16, 2017, 21 pages.
Non-Final Office Action for U.S. Appl. No. 14/509,366, dated Feb. 21, 2017, 25 pages.
Non-Final Office Action for U.S. Appl. No. 14/509,366, dated Mar. 3, 2016, 40 pages.
Non-Final Office Action for U.S. Appl. No. 14/846,090, dated Jan. 7, 2016, 35 pages.
Non-Final Office Action for U.S. Appl. No. 14/858,715, dated Mar. 14, 2016, 37 pages.
Non-Final Office Action for U.S. Appl. No. 14/863,936, dated Aug. 4, 2016, 16 pages.
Non-Final Office Action for U.S. Appl. No. 14/863,936, dated Sep. 26, 2017, 28 pages.
Non-Final Office Action for U.S. Appl. No. 14/863,950, dated Aug. 3, 2016, 15 pages.
Non-Final Office Action for U.S. Appl. No. 14/863,950, dated Sep. 26, 2017, 22 pages.
Non-Final Office Action for U.S. Appl. No. 14/863,960, dated Aug. 3, 2016, 21 pages.
Non-Final Office Action for U.S. Appl. No. 14/863,960, dated Sep. 28, 2017, 28 pages.
Non-Final Office Action for U.S. Appl. No. 15/475,425, dated Jul. 12, 2018, 31 pages.
Non-Final Office Action for U.S. Appl. No. 15/531,922, dated Jun. 12, 2018, 17 pages.
Non-Final Office Action for for U.S. Appl. No. 12/464,369, dated Feb. 27, 2014, 25 pages.
Notice of Allowance dated Feb. 1, 2017 from U.S. Appl. No. 14/858,715, filed Sep. 18, 2015 (8 pages).
Notice of Allowance for U.S. Appl. No. 10/809,471, dated Mar. 24, 2008, 14 pages.
Notice of Allowance for U.S. Appl. No. 10/809,471, dated Oct. 5, 2007, 11 pages.
Notice of Allowance for U.S. Appl. No. 10/818,307, dated May 18, 2009, 8 pages.
Notice of Allowance for U.S. Appl. No. 11/334,968, dated Apr. 17, 2009, 11 pages.
Notice of Allowance for U.S. Appl. No. 11/377,042, dated Sep. 8, 2009, 16 pages.
Notice of Allowance for U.S. Appl. No. 11/510,197, dated Feb. 1, 2010, 13 pages.

(56) References Cited

OTHER PUBLICATIONS

Notice of Allowance for U.S. Appl. No. 11/849,969, dated Aug. 20, 2009, 21 pages.
Notice of Allowance for U.S. Appl. No. 11/849,969, dated Jul. 10, 2009, 18 pages.
Notice of Allowance for U.S. Appl. No. 11/857,432, dated Jun. 17, 2009, 17 pages.
Notice of Allowance for U.S. Appl. No. 12/429,695, dated Dec. 15, 2009, 7 pages.
Notice of Allowance for U.S. Appl. No. 12/429,695, dated Nov. 17, 2009, 12 pages.
Notice of Allowance for U.S. Appl. No. 12/464,369, dated May 8, 2015, 29 pages.
Notice of Allowance for U.S. Appl. No. 12/576,644, dated Dec. 10, 2010, 14 pages.
Notice of Allowance for U.S. Appl. No. 13/096,716, dated Oct. 30, 2013, 25 pages.
Notice of Allowance for U.S. Appl. No. 13/096,724, dated Aug. 19, 2014, 17 pages.
Notice of Allowance for U.S. Appl. No. 13/096,728, dated Feb. 7, 2014, 33 pages.
Notice of Allowance for U.S. Appl. No. 13/096,735, dated Jun. 24, 2013, 24 pages.
Notice of Allowance for U.S. Appl. No. 13/096,735, dated Oct. 4, 2013, 26 pages.
Notice of Allowance for U.S. Appl. No. 14/100,615, dated Sep. 28, 2015, 22 pages.
Notice of Allowance for U.S. Appl. No. 14/509,356, dated Aug. 1, 2017, 29 pages.
Notice of Allowance for U.S. Appl. No. 14/509,366, dated Jul. 31, 2017, 59 pages.
Notice of Allowance for U.S. Appl. No. 14/846,090, dated Jul. 25, 2016, 22 pages.
Notice of Allowance for U.S. Appl. No. 14/858,715, dated Feb. 1, 2017, 42 pages.
Notice of Allowance for U.S. Appl. No. 14/858,715, dated Feb. 1, 2017, 8 pages.
Notice of Allowance for U.S. Appl. No. 14/858,715, dated Mar. 1, 2017, 13 pages.
Notice of Allowance for U.S. Appl. No. 14/863,936, dated Mar. 20, 2018, 9 pages.
Notice of Allowance for U.S. Appl. No. 14/863,950, dated Mar. 27, 2018, 9 pages.
Notice of Allowance for U.S. Appl. No. 14/863,960, dated Mar. 20, 2018, 9 pages.
Office Action dated Aug. 3, 2016 from U.S. Appl. No. 14/863,950, filed Sep. 24, 2015 (15 pages).
Office Action dated Aug. 3, 2016 from U.S. Appl. No. 14/863,960, filed Sep. 24, 2015 (21 pages).
Office Action dated Aug. 4, 2016 from U.S. Appl. No. 14/863,936, filed Sep. 24, 2015 (16 pages).
Office Action dated Feb. 21, 2017 from U.S. Appl. No. 14/509,366, filed Oct. 8, 2014 (25 pages).
Office Action dated Mar. 14, 2016 from U.S. Appl. No. 14/858,715, filed Sep. 18, 2015 (9 pages).
Office Action dated Mar. 3, 2016 from U.S. Appl. No. 14/509,366, filed Oct. 8, 2014 (19 pages).
Ortiz et al., An Optimal Strategy for Dilation Based Iris Image Enrollment. IEEE International Joint Conference on Biometrics. 6 pages, Sep. 29-Oct. 2, 2014.
Restriction Requirement for U.S. Appl. No. 11/510,197, dated May 16, 2008, 12 pages.
Robert J.K. Jakob, "Eye Movement Based Human Computer Interaction Techniques; Toward Non-Command Interfaces," Advances in Human-Computer Interaction, vol. 4, ed. By H.R. Hartson and D. Hix, 99. 151-190, Ablex Publishing Co., Norwood, N.J. (1993).
Robert J.K. Jakob, "Eye Tracking in Advanced Interface Design," in Virtual Environments and Advanced Interface Dseign, ed. By W. Barfield and T.A. Furness, pp. 258-288, Oxford University Press, New York (1995).
Roth, Mouthpiece Meditations, Part 3. Online Trombone Journal, www.trombone.org. 5 pages, Jul. 23, 2018.
Schovanec, Ocular Dynamics and Skeletal Systems, IEEE Control Systems Magazine. Aug. 2001;21(4):70-79.
Scoblete, The Future of the Electronic Shutter. pdn, Photo District News, retrieved online at: https://www.pdnonline.com/gear/cameras/the-future-of-the-electronic-shutter/, 6 pates, May 9, 2016.
Second Japanese Office Action for Application 2015-545911 dated Feb. 26, 2018 ( with English translation).
Singapore Search Report and Written Report for Application No. 11201704097X, dated Mar. 13, 2018, 5 pages.
SRI International, "Seeing the Future of Iris Recognition", available at www.sri.com/iom, Mar. 2014, 9 pages.
Swiniarski, Experiments on Human Recognition Using Error Backpropagation Artificial Neural Network. Neural Networks Class (CS553) of San Diego State University Computer Science Department, Apr. 2004.
Tan et al., Efficient Iris Recognition by Characterizing Key Local Variations. IEEE Transactions on Image Processing. Jun. 2004;13(6):739-750.
U.S. Appl. No. 14/100,615, "Iris Biometric Matching System", filed Dec. 9, 2013, 57 pages.
U.S. Appl. No. 14/100,615, "Iris Biometric Matching System," filed Dec. 9, 2013, 61 pages.
U.S. Appl. No. 61/888,130, filed Oct. 8, 2013, 20 pages.
Van der Wal, et al., "The Acadia Vision Processor," IEEE International Workshop on Computer Architecture for Machine Perception, pp. 31-40, Padova, Italy, Sep. 11-13, 2000.
Weisstein E. et al.; "Circle" From MathWorld—A Wolfram Web Resource. www.mathworld.wolfram.com/circle.html, pp. 1 to 8., Jul. 3, 2008.
Wildes, R., "Iris Recognition: An Emerging Biometric Technology," Proc. IEEE, 85(9):1348-1363, Sep. 1997.
Written Opinion for Application No. PCT/US2015/051863, dated Dec. 10, 2015, 5 pages.
Written Opinion for Application No. PCT/US2017/065793, dated Feb. 16, 2018, 10 pages.
Written Opinion for PCT/US2015061024, dated Mar. 21, 2016.
Written Opinion of the International Searching Authority dated Jun. 28, 2018, issued in connection with International Application No. PCT/US2018/025895 (10 pages).
www.m-w.com—definition—"ellipse" (Refer to Ellipse Illustration; also attached) pp. 1 of 2.
Yokoya, Ryunosuke, and Shree K. Nayar. "Extended depth of field catadioptric imaging using focal sweep." Proceedings of the IEEE International Conference on Computer Vision. 2015.
Zhu, et al., "Biometric Personal Identification Based on Iris Patterns," Pattern Recognition, Proceedings 15th International Conference on vol. 2 IEEE (2000) (4 pages).
U.S. Appl. No. 15/471,131, filed Mar. 28, 2017, Published.
U.S. Appl. No. 15/475,425, filed Mar. 31, 2017, Published.
U.S. Appl. No. 15/514,098, filed Mar. 24, 2017, Published.
U.S. Appl. No. 15/531,922, filed May 31, 2017, Published.
U.S. Appl. No. 15/661,188, filed Jul. 27, 2017, Published.
U.S. Appl. No. 15/661,267, filed Jul. 27, 2017, Published.
U.S. Appl. No. 15/661,297, filed Jul. 27, 2017, Published.
U.S. Appl. No. 15/661,340, filed Jul. 27, 2017, Published.
U.S. Appl. No. 15/944,327, filed Apr. 3, 2018, Published.
U.S. Appl. No. 16/039,442, filed Jul. 19, 2018, Pending.
U.S. Appl. No. 15/839,020, filed Dec. 12, 2017, Published.
U.S. Appl. No. 15/661,188, filed Jul. 27, 2017, 2018-0025244, Published.
U.S. Appl. No. 15/661,246, filed Jul. 27, 2017, 2017-0337439, Published.
U.S. Appl. No. 15/661,297, filed Jul. 27, 2017, 2017-0337441, Published.
U.S. Appl. No. 15/661,340, filed Jul. 27, 2017, 2017-0323167, Published.
Extended European Search report dated Jul. 23, 2019. issued by the European Patent Office in connection with European Patent Application No. 17738898.0 (8 pages).
Notice of Allowance dated Jun. 10, 2019, issued in connection with U.S. Appl. No. 15/661,297 (12 pages).

(56) References Cited

OTHER PUBLICATIONS

Office Action dated Apr. 2, 2019, issued in connection with U.S. Appl. No. 15/661,188 (20 pages).
Office Action dated Jun. 11, 2019, issued in connection with U.S. Appl. No. 15/661,340 (14 pages).
Office Action dated Mar. 28, 2019, issued in connection with U.S. Appl. No. 15/661,246 (10 pages).
Office Action dated Jan. 3, 2020, issued in connection with U.S. Appl. No. 15/661,246 (11 pages).
Notice of Allowance dated Jan. 10, 2020, issued in connection with U.S. Appl. No. 15/661,340 (11 pages).
Notice of Allowance dated Jan. 21, 2020, issued in connection with U.S. Appl. No. 15/944,327 (15 pages).
Office Action dated Feb. 5, 2020, issued in connection with U.S. Appl. No. 15/661,188, 21 pages.

* cited by examiner

SYSTEMS AND METHODS OF BIOMETRIC ANALYSIS TO DETERMINE A LIVE SUBJECT

CROSS-REFERENCE TO RELATED APPLICATIONS

The present application is a continuation application of, and claims the benefit of priority to, PCT International Application No. PCT/US2017/013110, filed on Jan. 12, 2017 (and published on Jul. 20, 2017 as WO 2017/123702), which claims the benefit of priority to U.S. Provisional Application No. 62/277,630, filed Jan. 12, 2016, and U.S. Provisional Application No. 62/295,554, filed Feb. 16, 2016. The entire contents of each of the three foregoing patent applications are incorporated herein by reference.

TECHNICAL FIELD

The present disclosure relates to systems and methods of biometric analysis and, in particular, to biometric analysis systems including one or more anti-spoofing components to ensure a secure transaction.

BACKGROUND

Security is a concern in a variety of transactions involving private information. Iris recognition is a well-accepted and accurate means of biometric identification used in government and commercial systems around the world that enables secure transactions and an added layer of security beyond keys and/or passwords. Due to the increased security provided by iris recognition systems, an increase in use of such systems has occurred around the world.

As biometric identification increases in use, attacks on systems that use biometrics for security may also increase resulting in a greater demand for anti-spoofing measures. In particular, the security of such systems can be threatened by presentation of spoof attacks (attacks that present the biometric system with facsimiles of the real biometric credentials in an attempt to defraud the biometric system). Banks, hospitals, schools, stores, businesses, military installations, and other government and/or commercial systems could benefit from biometric security that is hardened against spoofing attacks.

Those looking to defraud iris recognition systems generally attempt to use a wide variety of attacks. In the presentation attack, the defrauder can present a fraudulent, non-live iris in place of a live biometric organ to the recognition system. For example, the defrauder can present a picture of an iris in place of a real iris. The fraudulent iris can be so realistic in every aspect that the iris recognition system can mistake it for a real iris that is enrolled in the system, mistakenly verifying its identity and granting the defrauder access to the otherwise protected system. The defeat of iris biometrics using simple image-based spoofing could tarnish the reputation of iris biometrics.

There are many systems for anti-spoofing or liveness detection in biometrics. To defend against presentation attacks, biometric systems identify inconsistencies in the presentation of false biometric credentials. There are many existing techniques for differentiating a live biometric sample (e.g., face, iris, or the like) from a facsimile (e.g., printed paper, computer monitor, tablet display, sculpted face, fake eyeball, or the like). Iris recognition systems that test liveness of a presented iris can use methods including pupillometry, active gaze and blink detection, and complex systems of infrared signaling.

In pupillometry, a stimulus (such as a bright visible light) causes a subject's pupil to contract in real time, indicating liveness. Detection of saccadic motion of the eye also provides an indication of liveness of the subject. A picture of an iris or a fake eyeball with printed iris texture would not respond to bright light with pupilary contraction as would a live iris. In such cases, the stimulus of a bright light would distinguish a live iris from the static picture or model of an iris and would therefore defend against a false presentation in a system that could provide the relevant stimulus and measure the response. The stimulus light is considered obtrusive by some users. In addition, pupillometry systems may need extra time to operate, thereby slowing the time for identification.

Additional existing techniques for differentiating a live biometric sample from a facsimile compare specular reflections from the cornea, detect an absence of tell-tale reflections, or involve stereo imaging. Stereo imaging or time-of-flight depth sensors can also indicate a presentation attack by differentiating a flat or bent paper image from a realistic three-dimensional relief of an actual face. Stereo imaging generally requires stereo reconstruction algorithms to produce the three-dimensional imagery to analyze the presented face. As new anti-spoofing techniques are developed, attackers attempt to create facsimiles that can defeat these new anti-spoofing measures.

Thus, a need exists for improved biometric analysis systems including anti-spoofing to ensure the security of transactions and make presentation attacks more difficult. These and other needs are addressed by the systems and methods of biometric analysis of the present disclosure.

SUMMARY

In accordance with embodiments of the present disclosure, an exemplary biometric analysis system is provided that includes one or more illumination sources, one or more cameras, one or more processing modules, and one or more analysis modules. The illumination source can be configured to illuminate at least a portion of an iris of a subject and at least a portion of a surrounding eye, ocular region and/or face of the subject. In one embodiment, the illumination source can be ambient light. The camera can be configured to capture one or more images of the subject during illumination of the subject with the illumination source. The one or more images can display reflected light from the iris and the portion of the surrounding ocular region and face. The analysis module can be configured to receive as input the one or more images, analyze the reflected light in the one or more images, and indicate if the imagery is consistent with a live subject that generally has three-dimensional anatomical features based on the reflected light in the one or more images. The analysis module can work with the processing module to combine the results of a plurality of liveness tests to report an overall confidence that the subject is a live subject and not a facsimile. In one embodiment, a first analysis module can receive the image from the camera, crop the image to display only the eye, and transmits the cropped image to a second analysis module for processing.

The illumination source can be a near infrared illumination source. Illumination of the portion of the surrounding ocular region and face of the subject can create a pattern of illumination. The analysis module can be configured to indicate a facsimile based on the lack of three-dimensionality of the subject based on a detection of a uniform pattern of illumination distribution of the subject. In particular, the analysis module can be configured to determine whether the lack of three-dimensionality is contraindicative of a live subject and indicative of a facsimile image. The analysis module can be configured to determine a three-dimensionality of the subject based on a detection of a non-uniform pattern of illumination distribution of the subject corresponding with a face of a living subject.

In some embodiments, the illumination source can be configured to illuminate a three-dimensional relief around a temporal edge of an eye socket of the subject. The camera can be configured to capture one or more images of the temporal edge of the eye socket of the subject. The analysis module can be configured to analyze the reflected light of the temporal edge of the eye socket of the subject.

In some embodiments, the illumination source can be configured to emit a static light to illuminate the iris of a subject and the portion of the surrounding ocular region and face of the subject. The static light can be a substantially uniform level of illumination. In some embodiments, the illumination source can be configured to emit a changing or dynamic light to illuminate the iris of a subject and the portion of the surrounding ocular region and face of the subject. Emitting the dynamic light can include emitting a first illumination level with the illumination source and subsequently emitting a second illumination level with the illumination source. In some embodiments, the second illumination level is brighter or greater than the first illumination level. In some embodiments, the second illumination level is dimmer or lower than the first illumination level.

The camera can be configured to capture one or more images of the subject during illumination of the subject at the first illumination level, and capture one or more images of the subject during illumination of the subject at the second illumination level. The analysis module can be configured to receive as input the one or more images at the first illumination level and the one or more images at the second illumination level, analyze the reflected light in the one or more images, and determine the lack of three-dimensionality of the subject based on a change in the characteristics or the pattern of illumination distribution of the subject. The biometric analysis system can include one or more databases configured to electronically store data corresponding to biometric data of registered subjects to allow for biometric matching of registered subjects. In particular, it should be understood that the exemplary biometric analysis systems can include components necessary for biometric matching in addition to the anti-spoofing features discussed herein.

In accordance with embodiments of the present disclosure, an exemplary method of biometric analysis is provided. The method includes illuminating an iris of a subject and at least a portion of a surrounding eye, ocular region and/or face of the subject with one or more illumination sources of a biometric analysis system. The method includes capturing one or more images of the subject with one or more cameras of the biometric analysis system during illumination of the subject with the illumination source. The one or more images can display reflected light from the iris and the portion of the surrounding ocular region and face. The method includes receiving as input at an analysis module of the biometric analysis system the one or more images. The method includes analyzing the reflected light in the one or more images with the analysis module of the biometric analysis system. The method includes determining a lack of three-dimensionality of the subject with the analysis module of the biometric analysis system.

The method can include determining the lack of three-dimensionality of the subject with the analysis module based on a detection of a uniform pattern of illumination distribution of the subject. The method includes determining whether the lack of three-dimensionality is contraindicative of a live subject and indicative of a facsimile image, thereby discrediting the subject as a facsimile image based on the lack of three-dimensionality of the subject. The method includes determining a three-dimensionality of the subject with the analysis module based on a detection of a non-uniform pattern of illumination distribution of the subject corresponding with a face of a living subject.

In some embodiments, the method can include illuminating a three-dimensional relief around a temporal edge of an eye socket of the subject with the illumination source. The method can include capturing one or more images of the temporal edge of the eye socket of the subject with the camera. The method can include analyzing the reflected light of the temporal edge of the eye socket of the subject with the analysis module.

In some embodiments, the method can include emitting a static light with the illumination source to illuminate the iris of a subject and the portion of the surrounding ocular region and face of the subject. The static light can be a substantially uniform level of illumination. In some embodiments, the method can include emitting a dynamic light with the illumination source to illuminate the iris of a subject and the portion of the surrounding ocular region and face of the subject.

In some embodiments, the method can include emitting a first illumination level with the illumination source and subsequently emitting a second illumination level with the illumination source. The method can include incrementally changing the illumination level between the first and second illumination levels. The method can include capturing one or more images of the subject with the camera during illumination of the subject at the first illumination level, and capturing one or more images of the subject during illumination of the subject at the second illumination level. The method can include capturing a sequence of images of the subject as the illumination level is incrementally changed. The method can include receiving as input at the analysis module the one or more images at the first illumination level and the one or more images at the second illumination level. The method can include analyzing the reflected light in the one or more images. The method can include determining the lack of three-dimensionality of the subject based on a change in a characteristic pattern of illumination distribution of the subject.

In accordance with embodiments of the present disclosure, an exemplary non-transitory computer-readable medium storing instructions for biometric analysis is provided. The instructions can be executable by a processing device. Execution of the instructions by the processing device can cause the processing device to illuminate an iris of a subject and at least a portion of a surrounding eye, ocular region and/or face of the subject with one or more illumination sources of a biometric analysis system. Execution of the instructions by the processing device can cause the processing device to capture one or more images of the subject with one or more cameras of the biometric analysis system during illumination of the subject with the illumination source. The one or more images can display reflected light from the iris and the portion of the surrounding ocular region and face. Execution of the instructions by the processing device can cause the processing device to receive as input at an analysis module of the biometric analysis system the one or more images. Execution of the instructions by the processing device can cause the processing device to analyze the reflected light in the one or more images with the analysis module. Execution of the instructions by the processing device can cause the processing device to determine a lack of three-dimensionality of the subject with the analysis module.

In accordance with embodiments of the present disclosure, an exemplary biometric analysis system is provided that includes one or more illumination sources, one or more cameras, one or more processing modules, and one or more analysis modules. The illumination source can be configured to illuminate an iris of a subject to produce a retinal reflection of the subject. The camera can be configured to capture one or more images of the subject during illumination of the subject with the illumination source. The one or more images display the retinal reflection of the subject. The analysis module can be configured to receive as input the one or more images, analyze the retinal reflection in the one or more images, and determine whether the retinal reflection exhibits a natural reflectivity of the retina.

The analysis module can be configured to determine whether the lack of natural reflectivity of the retina is contraindicative of a live subject and indicative of a facsimile image, thereby discrediting the subject as a facsimile image based on a lack of natural reflectivity of the retina. The camera can include a lens and the illumination source can be disposed at a position sufficiently or substantially adjacent to the lens to increase the probability that the illumination source will produce a retinal reflection of the subject. In some embodiments, the illumination source can emit an infrared light to produce the retinal reflection in an infrared spectrum. In some embodiments, the illumination source can be configured to illuminate the iris of the subject with a continuous emitted light. In some embodiments, the illumination source can be configured to illuminate the iris of the subject with a flashing emitted light. The illumination source can be configured to vary an interval of time between flashes of the flashing emitted light. The illumination source can be configured to vary the duration of each flash and/or the intensity of each flash. The illumination source can be configured to vary a number of flashes of the flashing emitted light for each subject.

In accordance with embodiments of the present disclosure, an exemplary method of biometric analysis is provided. The method includes illuminating an iris of a subject with one or more illumination sources of a biometric analysis system to produce a retinal reflection of the subject. The method includes capturing one or more images of the subject with one or more cameras of the biometric analysis system during illumination of the subject with the illumination source. The one or more images can display the retinal reflection of the subject. The method includes receiving as input at an analysis module of the biometric analysis system the one or more images. The method includes analyzing the retinal reflection in the one or more images with the analysis module of the biometric analysis system. The method includes determining with the analysis module of the biometric analysis system whether the retinal reflection exhibits a natural reflectivity of the retina.

The method includes discrediting the subject as a facsimile image based on a lack of natural reflectivity of the retina. The method includes emitting an infrared light with the illumination source to try to produce the retinal reflection in an infrared spectrum. In some embodiments, the method can include illuminating the iris of the subject with a continuous light emitted from the illumination source. In some embodiments, the method can include illuminating the iris of the subject with a flashing light emitted from the illumination source. The method can include varying an interval of time between flashes of the flashing light emitted from the illumination source, as well as the duration and/or intensity of the flashes. The method can include varying a number of flashes of the flashing light emitted from the illumination source for each subject.

In accordance with embodiments of the present disclosure, an exemplary non-transitory computer-readable medium storing instructions for biometric analysis is provided. The instructions can be executable by a processing device. Execution of the instructions by the processing device can cause the processing device to illuminate an iris of a subject with one or more illumination sources of a biometric analysis system to produce a retinal reflection of the subject. Execution of the instructions by the processing device can cause the processing device to capture one or more images of the subject with one or more cameras of the biometric analysis system during illumination of the subject with the illumination source. The one or more images can display the retinal reflection of the subject. Execution of the instructions by the processing device can cause the processing device to receive as input at an analysis module of the biometric analysis system the one or more images. Execution of the instructions by the processing device can cause the processing device to analyze the retinal reflection in the one or more images with the analysis module of the biometric analysis system. Execution of the instructions by the processing device can cause the processing device to determine with the analysis module of the biometric analysis system whether the retinal reflection exhibits a natural reflectivity of the retina.

In accordance with embodiments of the present disclosure, an exemplary biometric analysis system is provided that includes one or more first illumination sources, one or more second illumination sources, one or more cameras, one or more processing devices, and one or more analysis modules. The first illumination source can be configured to illuminate an iris of a subject. The second illumination source can be configured to emit a visible light to illuminate at least a portion of a face of the subject. Either or both of the illumination sources may be generated by the system or may be ambient in the environment where the system is used. The camera can be configured to capture one or more images of the subject during illumination of the subject with the first illumination source and the second illumination source. The analysis module can be configured to receive as input the one or more images, determine an iris texture based on the one or more images of the subject during illumination of the subject with the first illumination source, determine a color spectrum of the portion of the face of the subject based on the one or more images of the subject during illumination of the subject with the second illumination source, and determine whether the portion of the face of the subject in the one or more images of the subject captured during illumination of the subject with the second illumination source includes a monochrome section (where monochromatic sections refer to an image with a color palette having a single color or a narrow band of colors).

The camera can be configured to effectively simultaneously capture the one or more images of the subject during illumination of the subject with the first illumination source and the second illumination source. The first illumination source can be configured to emit a near infrared light. The captured one or more images of the subject during illumination of the subject with the first illumination source can be monochrome images. The captured one or more images of the subject during illumination of the subject with the second illumination source can be color images. If the analysis module detects the monochrome section of the portion of the face of the subject based on the one or more images of the subject during illumination of the subject with the second illumination source, the analysis module can determine that the monochromatic section is unnatural and indicative of a facsimile image rather than a live subject.

In accordance with embodiments of the present disclosure, an exemplary method of biometric analysis is provided. The method includes illuminating an iris of a subject with one or more first illumination sources of a biometric analysis system. The method includes illuminating at least a portion of a face of the subject with a visible light emitted from one or more second illumination sources of the biometric analysis system. The method includes capturing one or more images of the subject with one or more cameras of the biometric analysis system during illumination of the subject with the first illumination source and the second illumination source. The method includes receiving as input at an analysis module of the biometric analysis system the one or more images. The method includes determining an iris texture with the analysis module of the biometric analysis system based on the one or more images of the subject during illumination of the subject with the first illumination source. The method includes determining a color spectrum of the portion of the face of the subject with the analysis module of the biometric analysis system based on the one or more images of the subject during illumination of the subject with the second illumination source. The method includes determining with the analysis module whether the portion of the face of the subject in the one or more images of the subject captured during illumination of the subject with the second illumination source includes a monochrome section.

The method can include effectively simultaneously capturing with the camera the one or more images of the subject during illumination of the subject with the first illumination source and the second illumination source. The method can include determining that the monochrome section is contraindicative of a live subject and indicative of a facsimile image, thereby discrediting the subject as a facsimile image if the analysis module detects a monochrome section of the portion of the face of the subject based on the one or more images of the subject during illumination of the subject with the second illumination source.

In accordance with embodiments of the present disclosure, an exemplary non-transitory computer-readable medium storing instructions for biometric analysis is provided. The instructions can be executable by a processing device. Execution of the instructions by the processing device can cause the processing device to illuminate an iris of a subject with one or more first illumination sources of a biometric analysis system. Execution of the instructions by the processing device can cause the processing device to illuminate at least a portion of a face of the subject with a visible light emitted from one or more second illumination sources of the biometric analysis system. Execution of the instructions by the processing device can cause the processing device to capture one or more images of the subject with one or more cameras of the biometric analysis system during illumination of the subject with the first illumination source and the second illumination source. Execution of the instructions by the processing device can cause the processing device to receive as input at an analysis module of the biometric analysis system the one or more images. Execution of the instructions by the processing device can cause the processing device to determine an iris texture with the analysis module of the biometric analysis system based on the one or more images of the subject during illumination of the subject with the first illumination source. Execution of the instructions by the processing device can cause the processing device to determine a color spectrum of the portion of the face of the subject with the analysis module of the biometric analysis system based on the one or more images of the subject during illumination of the subject with the second illumination source. Execution of the instructions by the processing device can cause the processing device to determine with the analysis module whether the portion of the face of the subject in the one or more images of the subject captured during illumination of the subject with the second illumination source includes a monochrome section In accordance with embodiments of the present disclosure, an exemplary biometric analysis system is provided that includes one or more cameras and an analysis module. The camera can include a lens (e.g., a movable lens), and can be configured to capture a sequence of images of a face of a subject as the lens incrementally moves a focal plane from a first point relative to the face of the subject, through the face of the subject, and to a second point relative to the face of the subject. The camera can be any technology that allows for focusing at a plurality of distances with a sufficiently narrow depth of field (e.g., a phase-style camera without a movable lens that focus using processing after the image is captured). The analysis module can be configured to receive as input the sequence of images, analyze regions of each image of the sequence of images for sharpness of contours, and determine whether the contours of each image correspond to contours of a live subject. In particular, the analysis module can be configured to determine whether the contours in one or more images of the sequence of images define closed contours corresponding to contours of a live subject.

The biometric analysis system can include one or more illumination sources configured to illuminate at least a portion of the face of the subject. The first point relative to the face of the subject can be behind the face of the subject. The second point relative to the face of the subject can be in front of the face of the subject, or vice versa. The sequence of images can form a topographic map of the face of the subject. The topographic map can define substantially smooth curving surfaces corresponding to the contours of the live subject. If the analysis module detects the closed contours typical of a live subject in one or more images of the sequence of images, the analysis module can determine that the closed contours are indicative of the live subject, thereby identifying the subject as the live subject. If the analysis module detects substantially straight lines of constant focus with no closed contours typical of a flat or simply curved printed image, the analysis module can determine that the substantially straight lines are indicative of a facsimile image, thereby identifying the subject as contraindicative of a live subject, thereby discrediting the subject as a facsimile image.

In some embodiments, the biometric analysis system can include an active subject response module. The active subject response module can include a blink detection system configured to detect blinking of the subject. The active subject response module can include a glance detection system configured to detect changes in a glance of the subject. In some embodiments, the active subject response module can include both the blink detection system and the glance detection system.

In accordance with embodiments of the present disclosure, an exemplary method of biometric analysis is provided. The method includes moving a movable lens of one or more cameras of a biometric analysis system to incrementally move a focal plane from a first point relative to a face of a subject, through the face of the subject, and to a second point relative to the face of the subject. The method includes capturing a sequence of images of the face of the subject with the camera during the incremental movement of the lens. The method includes receiving as input at an analysis module of the biometric analysis system the sequence of images. The method includes analyzing regions of each image of the sequence of images with the analysis module of the biometric analysis system for sharpness of contours. The method includes determining with the analysis module of the biometric analysis system whether the contours of each image correspond to contours of a live subject. The method includes determining with the analysis module whether the contours in one or more images of the sequence of images define closed contours corresponding to contours of a live subject The method can include illuminating at least a portion of the face of the subject with one or more illumination sources. The first point relative to the face of the subject can be behind the face of the subject. The second point relative to the face of the subject can be in front of the face of the subject. The method can include forming a topographic map of the face of the subject with the sequence of images. In some embodiments, the method can include detecting blinking of the subject with an active subject response module of the biometric analysis system. In some embodiments, the method can include detecting changes in a glance of the subject with an active subject response module of the biometric analysis system.

In accordance with embodiments of the present disclosure, an exemplary non-transitory computer-readable medium storing instructions for biometric analysis is provided. The instructions can be executable by a processing device. Execution of the instructions by the processing device can cause the processing device to move a lens (e.g., a movable lens) of one or more cameras of a biometric analysis system to incrementally move a focal plane from a first point relative to a face of a subject, through the face of the subject, and to a second point relative to the face of the subject. Execution of the instructions by the processing device can cause the processing device to capture a sequence of images of the face of the subject with the camera during the incremental movement of the lens. Execution of the instructions by the processing device can cause the processing device to receive as input at an analysis module of the biometric analysis system the sequence of images. Execution of the instructions by the processing device can cause the processing device to analyze regions of each image of the sequence of images with the analysis module of the biometric analysis system for sharpness of contours. Execution of the instructions by the processing device can cause the processing device to determine with the analysis module of the biometric analysis system whether the contours of each image correspond to contours of a live subject. In particular, execution of the instructions by the processing device can cause the processing device to determine with the analysis module whether the contours in one or more images of the sequence of images define closed contours corresponding to contours of a live subject.

In accordance with embodiments of the present disclosure, an exemplary biometric analysis system is provided that includes one or more illumination sources, one or more spectral discriminators, one or more cameras, one or more processing devices, and one or more analysis modules. The illumination source can be configured to illuminate an iris of a subject. The spectral discriminator can include a first optical filter having first set of pass characteristics and a second optical filter having second set of pass characteristics. In some embodiments, a plurality of filters having different wavelength bandpass values can be used (e.g., near infrared, red, green, blue, alternative IR spectra, alternative UV spectra, or the like) with each filter having independent channels. The spectral discriminator can be configured to selectively receive light scattered from the iris through the first optical filter and the second optical filter. The camera can be configured to capture one or more images of the subject during passage of the light scattered from the iris through the first optical filter, and can be configured to capture one or more images of the subject during passage of the light scattered from the iris through the second optical filter. The analysis module can be configured to receive as input the captured one or more images of the subject during passage of the light scattered from the iris through the first optical filter and the second optical filter. The analysis module can be configured to determine whether a match exists between iris structural information displayed in the one or more images of the subject during passage of the light scattered from the iris through the first optical filter and the second optical filter, existence of the match of a predetermined quality being indicative of a facsimile image. In an embodiment, the system can initially detect the color of the subject's eye(s) before applying the logic in the analysis module.

The illumination source can emit near infrared light. The first set of pass characteristics of the first optical filter can allow passage of only light visible to a human eye. In some embodiments, the light visible to the human eye can be in a wavelength range from about 380 nm to about 780 nm. The second set of pass characteristics of the second optical filter can allow passage of only near infrared light. In some embodiments, the near infrared light can be in a wavelength range of about a 30 nm band about a wavelength of about 850 nm. In some embodiments, the captured one or more images of the subject during passage of the light scattered from the iris through the first optical filter can be red-green-blue images (e.g., color images). In some embodiments, the captured one or more images of the subject during passage of the light scattered from the iris through the second optical filter can be near infrared images including the structural information about the iris.

In some embodiments, the camera can be configured to capture a sequence of images of the subject in rapid succession during passage of the light scattered from the iris through the first optical filter, and can be configured to capture a sequence of images of the subject in rapid succession during passage of the light scattered from the iris through the second optical filter. If the match exists between the iris structural information displayed in the one or more images of the subject during passage of the light scattered from the iris through the first optical filter and the second optical filter, the analysis module can determine that the match is contraindicative of a live subject, thereby discrediting the subject as the facsimile image. If the match does not exist between the iris structural information displayed in the one or more images of the subject during passage of the light scattered from the iris through the first optical filter and the second optical filter, the analysis module can determine that the lack of a match is indicative of a live subject, thereby identifying the subject as a live subject.

In some embodiments, the camera can be configured to capture one or more images of areas surrounding the iris of the subject. The analysis module can be configured to receive as input the one or more images of the areas surrounding the iris of the subject, and determine whether a portion of at least one of the one or more images is monochromatic. The analysis module can be configured to receive as input the one or more images of the subject during passage of the light scattered from the iris through the second optical filter, and can be configured to analyze a corneal specularity structure displayed in the one or more images.

In some embodiments, the biometric analysis system can include one or more second visible illumination sources configured to illuminate an eye area of the subject to stimulate contraction of a pupil of the subject, in conjunction with the spectral tests of the analysis system. The camera can be configured to capture a sequence of images of the subject during contraction of the pupil of the subject. The analysis module can be configured to receive as input the sequence of images of the subject during contraction of the pupil of the subject. The analysis module can be configured to measure a diameter of the pupil before contraction and during contraction to determine an indication of liveliness of the subject.

In accordance with embodiments of the present disclosure, an exemplary method of biometric analysis is provided. The method includes illuminating an iris of a subject with one or more illumination sources of a biometric analysis system. The method includes selectively receiving light scattered from the iris through a first optical filter and a second optical filter of a spectral discriminator of the biometric analysis system. The first optical filter can have first set of pass characteristics and the second optical filter can have second set of pass characteristics. The method includes capturing one or more images of the subject with one or more cameras of the biometric analysis system during passage of the light scattered from the iris through the first optical filter. The method includes capturing one or more images of the subject with the camera of the biometric analysis system during passage of the light scattered from the iris through the second optical filter. The method includes receiving as input at an analysis module of the biometric analysis system the captured one or more images of the subject during passage of the light scattered from the iris through the first optical filter and the second optical filter. The method includes determining with the analysis module of the biometric analysis system whether a match exists between iris structural information displayed in the one or more images of the subject during passage of the light scattered from the iris through the first optical filter and the second optical filter, existence of the match being indicative of a facsimile image.

The method can include capturing a sequence of images of the subject with the camera in rapid succession during passage of the light scattered from the iris through the first optical filter, and capturing a sequence of images of the subject with the camera in rapid succession during passage of the light scattered from the iris through the second optical filter. The method can include capturing one or more images of areas surrounding the iris of the subject with the camera. The method can include receiving as input at the analysis module the one or more images of the areas surrounding the iris of the subject, and determining with the analysis module whether a portion of at least one of the one or more images is monochromatic.

The method can include receiving as input at the analysis module the one or more images of the subject during passage of the light scattered from the iris through the second optical filter, and analyzing a corneal specularity structure displayed in the one or more images with the analysis module. The method can include illuminating an eye area of the subject with one or more second visible illumination sources to instigate contraction of a pupil of the subject. The method can include capturing a sequence of images of the subject with the camera during contraction of the pupil of the subject. The method can include receiving as input at the analysis module the sequence of images of the subject during contraction of the pupil of the subject, and measuring a diameter of the pupil before contraction and during contraction with the analysis module to determine an indication of liveliness of the subject in conjunction with the spectral analysis of the analysis system.

In accordance with embodiments of the present disclosure, an exemplary non-transitory computer-readable medium storing instructions for biometric analysis is provided. The instructions can be executable by a processing device. Execution of the instructions by the processing device can cause the processing device to illuminate an iris of a subject with one or more illumination sources of a biometric analysis system. Execution of the instructions by the processing device can cause the processing device to selectively receive light scattered from the iris through a first optical filter and a second optical filter of a spectral discriminator of the biometric analysis system. The first optical filter can have first set of pass characteristics and the second optical filter can have second set of pass characteristics. Execution of the instructions by the processing device can cause the processing device to capture one or more images of the subject with one or more cameras of the biometric analysis system during passage of the light scattered from the iris through the first optical filter. Execution of the instructions by the processing device can cause the processing device to capture one or more images of the subject with the camera of the biometric analysis system during passage of the light scattered from the iris through the second optical filter. Execution of the instructions by the processing device can cause the processing device to receive as input at an analysis module of the biometric analysis system the captured one or more images of the subject during passage of the light scattered from the iris through the first optical filter and the second optical filter. Execution of the instructions by the processing device can cause the processing device to determine with the analysis module of the biometric analysis system whether a match exists between iris structural information displayed in the one or more images of the subject during passage of the light scattered from the iris through the first optical filter and the second optical filter, existence of the match being indicative of a facsimile image.

In accordance with embodiments of the present disclosure, an exemplary biometric analysis system is provided that includes one or more illumination sources, one or more cameras, one or more processing devices, and one or more analysis modules. The illumination source can be configured to illuminate an eye of a subject. The camera can be configured to capture one or more images of the eye of the subject during illumination of the eye with the first illumination source. The one or more images can display a specularity characteristic of the eye. The analysis module can be configured to receive as input the one or more images, analyze a brightness and uniformness of the specularity characteristic of the eye, and indicate if the reflections of the eye are consistent with the typical three-dimensionality of the eye of a live subject.

The specularity characteristic can be a specular reflection on a cornea of the subject. If the specularity characteristic of the eye is dim and has low uniformness, the analysis module can discredit the subject as a facsimile image. If the specularity characteristic of the eye is bright and uniform, the analysis module can identify the subject as a live subject. The live subject can have a bright and uniform specularity characteristic due to a substantially shiny corneal surface of the eye. The illumination source can emit a near infrared light.

In accordance with embodiments of the present disclosure, an exemplary method of biometric analysis is provided. The method includes illuminating an eye of a subject with one or more illumination sources of a biometric analysis system. The method includes capturing one or more images of the eye of the subject with one or more cameras of the biometric analysis system during illumination of the eye with the first illumination source. The one or more images can display a specularity characteristic of the eye. The method includes receiving as input at an analysis module of the biometric analysis system the one or more images. The method includes analyzing with the analysis module a brightness and uniformness of the specularity characteristic of the eye. The method includes determining whether the specularity characteristic of the eye is indicative of a live subject. Such determination is made based on whether the reflections of the specularity characteristic are consistent with the typical three-dimensionality of the eye of a live subject.

The specularity characteristic can be a specular reflection of a cornea of the subject. The method can include determining that dim and low uniformness of the specularity characteristic of the eye is contraindicative of a live subject and indicative of a facsimile image, thereby discrediting the subject as a facsimile image with the analysis module if the specularity characteristic of the eye is dim and has low uniformness. The method can include determining that bright and uniform specularity characteristic of the eye is contraindicative of a facsimile image and indicative of a live subject, thereby identifying the subject as a live subject with the analysis module if the specularity characteristic of the eye is bright and uniform. The live subject can have a bright and uniform specularity characteristic due to a substantially shiny corneal surface of the eye. The method can include emitting a near infrared light with the illumination source.

In accordance with embodiments of the present disclosure, an exemplary non-transitory computer-readable medium storing instructions for biometric analysis is provided. The instructions can be executable by a processing device. Execution of the instructions by the processing device can cause the processing device to illuminate an eye of a subject with one or more illumination sources of a biometric analysis system. Execution of the instructions by the processing device can cause the processing device to capture one or more images of the eye of the subject with one or more cameras of the biometric analysis system during illumination of the eye with the first illumination source. The one or more images can display a specularity characteristic of the eye. Execution of the instructions by the processing device can cause the processing device to receive as input at an analysis module of the biometric analysis system the one or more images. Execution of the instructions by the processing device can cause the processing device to analyze with the analysis module a brightness and uniformness of the specularity characteristic of the eye. Execution of the instructions by the processing device can cause the processing device to determine a three-dimensionality of the eye with the analysis module based on the specularity characteristic.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed systems and methods of biometric analysis, reference is made to the accompanying figures, wherein.

DESCRIPTION OF EXEMPLARY EMBODIMENTS

Figure 1:
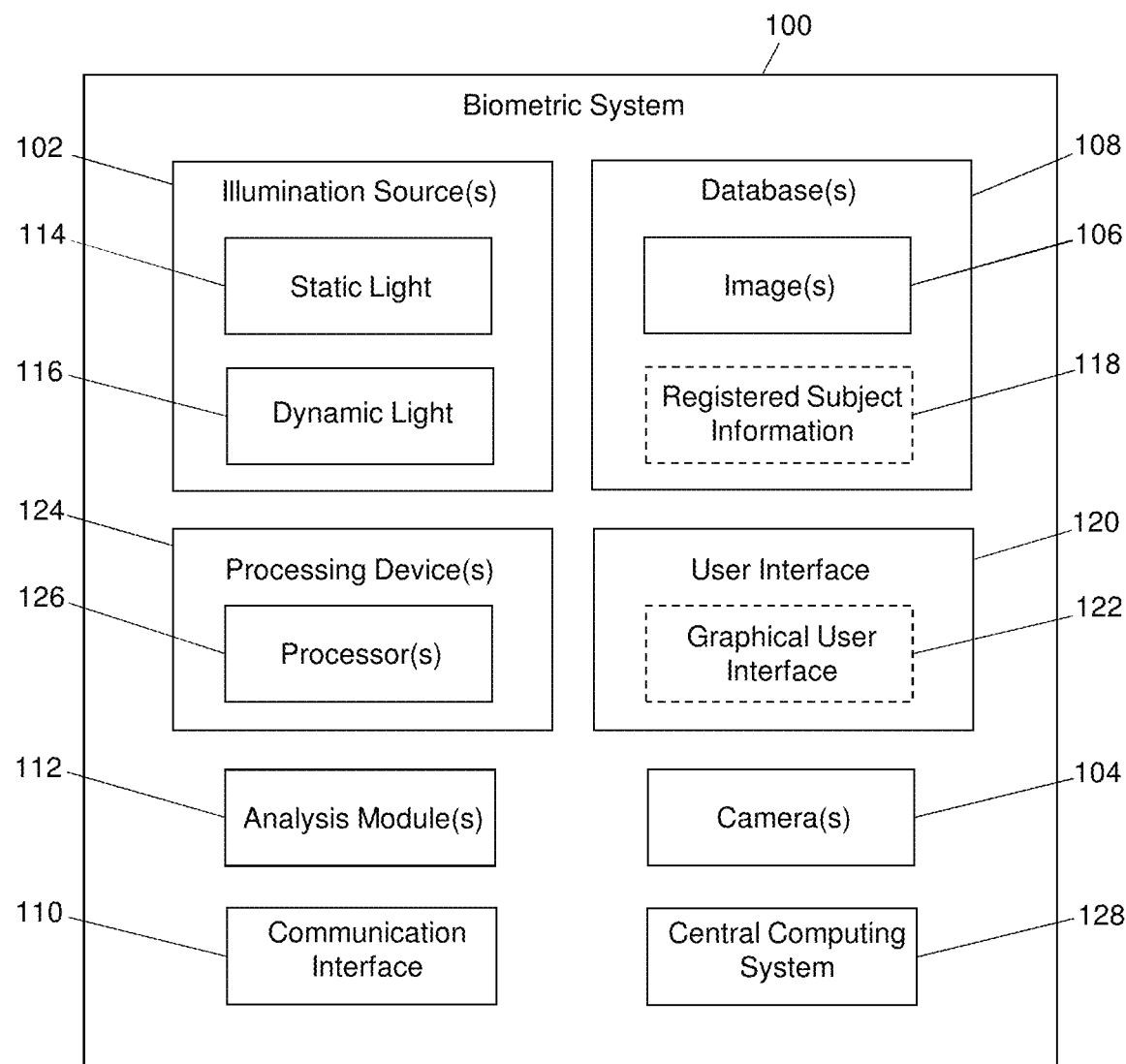
FIG. 1 is a block diagram of a first embodiment of an exemplary biometric analysis system in accordance with the present disclosure.

In accordance with embodiments of the present disclosure, exemplary biometric analysis systems are described herein that include anti-spoofing features for detecting and differentiating a facsimile image as compared to a live subject. The biometric analysis systems generally include one or more cameras configured to capture one or more images of at least a portion of the subject to be analyzed by an analysis module. The biometric analysis systems generally include one or more illuminators or illumination sources (e.g., naturally occurring such as sunlight, artificial ambient sources such as office lighting, or artificial sources that are part of the system). In some embodiments, the biometric analysis system include one or more first illumination sources providing natural and/or ambient illumination to at least a portion of the subject, and one or more second illumination sources providing illumination (e.g., near infrared) to at least a portion of the subject. Although illustrated as having different illumination sources in the Figures, it should be understood that the illumination sources of each biometric analysis system are capable of emitting static light, dynamic light, continuous light, flashing light, combinations thereof, or the like. For example, the intensity, duration, and/or period of the light emitted by the illumination sources can be varied in each biometric analysis system. The term "image" as used herein can include still frame images, video, combinations thereof, or the like. The term "facsimile image" as used herein can include a still frame image (flat or curved), a three-dimensional model, a moving model, combinations thereof, or the like.

The biometric analysis system can include one or more analysis modules (e.g., incorporated into one or more processing devices or as separate components), and one or more detectors and/or sensors configured to detect characteristics represented in the one or more images. Each biometric analysis system described herein can determine whether the image(s) captured is indicative or contraindicative of a live subject based on a presence or lack of detected characteristics that are consistent with live subjects or a facsimile image, such determination assisting in the decision whether the subject is a live subject. As an example, the face of a live subject has a three-dimensional shape and should therefore have certain characteristics consistent with three-dimensional shapes. In contrast, a facsimile image printed on a flat sheet of paper generally lacks the three-dimensional shape features, and can also exhibit characteristics consistent with flat objects that are inconsistent with a live subject.

Although discussed herein as individual biometric analysis systems, it should be understood that one or more components of the individual biometric analysis systems can be combined into a single system to provide multiple levels of anti-spoofing protection and/or decisions with higher confidence levels. For example, two or more of the disclosed biometric analysis systems (and/or alternative systems) can be combined to determine whether the image(s) captured is indicative or contraindicative of a live subject, with the determination of each system being weighted in making a final decision regarding the liveness or facsimile of the subject. In some embodiments, one or more sensors (e.g., three-dimensional sensors) can be used to corroborate the determination of the biometric analysis system as to whether the image is contraindicative or indicative of a live subject. Similar reference numbers may be used in the figures to represent similar structures in the different biometric systems.

With reference to FIG. 1, a block diagram of a first embodiment of an exemplary biometric analysis system 100 (hereinafter "system 100") is provided. The system 100 tests the liveness of a subject by looking for illumination levels consistent with the anatomy of a subject. As an example, human iris identification generally uses near infrared (NIR) illumination to provide visualization of the iris texture through iris pigment which absorbs light in the visible but not the near infrared spectrum. The near infrared illumination applied to a subject's iris and surrounding ocular region and/or face causes reflection not only from the iris but also from the skin, sclera, hair, and other anatomical features of the subject. The intensity of these reflections is based on the intensity of the illumination sources, reflectivity characteristics of the anatomical surface, and relative positions of the illumination sources, subject, and cameras.

Sclera, skin, hair, iris, and other anatomical features all have different reflectivity characteristics. For example, skin reflectivity is generally significantly higher than iris reflectivity (after accounting for skin pigmentation). As a result, the higher illumination level needed to obtain an acceptable iris signal for biometric analysis is often enough to cause too much light to reflect from the skin, making the ocular region and/or regions of the face much brighter than the rest of the captured image. The higher illumination level can result in an image showing the ocular region and/or regions of the face at a point of saturation, especially in areas that are angled such that they reflect the maximum amount of illumination back to the camera.

The system 100 exploits the different reflectivity of skin (regardless of the level of pigmentation) to differentiate skin reflection from reflection from, for example, a paper spoof or facsimile image. The differentiation between skin reflection and reflection from a facsimile image may be determined based on the three-dimensionality of the face. In particular, the brightness of a point of the subject's face is affected by the three-dimensional curvature of the face. Regions of the face of a living subject substantially normal to the camera, e.g., the brow ridge, cheek bones, or the like, reflect light directly back to the camera and appear significantly brighter than other regions of the skin during illumination despite the fact that all regions of the skin are generally of the same color. For example, the temples and sides of the cheeks face away from the camera at an angle and therefore appear dimmer in a captured image.

In contrast, a picture of a face printed on paper depicts a substantially flat surface with all facial features oriented in approximately the same direction relative to the camera. For example, the iris, brow ridge, cheek bones, ears, or the like, are depicted on flat surface. The light reflected from the paper therefore does not preferentially reflect from specific areas of the depicted face. As will be described below, the system 100 detects the lack of three-dimensionality either with static illumination or with changing/dynamic illumination levels to determine whether the presented subject is a live subject or a two-dimensional fake.

The system 100 generally includes one or more illumination sources 102 configured to illuminate at least a portion of an iris of the presented subject. The illumination source 102 can also be configured to illuminate at least a portion of a surrounding ocular region and/or face of the subject. The illumination source 102 can be a near infrared illumination source. The system 100 can include one or more sensors configured to detect the proximity or position of the subject. For example, when the subject is in a predetermined area, the illumination source 102 can be actuated to illuminate the iris and ocular region and/or face of the subject. To perform biometric or iris recognition, the subject's eye and by extension at least a portion of the subject's face can be illuminated by the illumination source 102 sufficiently enough to detect the unique texture of the subject's iris.

The system 100 includes one or more cameras 104 configured to capture one or more images (e.g., still frame images, video images, combinations thereof, or the like). When the noted areas of the subject are illuminated by the illumination source 102, the camera 104 can be actuated to capture one or more images 106 of the subject. The images 106 can display only specific areas of the subject, such as only the iris, only the brow ridge, only the cheek bone, only the ear, or the like. The images 106 can also display multiple areas of the subject in a single image 106, such as the entire face of the subject or regions of the face having multiple facial features. One or more of the images 106 can display the captured reflected light from the iris. One or more images 106 can display the captured reflected light from one or more portions of the surrounding ocular region and/or face of the subject. In particular, illumination of the ocular region and/or face of a live subject creates a pattern of illumination on the face of the subject based on the three-dimensional structure of the face.

The images 106 can be electronically stored in a local and/or remote database 108. The system 100 can include a communication interface 110 configured to electronically transmit the images 106 to the database 108. The communication interface 110 can be configured to electronically receive the images 106 (or any other electronic data) and provides electronic communication between components of the system 100.

The system 100 includes an analysis module 112 (e.g., a processing device) configured to electronically receive as input the images 106 via the communication interface 110. The analysis module 112 can be executed to analyze the reflected light or pattern of reflected light in the images 106 and determines if the pattern of reflected light is consistent with the expected three-dimensional features of a live subject. For example, the analysis module 112 can detect a consistency between a true three-dimensional subject and what is expected for reflected light levels from a live subject. The system 100 does not require a response (autonomic or voluntary) from the subject. Rather, the analysis module 112 detects that the subject possesses a three-dimensional face or head based on the captured reflected light patterns in the images 106. The system 100 therefore functions in a simpler manner than alternative approaches that rely on stimuli for liveness detection.

Based on the different patterns or distribution of illumination in the images 106, the analysis module 112 distinguishes the three-dimensional curvature of the face from the most common form of presentation attacks, a picture of an eye on a flat surface printed on a piece of paper or displayed on a screen. The analysis module 112 therefore determines whether the detected patterns or distribution of illumination is indicative or contraindicative of authentic transactions and presentation attacks. In particular, the system 100 analyzes the captured image 106 for distinct patterns of illumination having non-uniformities specific to faces of living subjects. If non-uniform patterns of illumination are detected in the image 106 by the analysis module 112, the analysis module 112 can determine that the pattern is indicative of a live subject, and outputs increased confidence that the subject is a live subject. In contrast, an image of a subject's eye printed on paper (even if the paper is curved) will display a more uniform distribution of illumination due to the two-dimensional flatness of the scene presented to the system 100 (and the lack of three-dimensionality). If substantially uniform patterns of illumination are detected in the image 106 by the analysis module 112, the analysis module 112 can determine that the pattern is contraindicative of a live subject, and outputs increased confidence that the subject is a facsimile image.

The system 100 can be used with an illumination source 102 having a static light 114 and/or a dynamic light 116. The system 100 can therefore be incorporated into system for which the illumination level can be varied in the course of a transaction with a subject and the resulting images 106 can be analyzed for detection of an appropriate response. The static light 114 can emit a substantially static or continuous light (e.g., a substantially uniform level of illumination) to illuminate the iris and the surrounding ocular region and/or face of the subject. Each captured image 106 can be analyzed independently by the analysis module 112 to detect the characteristic structure of a living face based on the non-uniform pattern of illumination displayed in the image.

As an example, the static light 114 can be configured to illuminate a three-dimensional relief around a temporal edge of an eye socket of the subject. Bright near infrared illumination creates characteristic patterns on the face (if the subject is a living subject) including bright and dark regions. The camera 104 can be actuated to capture one or more images 106 of the temporal edge of the eye socket of the subject. The analysis module 112 analyzes the reflected light of the temporal edge of the eye socket captured in the images 106 to determine whether a uniform or non-uniform pattern of illumination is displayed. If the pattern of illumination is uniform, the analysis module 112 can discredit the subject as a facsimile image. A non-uniform pattern of illumination would signal a three-dimensional image of a living subject.

The dynamic light 116 can emit a light at different levels of illumination. For example, the dynamic light 116 can emit a first illumination level and subsequently emit a second illumination level with the illumination source. In some embodiments, the dynamic light 116 can initially emit a first illumination level (e.g., a low or dim illumination level) and automatically switch to emit a second illumination level (e.g., a high or bright illumination level). In some embodiments, the dynamic light 116 can initially emit a first illumination level (e.g., a low or dim illumination level) and incrementally or gradually transitions to the second illumination level (e.g., a high or bright illumination level), thereby providing different levels of illumination between the first and second illumination levels. The camera 104 can capture one or more images 106 at each level of illumination (e.g., a sequence of images 106) and the analysis module 112 determines the lack of three-dimensionality of the subject based on a change in the characteristics, e.g., saturation and/or pattern of illumination distribution in the sequence of images 106.

By implementing the dynamic light 116, a facsimile image that may be successful in depicting correct static three-dimensional illumination artifacts would be discovered and discredited. By changing or gradually increasing the amount of illumination, areas of the face that are normal to the camera 104 become preferentially brighter than the rest of the face, approaching a bleached or saturated level at a threshold of illumination. The analysis module 112 compares various images 106 and detects the area that exhibit high sensitivity to illumination due to their angle relative to the camera 104. In an authentic transaction involving a live subject, bleached or saturated areas would make sense relative to the known structure of the face at, for example, brow ridges and cheekbones, while darker areas would still exist in areas of the face at an angle to the camera 106. The analysis module 112 can further compare various anatomical features with different reflectivity levels in the various images 106 for additional spoof or live indications.

In contrast, a facsimile image may display bleached or saturated areas in the majority or the entire image due to the two-dimensional form of the image. In one embodiment, the transition between two levels of illumination or the gradual transition through multiple levels of illumination can be performed at a preset frequency or point in time. In one embodiment, the frequency or point in time for the transition between two levels of illumination or the gradual transition through multiple levels of illumination can be changed for each transaction.

The system 100 can electronically store data corresponding to enrolled or registered subject information 118 in the database 108. The registered subject information 118 can be used to authenticate users based on biometric or iris recognition. The analysis module 112 can also use the registered subject information 118 as a template or comparison for illumination patterns generally presented in live subjects as compared to a facsimile image. The system 100 can include a user interface 120 including a graphical user interface (GUI) 122. The GUI 122 can be used by the subject to enter information into the system 100 and can be used to display information to the subject, such as successful authentication of the subject or detection of a facsimile image.

The system 100 can include a processing device 124 with a processor 126 configured to execute one or more components of the system 100. For example, the processing device 124 can execute instructions for implementing the analysis module 112, controlling the illumination source, and/or controlling the camera 104. In some embodiments, the system 100 can include a central computing system 128 in communication with the illumination source 102, the camera 104, the analysis module 112, the processing device 124, and/or the user interface 120 via the communication interface 110.

Figure 2:
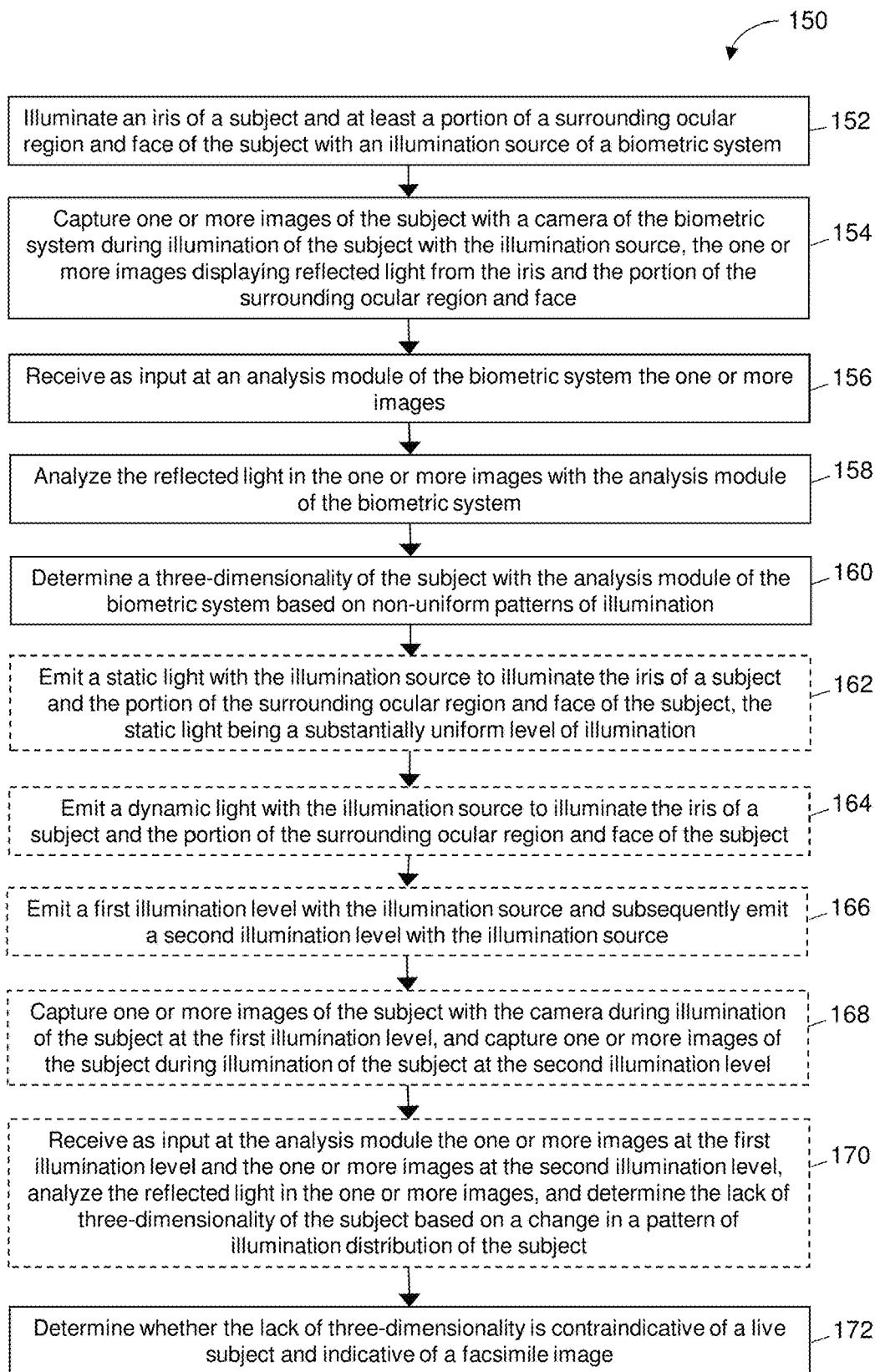
FIG. 2 is a flowchart illustrating an exemplary process of implementing the biometric analysis system of FIG. 1.

FIG. 2 is a flowchart illustrating an exemplary process 150 of implementing the system 100. To begin, at step 152, an iris of a subject and at least a portion of a surrounding ocular region and/or face of the subject is illuminated with an illumination source. At step 154, one or more images of the subject are captured with a camera during illumination of the subject with the illumination source. The one or more images display reflected light patterns from the iris and the surrounding ocular region and/or face. At step 156, the one or more images are received as input at an analysis module. At step 158, the reflected light in the images is analyzed with the analysis module. At step 160, a three-dimensionality of the subject is determined with the analysis module based on non-uniform patterns of illumination (or a lack of three-dimensionality is determined based on uniform patterns of illumination).

In some embodiments, at step 162, a static light can be emitted to illuminate the iris of the subject and the ocular region and/or face of the subject, the static light having a substantially uniform level of illumination. In some embodiments, at step 164, a dynamic light can be emitted to illuminate the iris of the subject and the ocular region and/or face of the subject. In particular, at step 166, a first illumination level can initially be emitted and a second illumination level can subsequently be emitted with the illumination source (e.g., directly between the two levels of illumination or incrementally). At step 168, one or more images of the subject can be captured with the camera during illumination at the first and second illumination levels. At step 170, the analysis module receives the images at the different illumination levels and determines the lack of three-dimensionality based on a change in the pattern of illumination distribution in the images. At step 172, analysis module determines whether the lack of three-dimensionality is contraindicative of a live subject and indicative of a facsimile image, thereby discrediting the subject as a facsimile image.

Figure 3:
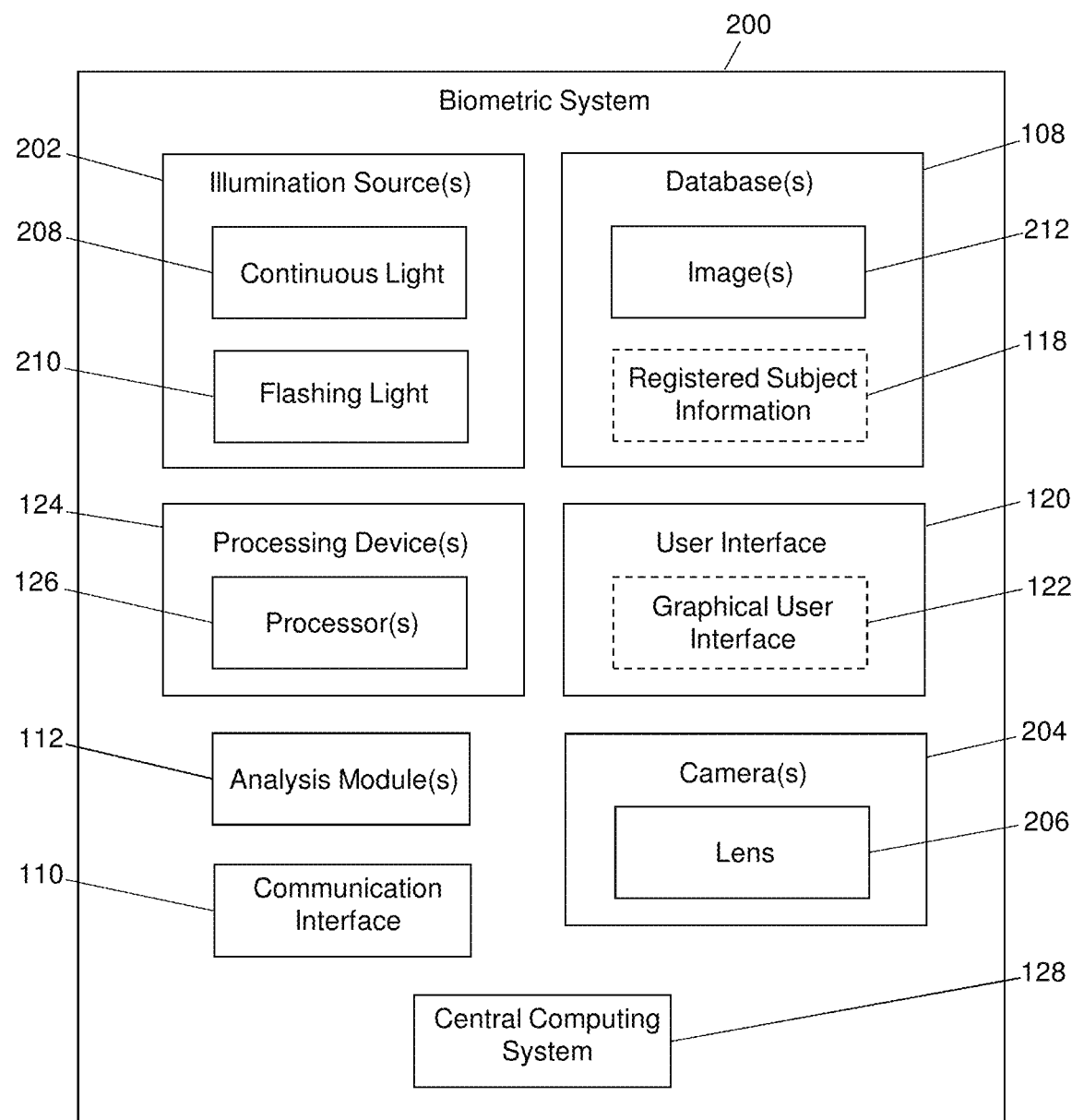
FIG. 3 is a block diagram of a second embodiment of an exemplary biometric analysis system in accordance with the present disclosure.

With reference to FIG. 3, a block diagram of a second embodiment of an exemplary biometric analysis system 200 (hereinafter "system 200") is provided. The system 200 ensures the liveness of a subject or user of an iris identification system by sensing the retinal retroreflection (e.g., red-eye, infrared-eye, or the like) in an eye of a living subject as compared to a two-dimensional or three-dimensional facsimile, thereby thwarting spoofing by a presentation attack.

While some traditional biometric systems compare specular reflections from the cornea, the system 200 exploits the natural reflectivity of the retina in the infrared spectrum which is a consequence of the complex optics of the eye. In some embodiments, temporal aspects can also be used to further detect facsimile images. For example, the system 200 can be controlled in time to produce hard-to-anticipate tests of authenticity in a presented iris of the subject. In some embodiments, alternative systems described herein and/or additional layers of anti-spoofing (e.g., pupillometry, glance detection, or the like) can be combined with the system 200, with each system providing a determination whether the subject is indicative of a live subject or a facsimile subject, and each determination being weighted in deciding whether the subject is a live subject.

Retinal reflection or retroreflection occurs when light enters the eye, bounces off the retina, and returns to a camera. Retinal reflection depends on the relative position of the light source, the subject's eye, and the camera, as well as the size of the subject's pupil. Retroreflection can generally be prevented by ensuring the angle formed by the illumination source-eye-camera exceeds approximately 5 degrees. The system 200 promotes the occurrence of retinal reflections as an indicator of a live subject by varying the angle below the standard 5 degree recommendation. The conditions necessary to create a retinal reflection generally depend on the subject. For example, in cases of children who tend to have larger pupils than adults, a compact camera with a flash close to the camera lens produces a characteristically red reflection (referred to as red-eye). The same camera may not produce the same intensity of the red glare in an older subject with smaller pupils. In addition, a camera designed with more distance between the lens and flash may not produce red-eye in any subject at the same distance as a compact camera.

The system 200 includes one or more illumination sources 202 configured to illuminate the iris of the subject to produce the retinal reflection from the iris. The system 200 includes one or more cameras 204 each including a lens 206. The illumination source 202 can be disposed at a position adjacent to the lens 206 try to produce the retinal reflection in the iris of the subject. In particular, the illumination source 202 can be disposed as close as possible to the camera lens 206 to try to cause a retinal reflection in the iris. The light emitted by the illumination source 202 can be infrared light to produce the retinal reflection in the infrared spectrum that would not be detected by the naked eye.

The camera 204 captures one or more images 212 of the subject (e.g., the iris of the subject) during illumination of the iris with the illumination source 202. At least some of the images 212 may display the retinal reflection of the iris of the subject. The analysis module 112 receives the images 212 as input, analyzes the existence or lack of existence of the retinal reflection in the images 212, and determines whether the retinal reflection (if any) exhibits a natural reflectivity of a retina in a living subject. If the analysis module 112 detects a lack of natural retinal reflectivity in the images 212, the subject can be discredited as a facsimile image or eye.

In some embodiments, the illumination source 202 can emit a substantially continuous light 208 (e.g., at a substantially uniform illumination level). In some embodiments, the illumination source 202 can emit a flashing light 210 (e.g., a light emitted at the same interval of time, a light emitted at different intervals of time, emitting a different number of flashes for each transaction, emitting flashes at different intensities, or the like). The flashing light 210 may create the retinal reflection at hard to predict, short intervals of time during the biometric analysis transaction, thereby preventing anti-spoofing. In some embodiments, the illumination source 202 may be capable of emitting light from a variety of locations (e.g., multiple illuminators at various locations, a movable illumination, or the like) with the intention of altering the critical angle above and below the 5 degree standard with the intention of selectively try to promote or avoid retinal reflections.

In one embodiment, the infrared stimulus that results in retinal reflection can fire only once for a short time during the biometric transaction or multiple times with intervals of time in-between. The analysis module 112 would know which frame in a video or image 212 displays the retinal reflection that would manifest as a bright pupil and would be easily measured. All other frames of the image 212 could contain dark pupils. A presentation spoof attack that used artificial means to simulate a bright pupil would need to produce the response at the exact moment when the stimulus occurs from the illumination source 202. The system 200 can vary the stimulus timing (when flashes occur and/or how many flashes occur) from transaction to transaction to reduce the potential for successful spoofing.

Figure 4:
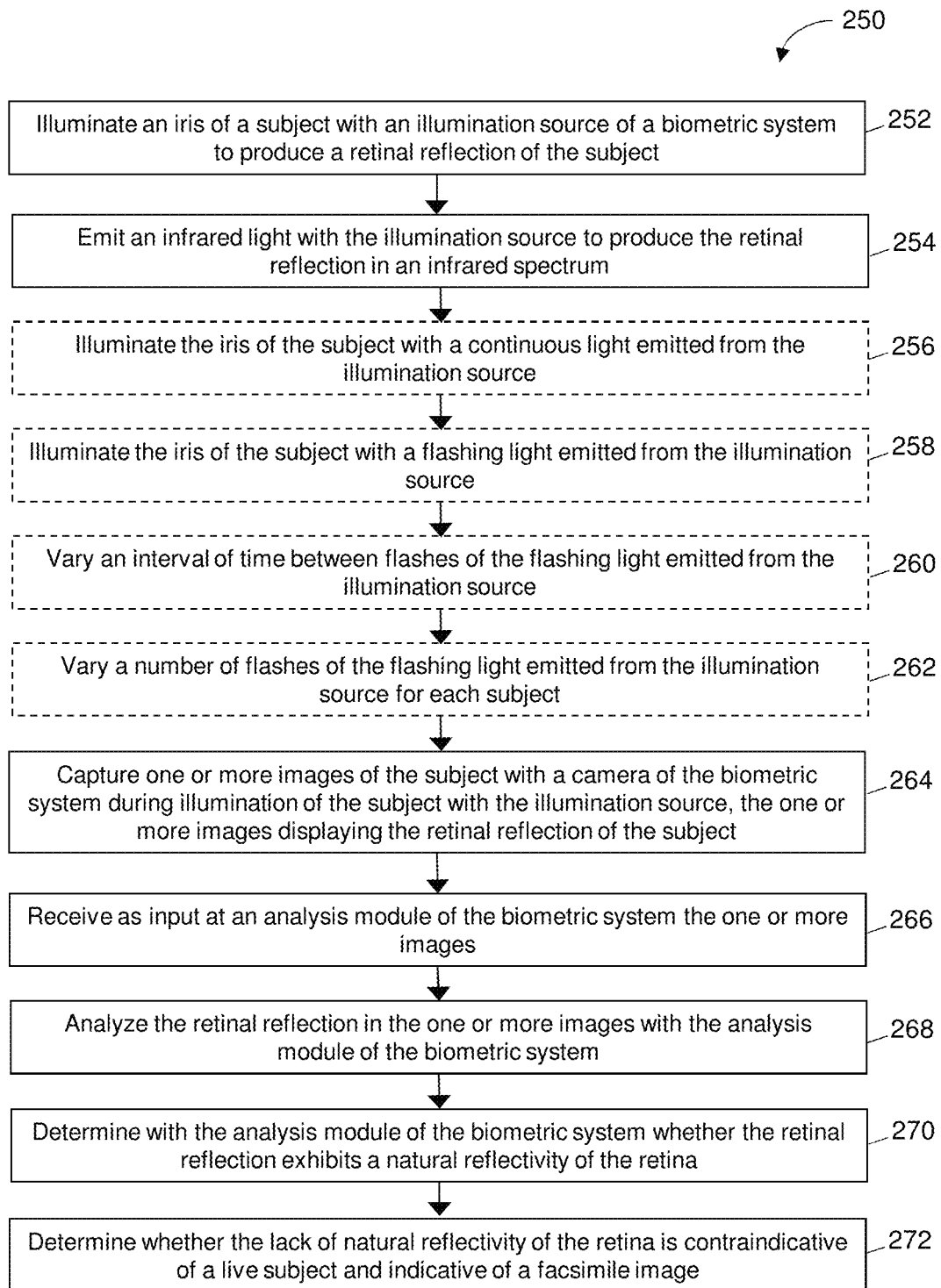
FIG. 4 is a flowchart illustrating an exemplary process of implementing the biometric analysis system of FIG. 3.

FIG. 4 is a flowchart illustrating an exemplary process 250 of implementing the system 200. To begin, at step 252, an iris of a subject is illuminated with an illumination source to try to produce a retinal reflection of the subject. At step 254, the illumination source emits an infrared light to produce the retinal reflection in an infrared spectrum. Step 254 can be considered part of step 252 such that the illumination source emits an infrared light to produce the retinal reflection of the subject in an infrared spectrum. In some embodiments, at step 256, the illumination source emits a continuous light to illuminate the iris. In some embodiments, at step 258, the illumination source emits a flashing light to illuminate the iris. In some embodiments, at step 260, the illumination source varies an interval of time between flashes of the flashing light. In some embodiments, at step 262, the illumination source varies a number of flashes of the flashing light emitted for each subject (e.g., for each transaction).

At step 264, one or more images of the iris of the subject are captured with a camera during illumination of the subject with the illumination source. The one or more images display the retinal reflection of the subject. At step 266, the analysis module receives as input the one or more images. At step 268, the analysis module analyzes the retinal reflection in the one or more images. At step 270, the analysis module determines whether the retinal reflection exhibits a natural reflectivity of the retina (e.g., as compared to a retinal reflection in an iris of a facsimile subject). At step 272, the analysis module determines whether the lack of natural reflectivity of the retina is contraindicative of a live subject, thereby discrediting the subject as a facsimile image.

Figure 5:
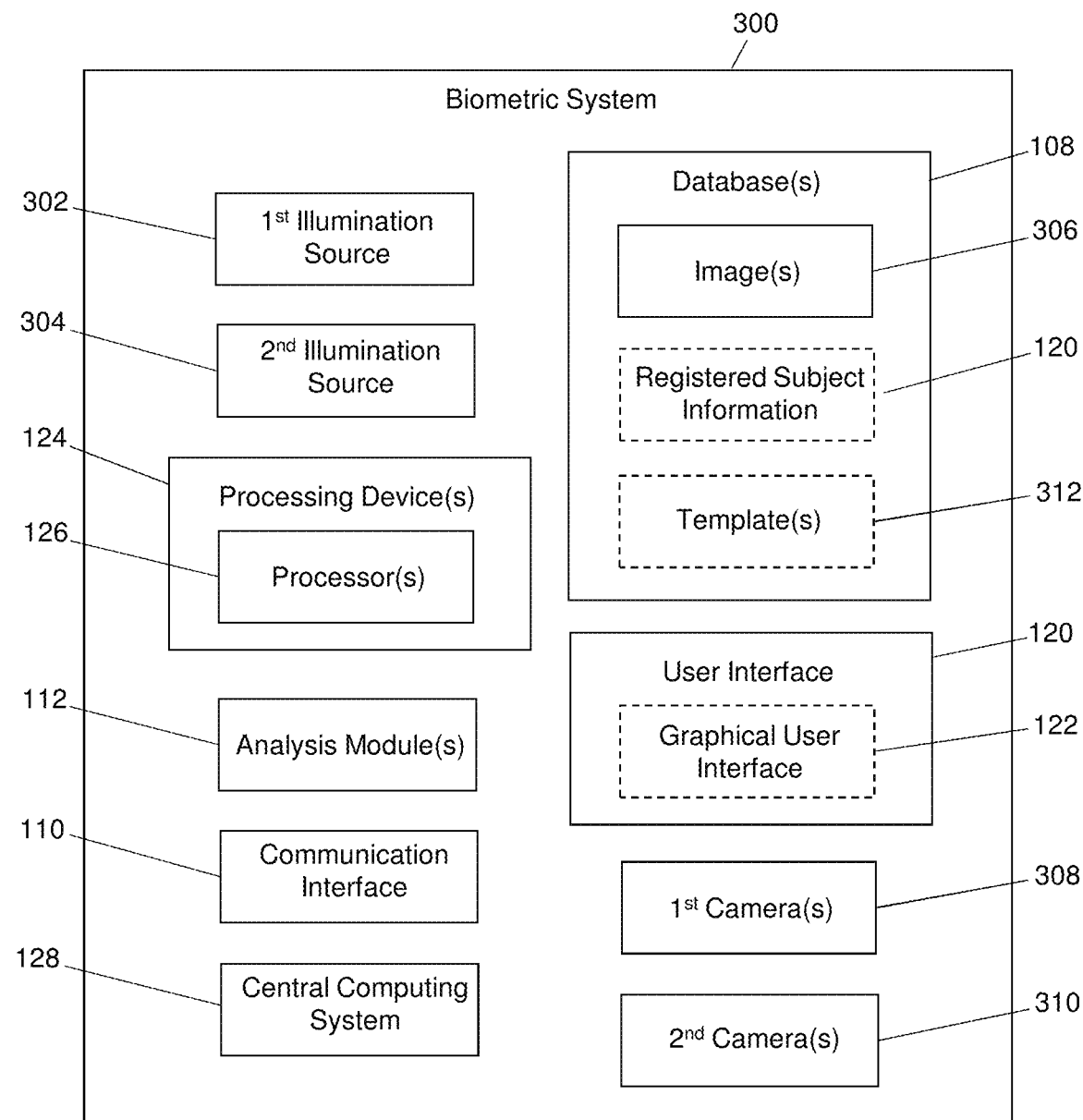
FIG. 5 is a block diagram of a third embodiment of an exemplary biometric analysis system in accordance with the present disclosure.

With reference to FIG. 5, a block diagram of a third embodiment of an exemplary biometric analysis system 300 (hereinafter "system 300") is provided. The system 300 ensures the authenticity of a subject or user of an iris identification system by using a broad spectral range. Traditional biometric analysis systems generally rely analysis of iris characteristics in the near infrared spectrum. The system 300 analyzes the broad spectral range (such as both color and near infrared spectrums) to indicate that the biometric iris credential demonstrates real characteristics of the full spectrum rather than over only a narrow spectrum (e.g., only the near infrared spectrum), thereby thwarting spoofing by a presentation attack. Specifically, the system 300 attempts to indicate facsimiles that exhibit spectral characteristics that are inconsistent with a live subject.

The system 300 includes one or more first illumination sources 302 and one or more second illumination sources 304 (e.g., illumination sources having different wavelengths, such as near infrared, red, green, blue, UV, alternative spectra, or the like). The first illumination source 302 is configured to illuminate at least a portion of the iris of a subject. The first illumination source 302 can be configured to emit a near infrared light. The second illumination source 304 is configured to emit a visible light to illuminate at least a portion of the face of the subject. The system 300 includes one or more cameras configured to capture one or more images 306 of the subject during illumination of the subject.

For example, the system 300 can include one or more first cameras 308 (e.g., near infrared cameras) configured to capture one or more images 306 of the subject during illumination of the subject with the first illumination source 302. As a further example, the system 300 can include one or more second cameras 310 (e.g., visible light cameras) configured to capture one or more images 306 of the subject during illumination of the subject with the second illumination source 304. In some embodiments, a single camera can substantially simultaneously capture images 306 of the subject illuminated by the first and second illumination sources 302, 304.

The camera 308 generates monochromatic images 306 that allows a measure of the iris texture in the near infrared spectrum. The camera 310 generates color images 306 of the face of the subject. By using both monochromatic and color images 306 of the subject, the system 300 can discredit a monochrome image 306 of the face, periocular region and/or iris (e.g., due to the normal pigmentation of the face, periocular region and/or iris). The analysis module 112 receives as input the one or more images 306 (e.g., monochrome and color), determines the iris texture based on the images 306 of the subject during illumination with the first illumination source 302, and determines a color spectrum of at least a portion of the face of the subject based on the images 306 of the subject during illumination with the second illumination source 304.

Thus, rather than relying on motion or liveness, the system 300 tests the spectral consistency of the captured biometric features, particularly the color of the face and periocular region (including the eye). If an attacker uses a monochrome image that is generally obtained form an iris camera as a fake iris, a color camera 310 can perceive the monochrome image (since real biometric features are full spectrum color), and the system 300 can determine that the image is contraindicative of a live subject, thereby discrediting the image as a facsimile image. In particular, if the analysis module 112 detects at least a portion of the image 306 captured by the color camera 310 when the subject is illuminated by the second illumination source 304 to be monochrome, the analysis module 112 can discredit the subject as a facsimile image. If the analysis module 112 detects a monochromatic iris structure in the images 306 captured by the near infrared camera 308 during illumination of the subject by the first illumination source 302 and a completely color image 306 captured by the color camera 310 during illumination of the subject by the second illumination source 304, the analysis module 112 can identify the subject as a live subject.

In some embodiments, the system 300 can segment and generate templates 312 for the images 306 captured by the cameras 308, 310 in each spectral band to perform a comparison analysis with the analysis module 112 relative to the templates 312 when a subject is being authenticated. Data corresponding to the templates 312 can be electronically stored in the database 108. An iris of a living subject captured by the color camera 310 and the near infrared camera 308 should not match due to the pigmentation characteristics captured by the color camera 310. The system 300 does not require motion to sense inconsistencies or liveness.

Figure 6:
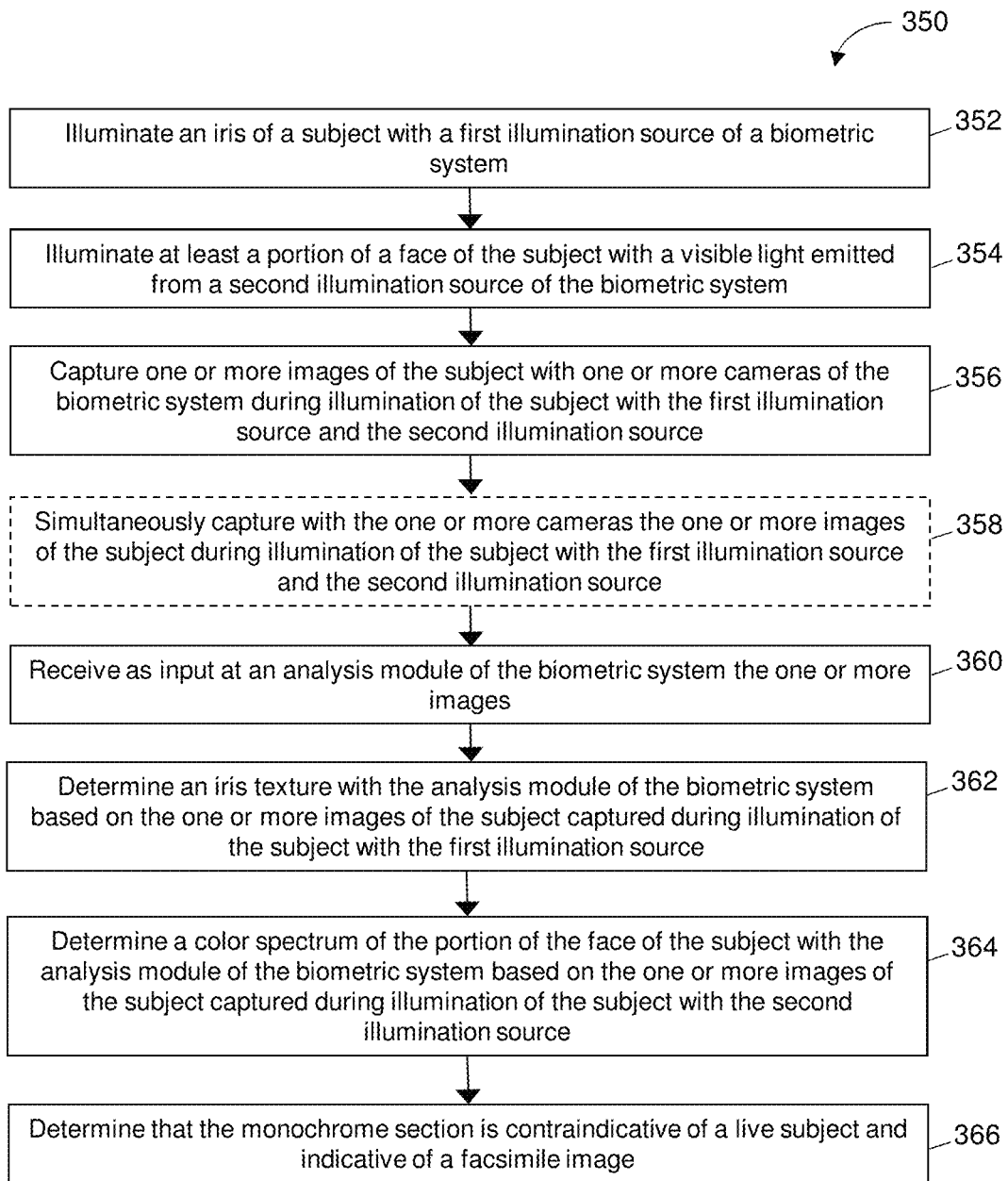
FIG. 6 is a flowchart illustrating an exemplary process of implementing the biometric analysis system of FIG. 5.

FIG. 6 is a flowchart illustrating an exemplary process 350 of implementing the system 300. To begin, at step 352 an iris of a subject is illuminated with near infrared light from a first illumination source. At step 354, at least a portion of the face of the subject is illuminated with color light from a second illumination source. In some embodiments, the illumination from the first and second illumination sources occurs substantially simultaneously. At step 356, one or more cameras capture one or more images of the subject during illumination of the subject with the first and second illumination sources. In some embodiments, at step 358, the one or more cameras substantially simultaneously capture the one or more images of the subject during illumination of the subject with the first and second illumination sources.

At step 360, the analysis module receives as input the one or more images from the cameras. At step 362, the analysis module determines an iris texture based on the images of the subject captured during illumination of the subject with the first illumination source. At step 364, the analysis module determines a color spectrum of the portion of the face of the subject based on the images of the subject captured during illumination of the subject with the second illumination source. At step 366, the analysis module determines that the monochrome section is contraindicative of a live subject and indicative of a facsimile image, thereby discrediting the subject as a facsimile image if the analysis module detects a monochrome section of a portion of the face of the subject based on the one or more images of the subject captured during illumination of the subject with the second illumination source.

Figure 7:
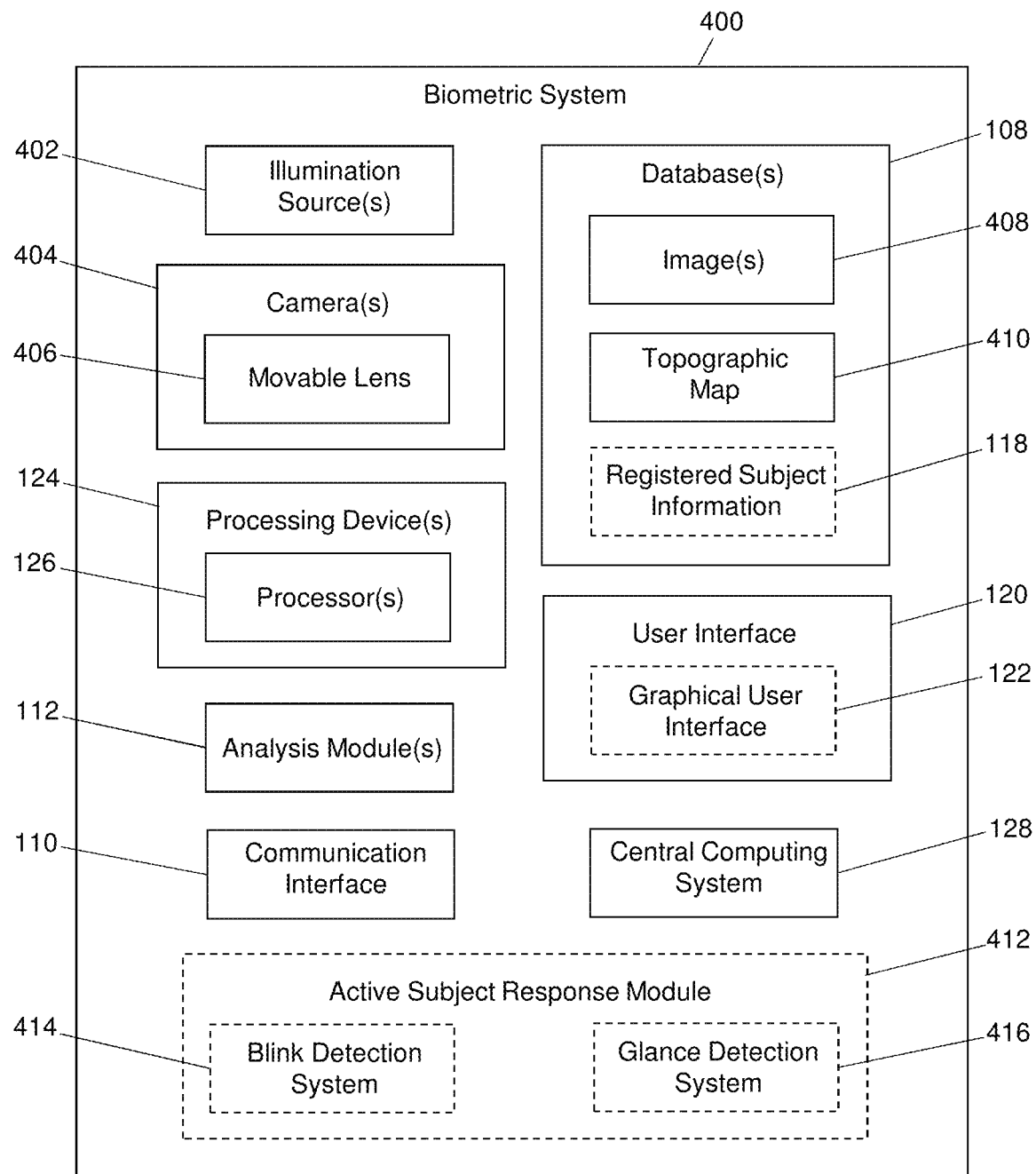
FIG. 7 is a block diagram of a fourth embodiment of an exemplary biometric analysis system in accordance with the present disclosure.

With reference to FIG. 7, a block diagram of a fourth embodiment an exemplary biometric analysis system 400 (hereinafter "system 400") is provided. The system 400 ensures the authenticity of a subject or user of an iris identification system by reviewing the contours of the face captured at a plurality of distances with sufficiently narrow depth of field. In some embodiments, the system 400 can use a movable lens at different positions of focus, a light field camera to focus after the image is acquired, or the like. In one embodiment, the system 400 captures a sequence of images as the lens of the camera moves to change the point or plane of focus on the subject. In one embodiment, the system 400 captures a sequence of images without a movable lens and narrows the depth of field during processing. The system 400 analyzes the intermediate images to detect the smooth curving surfaces of a real face which can be distinguished from curves of a simply bent paper image.

The system 400 can optionally include one or more illumination sources 402 configured to illuminate at least a portion of the face of the subject. The system 400 includes one or more cameras 404 with a movable lens 406. In particular, the camera 404 includes a mechanism configured to incrementally move the lens 406 to change the plane of focus of the camera 404 along various points of the subject's face. The camera 404 can be actuated to capture a sequence of images 408 of the face of the subject as the lens 406 incrementally moves a focal plane from a first point relative to the face of the subject, through the face of the subject, and to a second point relative to the face of the subject. In some embodiments, the incremental movement of the lens 406 can be performed simultaneously with an autofocus mechanism of the camera 404 as the camera 404 attempts to focus on the subject to acquire a focused image. Due to the incorporation of the anti-spoofing feature into the autofocus process, the anti-spoofing process would run unnoticed and would be less susceptible to defeat with a presentation attack.

In some embodiments, the first point can be a point behind the face of the subject and the second point can be a point in front of the face of the subject. In some embodiments, the first point can be a point in front of the face of the subject and the second point can be a point behind the face of the subject. The images 408 captured therefore display different points of focus between the first and second points. The sweep of focus shows the three-dimensional relief of a real face which is qualitatively different from that of a sheet of paper (even if the paper is bent). As an example, due to the three-dimensional configuration of a face of a living subject, the sequence of captured images 408 can include one image 408 showing the tip of the nose in focus while the remaining image 408 is out of focus, a second image 408 showing the top edges of the cheekbones in focus while the remaining image 408 is out of focus, a third image 408 showing the eyes in focus while the remaining image 408 is out of focus, a fourth image 408 showing the ears in focus while the remaining image 408 is out of focus, and the like.

In contrast, a facsimile image may define a two-dimensional form that results in substantially straight lines of constant focus with no closed contours. As an example, the sequence of captured images 408 for an unbent/flat facsimile image can include one image 408 showing the entire image 408 out of focus, a second image 408 showing the entire image 408 in focus when the focal plane is aligned with the plane of the facsimile image, and a third image 408 showing the entire image 408 out of focus. As a further example, the sequence of captured images 408 for a bent facsimile image can include one image 408 showing a substantially vertical line of constant focus extending along the entire central line of the image 408, a second image 408 showing two substantially vertical lines of constant focus extending across the entire image 408 and offset from the central line of the image 408, and a third image 408 showing two substantially vertically lines of constant focus extending across the entire image 408 and offset even further from the central line of the image 408.

In some embodiments, the processing device 124 can receive as input the sequence of images 408 captured by the camera 404 and outputs or forms a topographic map 410 of the face of the subject. The topographic map 410 can display the different levels of focus captured in the images 408 based on the change in focus of the lens 406. The different levels of focus can be represented as smooth curving surfaces corresponding to the contours of the subject.

The analysis module 112 receives as input the images 408 and/or topographic map 410, analyzes one or more regions of each image 408 and/or the topographic map 410 for sharpness of the contours, and determines whether the contours of each image 408 and/or the topographic map 410 correspond to contours of a live subject. Due to the three-dimensional structure of the face of a live subject, the image 408 or topographic map 410 is expected to include closed contours. Due to the two-dimensional structure of a facsimile image (even if curved), the image 408 or topographic map 410 corresponding to the facsimile image will include either an entire image 408 in focus or substantially straight lines of constant focus with no closed contours. A computationally efficient focus metric can be used to show the closed contours of a real face, corresponding to planes of equally good focus, which cannot be easily reproduced by a sheet of paper. This is especially the case if the paper facsimile image must simultaneously maintain its integrity including features such as irises, thereby precluding origami-like folding.

The system 400 can use fixed focus optics that establish a single plane in space relative to the camera 404 at which an object is in optimal focus. About this plane in either direction, the quality of focus decreases. A depth of field exists within a depth range on either side of optimal focus inside of which an object is in adequate focus. Within the depth range on either side of the optimal focus inside of which a person can be identified by biometric means can be referred to as the biometric depth of field.

The system 400 can use variable focus optics that enable focusing on an object within a certain range. Because the plane of focus can be moved, the overall range for obtaining a focused image is greater than the biometric depth of field for a fixed focus system. For a stationary object, a sweep of the lens 406 position relative to the camera 404 produces a sweep of the plane of focus in object space. For example, with the lens 406 in a position close to the camera 404, the plane of focus can be behind the object and the object, in that case, would be out of focus. With the lens 406 further from the camera 404, the object can be in good focus. With the lens 406 further still relative to the camera 404, the plane of focus can be in front of the object and the object would, once again, be out of focus.

Thus, sweeping the camera 404 focus can produce a sequence of images 408 with the focal plane moving incrementally from behind the object, through the object, to in front of the object. If the object has relief, as would a living human face, the sequence of images 408 would include one image 408 that shows the tip of a subject's nose in sharp focus but the eyes out of focus, and a second image 408 that shows the nose out of focus but the eyes in sharp focus. The depth of field of the camera 404 can be shallow relative to the length of the human nose by having a fast lens 406 at close range where the depth of field can be very shallow.

The analysis module 112 can use a focus metric to analyze local regions of an image 408 for sharpness. Blur causes the metric to register a low value while sharp focus causes the same metric to register a high value. In an image 408 in which a subject's eyes were focused but the subject's nose was out of focus, the focus metric can show relatively similar values through the eye region and decreasing values toward the tip of the nose. The focus metric can provide a topographic map 410 of the face (putting aside the ambiguity on the close and far sides of focus) to show the distinct features of a face.

In contrast, a topographic map 410 shows distinctly different features for a facsimile sheet of paper on which a high quality facial image with accurate iris images is printed. In the case of a flat sheet of paper, the topographic map 410 can show substantially straight lines of constant focus depending on the tilt of the paper relative to the optical axis of the camera 404. If the paper is smoothly bent in a curve during presentation to the camera 404, the contours of constant focus metric can also be substantially straight lines but with a more complex structure. In either situation, there are no closed contours on a sheet of paper since this would require wrinkling the paper which would destroy the integrity of the image on the paper as seen by the camera 404.

Differentiating a real face from one printed on a sheet of paper, whether or not the paper is curved, is therefore a matter of analyzing and judging the contours of the focus metric which would be generated in the course of focusing the image 408 prior to recording the image 408 for biometric identification or verification. As discussed above, the analysis module 112 receives the captures images 408 and analyzes the contours to determine whether a living subject or a facsimile image is being presented to the system 400. A combined defense, such as a blink detection system 414 and/or a glance detection system 416 (or any of the alternative systems described herein), can be incorporated into the system 400 to provide an additional anti-spoofing defense that would require the mask to reproduce difficult motions, with each system determination being weighted in the final decision of whether the image is of a live subject or a facsimile.

For example, the system 400 can include an active subject response module 412 that is executed in conjunction with the anti-spoofing features discussed herein to provide additional detection of liveness of the subject. In some embodiments, the active subject response module 412 can include a blink detection system 414 configured to detect blinking of the subject during capture of the sequence of images 408. For example, the blink detection system 414 can operate in conjunction with the analysis module 112 to analyze the images 408 and detect one or more images in which the eyes of the subject are closed or in the process of blinking. In some embodiments, the active subject response module 412 can include a glance detection system 416 configured to detect changes in the glance of the subject during capture of the sequence of images 408. For example, the glance detection system 416 can operate in conjunction with the analysis module 112 to analyze the images 408 and detect one or more images in which the pupils of the subject change positions during capture of the sequence of images 408. In some embodiments, the two or more systems described herein (and/or alternative defense systems) can be combined, with each system determination being weighted in the final decision of whether the image is of a live subject or a facsimile.

Figure 8A:
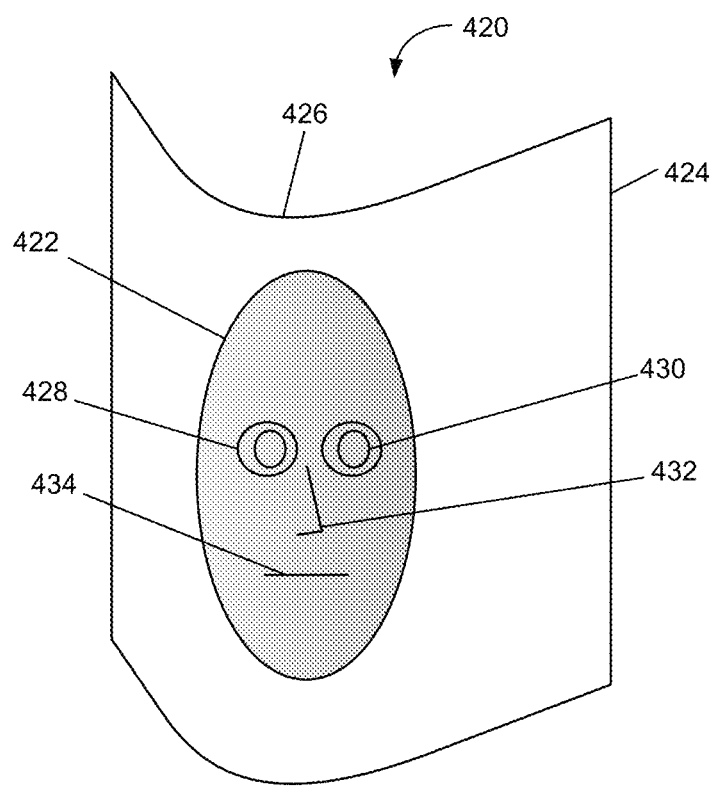
FIGS. 8A-8B are diagrammatic views of a facsimile image and a live subject in accordance with the present disclosure.
Figure 8B:
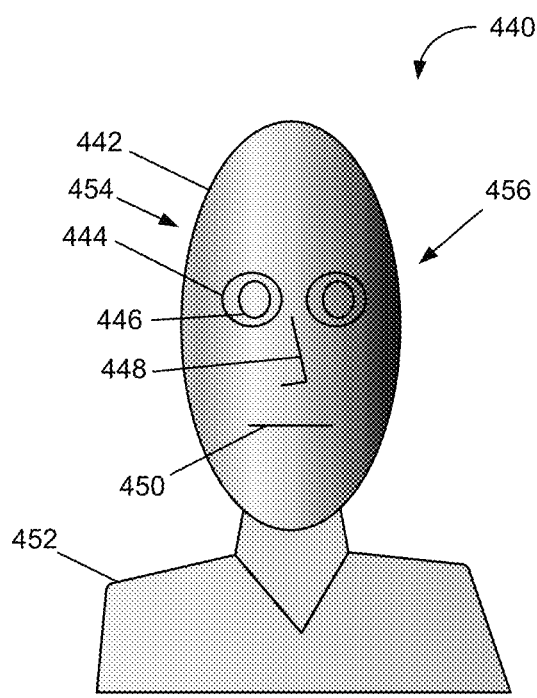

FIGS. 8A-8B show diagrammatic views of a facsimile image 420 and a live subject 440, respectively. The facsimile image 420 can be in the form of a face 422 printed on a sheet of paper 424. The sheet of paper 424 can be presented to the system 400 in a substantially flat configuration or can include curves 426 in an attempt to form a three-dimensional face 422. The face 422 includes eyes 428 with irises 430, a nose 432, a mouth 434, and other features depicting a realistic face. The face 422 can be printed in the appropriate colors to match colors of a real iris. The live subject 440 of FIG. 8B includes a three-dimensional head 442 with eyes 444, irises 446, a nose 448, a mouth 450, a body 452, and other features of a living face. Based on the illumination of the live subject 440, the face can include different shading patterns on the sides 454, 456 of the face.

Figure 9:
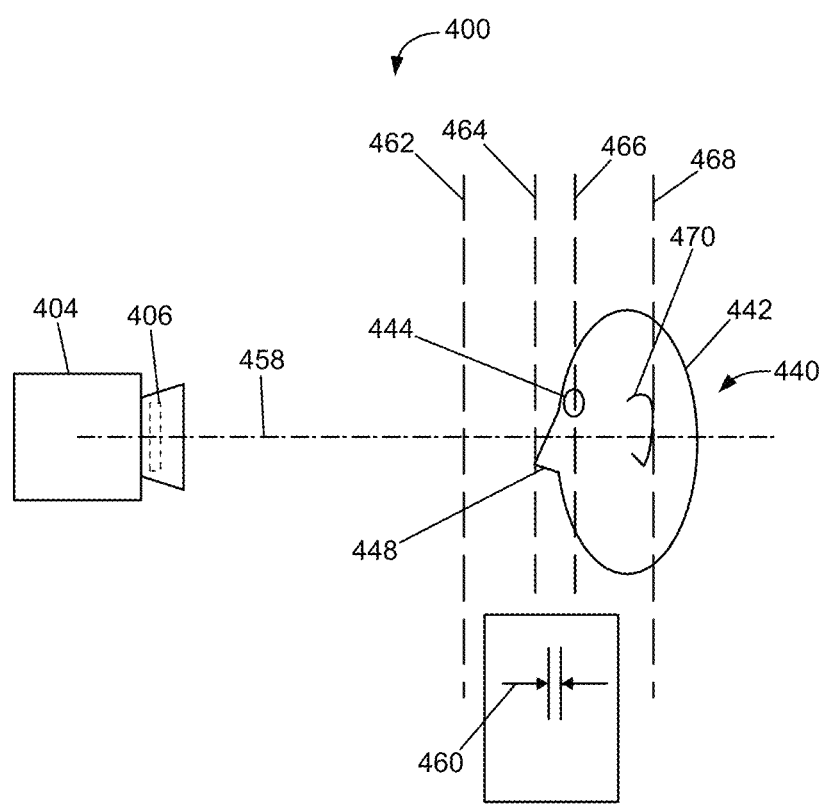
FIG. 9 is a diagrammatic view of a fourth embodiment of an exemplary biometric analysis system of FIG. 7.

FIG. 9 is a diagrammatic side view of the system 400. The system 400 includes a camera 404 with a movable lens 406, thereby allowing the camera 404 to change the point of focus. The camera 404 is configured to capture a sequence of images of the living subject 440. The axis 458 represents an optical axis extending from the camera 404 that focuses on a plane in object space. The depth of field 460 of the camera 404 is arranged to be shallow. Planes 462-468 (e.g., planes substantially perpendicular to the optical axis 458) represent some of the planes of focus as the lens 406 incrementally moves.

The head 442 of the subject 440 is at a distance from the camera 404 and the depth of field 460 of the camera is small compared to the distance from plane 464 at the tip of the subject's nose 448 to plane 466 at the subject's eyes 444. The conditions for the depth of field 460 of the camera 404 can be met by selecting the appropriate lens aperture, lens focal length, and distance from the camera 404 to the subject 440.

When the camera 404 is focused on plane 462, the subject 440 is entirely out of focus. At plane 464, the subject's nose 448 is in sharper focus than the subject's eyes 444 and ears 470. At plane 466, the subject's eyes 444 (and cheeks) are in sharper focus than the tip of the nose 448 and the ears 470. At plane 468, the subject's ears 470 are in sharper focus than the nose 448, eyes 444 and remaining features of the face. If a facsimile image is presented to the system 400, rather than having some areas in focus and others out of focus, the facsimile image would have straight lines of constant focus. For example, at plane 466, the entire representation of the eyes, cheeks and mouth would be along a straight line of focus due to the lack of three-dimensionality of the facsimile image.

Figure 10A:
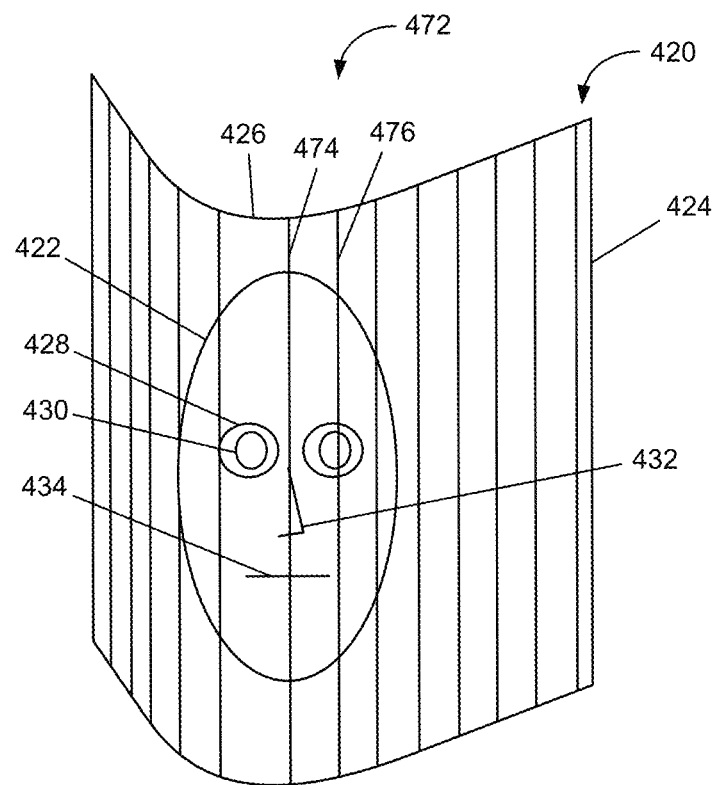
FIGS. 10A-10B are diagrammatic views of topographical maps generated by the biometric analysis system of FIG. 7.
Figure 10B:
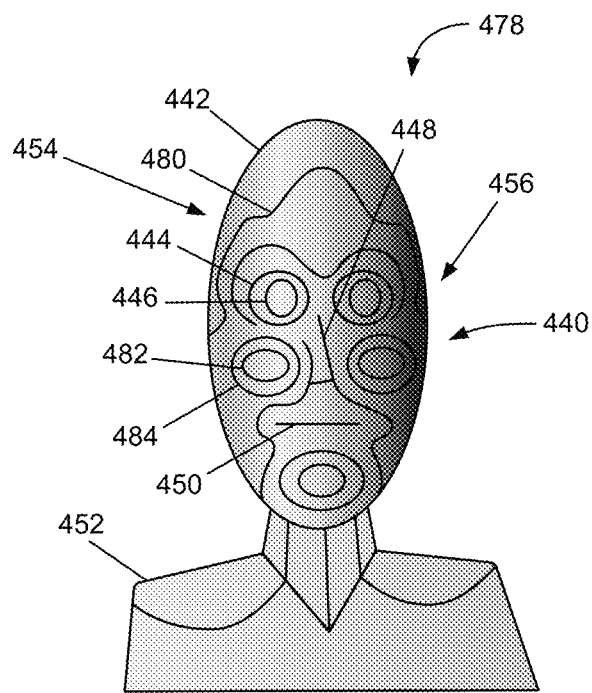

FIGS. 10A-10B are diagrammatic views of topographical maps 472, 478 for the facsimile image 420 and the live subject 440, respectively. Although illustrated as topographical maps 472, 478, it should be understood that the topographical maps 472, 478 are compiled from a sequence of images and such images can be analyzed individually to determine the contours of focus. With respect to FIG. 10A, due to the two-dimensionality of the facsimile image 420, the topographical map 472 shows straight lines 474, 476 of constant focus superimposed on the face 422 based on the different planes of focus when the images were captured by the camera 404. The straight lines 474, 476 of constant focus therefore extend the entire length of the image and do not show changes in structure of a living subject 440. For example, line 474 shows constant focus along the forehead, nose 432, mouth 434, and chin of the image 440 due to the two-dimensional form of the image 440. In contrast, a live subject 440 has various reliefs and changes in structure along the same plane which would not result in the same line 474 of focus.

With respect to FIG. 10B, due to the three-dimensionality of the face of the living subject 440, the topographic map 478 shows changing lines 480, 482, 484 of focus due to the complex structure and relief of the face of the living subject 440. The topographic map 478 also shows lines 482, 484 of closed contours where some areas of the face, such as the cheeks, are in focus compared to other areas of the face. The difference in topographical complexity is used by the system 400 to distinguish a facsimile paper presentation attack from a real presentation.

Figure 11:
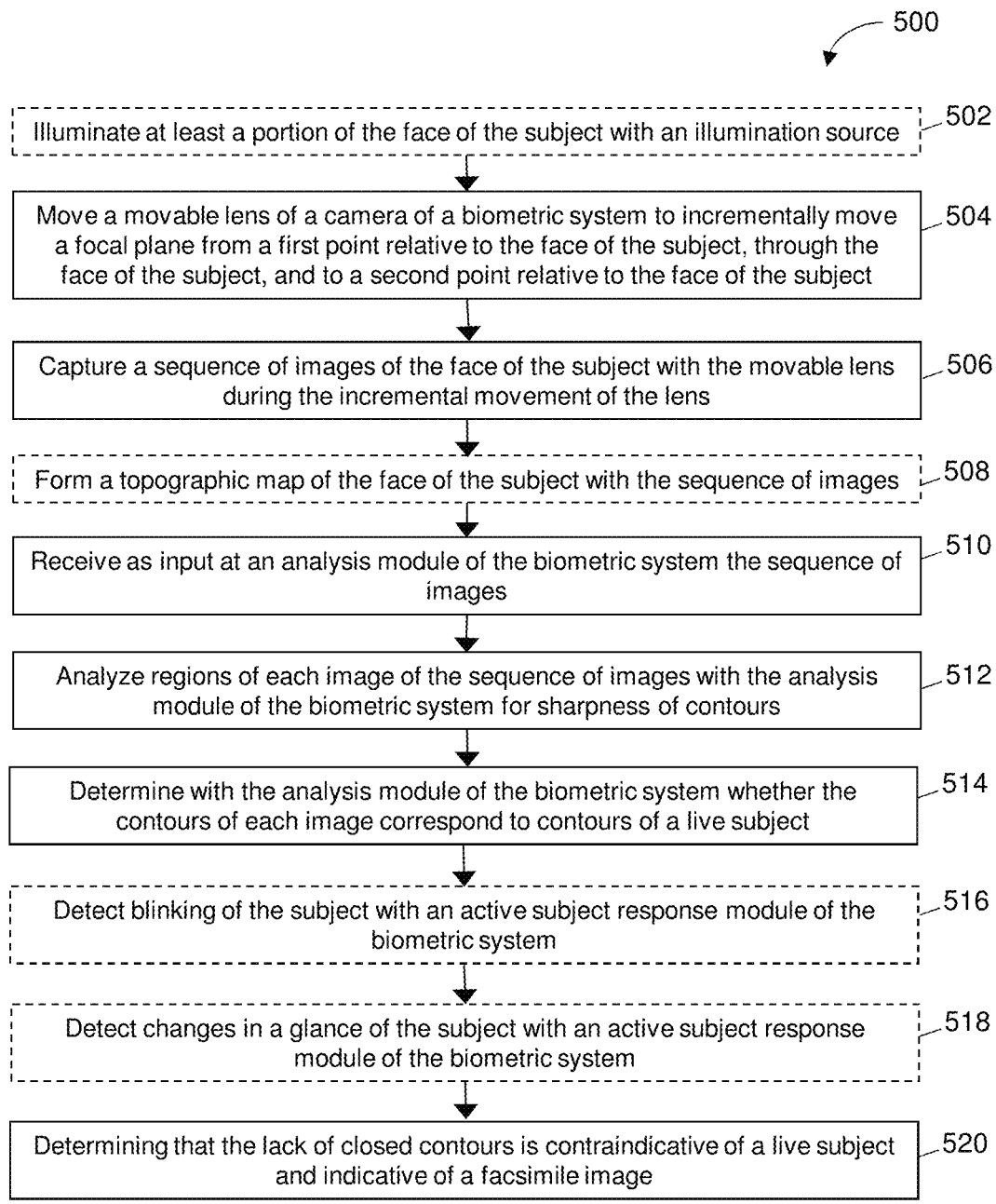
FIG. 11 is a flowchart illustrating an exemplary process of implementing the biometric analysis system of FIG. 7.

FIG. 11 is a flowchart illustrating an exemplary process 500 of implementing the system 400. To begin, at step 502, at least a portion of the face of the subject can be optionally illuminated with an illumination source. At step 504, a movable lens of a camera is moved to incrementally move a focal plane from a first point relative to the face of the subject, through the face of the subject, and to a second point relative to the face of the subject. At step 506, a sequence of images of the face are captured with the movable lens (e.g., the camera) during the incremental movement of the lens. At step 508, a topographic map of the face of the subject can optionally be formed from the sequence of images.

At step 510, the analysis module receives as input the sequence of images (and/or the topographic map). At step 512, regions of each image are analyzed with the analysis module for sharpness of contours (and the existence of closed contours). At step 514, the analysis module determines whether the contours of each image correspond to contours of a live subject. At step 516, an active response module can optionally detect blinking of the subject. At step 518, the active subject response module can optionally detect changes in a glace of the subject. In some embodiments, one or more biometric analysis systems described herein and/or alternative defense systems can be combined, with the determination from each system being weighted in the final decision of whether the image is of a live subject or a facsimile. At step 520, the analysis module determines whether the lack of closed contours is contraindicative of a live subject and indicative of a facsimile image, thereby discrediting the subject as a facsimile image based on substantially straight lines of constant focus with no closed contours. The analysis module can authenticate the subject as a live subject based on a detection of closed contours in the images.

Figure 12:
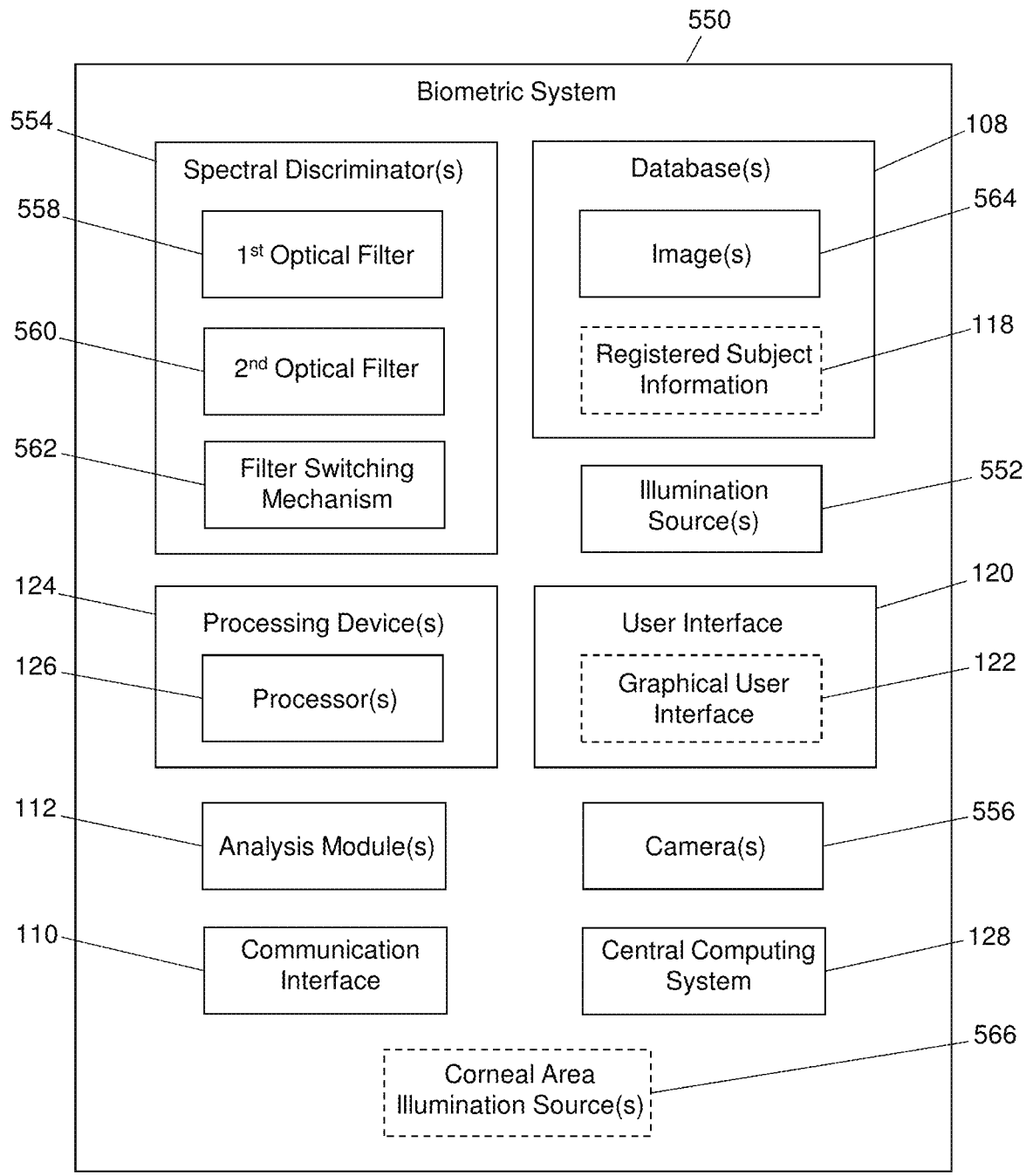
FIG. 12 is a block diagram of a fifth embodiment of an exemplary biometric analysis system in accordance with the present disclosure.

With reference to FIG. 12, a block diagram of a fifth embodiment of an exemplary biometric analysis system 550 (hereinafter "system 550") is provided. The system 550 ensures the authenticity of a subject or user of an iris identification system by applying different optical filters while capturing the images that affect the corneal reflection, thereby thwarting spoofing by a presentation attack. The different embodiments of operation of the system 550 based on the spectral characteristics described herein can be used individually or in combination to prevent spoofing.

The system 550 includes one or more illumination sources 552 configured to illuminate one or both irises of the subject. The illumination source 552 can emit near infrared light. The system 550 includes a spectral discriminator 554 that can be incorporated into the one or more cameras 556. The spectral discriminator 554 includes a first optical filter 558 and a second optical filter 560 (and can include additional optical filters). The first optical filter 558 has first set of pass characteristics that are different from the second set of pass characteristics of the second optical filter 560. For example, the first set of pass characteristics can allow passage of only light visible to the human eye through the first optical filter 558 (e.g., a wavelength range from about 380 nm to about 780 nm). As a further example, the second set of pass characteristics can allow passage of only near infrared light through the second optical filter 560 (e.g., a wavelength range of about a 30 nm band about a wavelength of about 850 nm).

The spectral discriminator 554 includes a filter switching mechanism 562 configured to selectively switch between the first and second optical filters 558, 560 at a predetermined or varying interval of time to receive light scattered from the iris through the first optical filter 558 or the second optical filter 560. The system 550 includes the camera 556 configured to capture one or more images 564 of the subject during passage of the light scattered from the iris through the first optical filter 558, and further configured to capture one or more images 564 of the subject during passage of the light scattered from the iris through the second optical filter 560. In some embodiments, two cameras 556 can be used to substantially simultaneously capture the images 564 (e.g., the first camera 556 capturing images 564 of the light scattered through the first optical filter 558 and the second camera 556 capturing images 564 of the light scattered through the second optical filter 560). In some embodiments, a single camera 556 can be configured to capture a sequence of images 564 in rapid succession during passage of the light scattered from the iris through the first optical filter 558, the filter switching mechanism 562 can be configured to switch from the first optical filter 558 to the second optical filter 560, and the camera 556 can be configured to capture a sequence of images 564 in rapid succession during passage of the light scattered from the iris through the second optical filter 560.

The captured images 564 during passage of the light scattered from the iris through the first optical filter 558 can be red-green-blue images (e.g., color images). In contrast, the captured images 564 during passage of the light scattered from the iris through the second optical filter 560 can be near infrared images that display the structural information about the iris. The analysis module 112 receives as input the captured images 564 and determines whether a match exists between the iris structural information displayed in the images 564 captured during passage of light through the first and second optical filters 558, 560. If a match does not exist, the analysis module determines that the lack of a match is indicative of a live subject, and therefore identifies the subject as a live subject.

In particular, the characteristic specular reflection of the near infrared corneal reflection due to the applied source of near infrared light can be tested for veracity. A printed paper spoof cannot display a corneal reflection that appears and disappears as different internal optical filters 558, 560 are applied and therefore can be identified as a fake by the system 550. The system 550 introduces an optical filtering system in the form of the spectral discriminator 554 that can distinguish a real iris from a presentation attack by using two or more optical filters 558, 560 having different sets of pass characteristics. The computational aspect performed by the analysis module 112 can operate in the first stage of iris recognition (e.g., the eye finding stage) and can therefore operate quickly with little computational overhead.

The system 550 includes an image sensor subsystem that is sensitive to human-visible and near infrared light (e.g., incorporated into the camera 556), an optical filtering subsystem (e.g., the spectral discriminator) that modifies the spectrum of light reaching the sensor, a lens subsystem that creates an image 564 of an iris on the sensor (e.g., the camera 556), and an illumination subsystem (e.g., the illumination source 552) that provides near infrared light for imaging the unique structure of the iris. The illumination source 552 can optionally provide auxiliary visible illumination for cases of dim ambient light. The system 550 can include instructions or software for securely automating the hardware and, ultimately, for rendering an iris image 564 appropriate for iris recognition.

As noted above, the system 550 uses the spectrum of light imaged by the system 550 as the basis for distinguishing a real iris from a fake iris. The system 550 makes two or more measurements, each of which is sensitive to different optical spectra. Based on the measured spectral characteristics, the analysis module determines whether the presented iris is of a live subject or a facsimile image. Illumination of the iris in the near infrared band of light is used to penetrate the pigment often present in the first surface of the iris. Near infrared light scattered from the iris returns to the imaging system (e.g., the camera 556) with information about the structure of the iris that has been found to be unique to the subject.

Because the near infrared illumination strikes the smooth and shiny cornea of the eye before scattering from the iris, a specular reflection from the cornea is typically present in every iris image 564. The specular reflection (e.g., specularity) is typically a small spot within the iris image 564 that is saturated or nearly saturated because of the intensity of the glint of light from a small area of the reflective cornea. Because the specularity is a reflection of the near infrared illuminator of the system 550, the spectrum of light of the specularity is that of the near infrared illuminator. Although there may be other specular reflections that return to the camera 556 due to other sources of light incident upon the cornea (e.g., sunlight or room light), these other specularities are typically dimmer than that applied by the near infrared illumination source 552 and are always in a different place on the cornea than that of the near infrared illumination source 552. In particular, because of the relative placement of the near infrared illuminator and the lens of the camera 556, the specularity of the near infrared illuminator is well known. For example, the near infrared specularity can be in the upper right quadrant of a subject's cornea over the subject's pupil or, in the case of multiple illumination sources 552, a pair of near infrared specularities can be on opposite sides of the middle of the subject's pupil. Therefore, the system 550 can detect in advance with relatively high precision where the near infrared specularity is expected to appear.

In the case of a presentation attack, the attacker produces a facsimile of a human iris to spoof the system 550. A facsimile can, for the purposes of illustration, be a photograph of an iris printed on paper and positioned in front of the system 550 in such a way to appear as if it is a real iris. Such a photograph must be realistic enough to include iris information expected of a real iris that is near infrared illuminated (e.g., spectral information about the iris). In addition, the facsimile must appear realistic under the near infrared illumination of the system 550 and, as such, must be printed with appropriate materials on an appropriate surface such as paper. Having satisfied the requirements of a realistic iris under near infrared illumination, the spoof must include the iris of a person enrolled in the iris recognition system.

In the system 550, one of the first algorithmic steps can be the step of eye finding in which a scene is searched for evidence that an eye or pair of eyes is present before proceeding to the next step. One method for detecting the presence of eyes searches for the telltale specular reflections on a subject's corneas that are characteristic of the near infrared illuminators of the system 550. Once found, the system 550 detects the unique iris information encoded in the subject's iris. The system 550 incorporates a set of measurements that test the iris and its specularity for its spectral content.

An example of a spectral test of an iris image 564 passes the light collected by the lens of the system 550 through the spectral discriminator 554. As noted above, the spectral discriminator 554 can be formed of a pair of optical filters 558, 560 of different sets of pass characteristics (e.g., the first optical filter 558 can pass only light visible to humans, typically spanning the wavelength range from about 380 nm to about 780 nm, and the second optical filter 560 can pass only light emitted by the near infrared illuminator, such as a 30 nm band about the illuminator center wavelength of about 850 nm).

The first optical filter 558 completely blocks the near infrared specular reflection from reaching the camera 556 and, as a result, the iris imaged through the first optical filter 558 includes human-visible light without the characteristic near infrared specular reflection (e.g., a red-green-blue image). The second optical filter 560 passes only light in the same band as the near infrared illuminator, and the iris imaged through the second optical filter 560 includes the near infrared specularity and the unique structural information about the subject's iris (e.g., a near infrared image). In some embodiments, the filters 558, 560 can be selectively passed in front of a single camera 556, or multiple cameras 556 can use different filters 558, 560.

As an example, below is a consideration the difference between the red-green-blue and near infrared images 564 of a real iris and the red-green-blue and near infrared images 564 of a facsimile iris in a presentation attack. A near infrared image 564 of a real iris displays the iris structure independent of iris pigmentation and further displays the near infrared specularity. The red-green-blue image 564 of the real iris displays the iris pigmentation that might or might not hide iris structure, and displays no evidence of the near infrared specularity.

In contrast, a near infrared image 564 of a facsimile iris printed on paper can display the iris structure needed to verify the iris identity and can display the iris specularity needed by the eye-finding routine of the system 550. However, the red-green-blue image 564 displays the same iris structure, since it is printed on the fake iris photograph, and further displays evidence of the near infrared specular reflection since it is also printed in the expected location on the fake iris photograph. It is noted that sufficient ambient illumination should be available to allow an accurate red-green-blue image 564 to be captured. If the ambient light level is insufficient to create the red-green-blue image 564, auxiliary visible light can be provided from an alternative illumination source 552 (e.g., one or more white light-emitting diodes (LEDs)).

In some embodiments, a means of using spectral information to distinguish the real iris from the fake iris involves analyzing images 564 to determine if a match exists between the iris structural information displayed in the red-green-blue and near infrared images 564. If a match exists or if a substantial portion of the images 564 matches, the analysis module 112 can determine that the match is indicative of a facsimile image, thereby discrediting the subject as a facsimile image since the pigment of real irises typically blocks the structural information seen in the near infrared spectrum. Occasionally, in the case of lightly pigmented (e.g., blue) irises, so little pigment exists in front of the iris that an iris viewed in the red-green-blue band can match that viewed in the near infrared band. The analysis module 112 can be configured to accurately review the images 564 to detect the iris structural information and distinguish between the red-green-blue and near infrared images 564 even in lightly pigmented irises. If the analysis module 112 detects a difference or non-match between near infrared and red-green-blue images 564, the analysis module 112 can determine that the difference or non-match is indicative of a live subject, thereby identify the subject as a live subject.

In some embodiments, a means of using spectral information to distinguish the real iris from the fake iris involves analyzing the images 564 for the presence of the near infrared specularity. For a real iris, a specularity in the position known to be aligned with the illumination produced by the near infrared illuminator is displayed in the near infrared image and is not displayed in the red-green-blue image since it is blocked by the red-green-blue filter (e.g., the first optical filter 558). For a fake iris, the near infrared specularity that is required by the eye-finder routine is present in both the red-green-blue and near infrared iris images 564. This occurs because the specularity is simply printed in the presentation attack spoof as a light spot on the cornea in the right place and reflects human-visible light as well as the near infrared light. A near infrared specularity found in both the red-green-blue and near infrared images indicates a fake iris image. Again, it is noted that sufficient ambient illumination should be available to allow an accurate red-green-blue image 564 to be captured. If the ambient light level is insufficient to create the red-green-blue image 564, auxiliary visible light can be provided from an alternative illumination source 552 (e.g., one or more white light-emitting diodes (LEDs)).

In some embodiments, a means of using spectral information to distinguish the real iris from the fake iris involves the use of the temporal information related to the acquisition of the near infrared and red-green-blue images 564. For example, an iris acquisition routine can start by obtaining several red-green-blue images 564 with the camera 556 in rapid succession by using the red-green-blue filter (e.g., the first optical filter 558), and then rapidly switches to near infrared images 564 by changing the filter set from the red-green-blue filter to the near infrared filter (e.g., the second optical filter 560) and captures near infrared images 564 with the camera 556 in rapid succession. The filter switch timing can be known to the system 550 and the resulting images 564 can be labeled by the camera 556 and/or the analysis module 112 appropriately. In some embodiments, the filter switch timing and/or frequency can be varied with each transaction. The presentation attacker does not know the filter switch timing and, even if the attacker had prepared images appropriate for each filter set, the attacker would not know when to present the appropriate image. Thus, the temporal information associated with capturing the images 564 can be used to prevent spoofing of the system 550.

In some embodiments, a means of using spectral information to distinguish the real iris from the fake iris can use information gathered from areas surrounding the subject's eyes (e.g., the ocular areas) or alternatively from the subject's entire face. The camera 556 can be configured to capture one or more images 564 of areas surrounding the iris of the subject. A presentation that is gray-shade only (e.g., monochrome) cannot present a face or ocular regions that are realistic in terms of pigmentation. Detection by the analysis module 564 of one or more monochrome regions from the red-green-blue image 564 of a subject can indicate a fake iris, providing another level of anti-spoofing.

In some embodiments, the system 550 can incorporate additional features of anti-spoofing in combination with the spectral methods described above. In some embodiments, the system 550 can detect the structure of the near infrared specular reflection on the cornea. Specular reflections from a cornea are bright and, as such, typically saturate the iris image sensor that is set up to detect the low contrast and dim imagery from the iris (e.g., internal to the camera 556). In contrast, specular reflections from a paper printed spoof iris display bright regions on a photograph. The bright regions do not saturate the image sensor even when illuminated by the bright near infrared light from the system 550. Thus, one process of detecting a spoof iris image with the system 550 can include examining the structure of a corneal specularity expected from the near infrared illuminator. A real iris image 564 having saturated specularity displays a flat distribution of intensity across its area, and substantially all pixels read the maximum possible value because they are clipped by the saturation of the image sensor. In contrast, an image 564 of a fake specularity typically displays a maximum value below a saturated value and a distribution of values typical of a bright part of the iris image.

In this process, a specular reflection found in the appropriate position due to the near infrared illuminator is analyzed with the analysis module 112 for its structure. A specular reflection that shows a peaked distribution of pixel intensities rather than a clipped, flat distribution is likely to result from a facsimile photograph of a specularity rather than a real specularity. There are exceptions. First, a real eye imaged from a large distance may reflect less light than is required to saturate a sensor. If such a distance is still within a recognition range, the dim specular reflection may be mistaken by the analysis module 112 for a photographic spoof of a specularity. Second, if a photographic spoof is prepared with a specially designed and highly reflective area coincident with the position of the specular reflection, the spoof may produce a specular reflection that saturates the imager and may be mistaken by the analysis module 112 for a real iris.

However, for both cases, the specular reflections analyzed for structure by the analysis module 112 can also undergo additional anti-spoofing analysis (as described above) to ensure the authenticity of the subject. In particular, the specular reflections analyzed for structure need to also have the correct spectral content when viewed through the red-green-blue filter (e.g., the first optical filter 558) discussed above. Although the spectral content analysis can be performed independently, a combination of the spectral content and spectral reflections analysis can also effectively reduce the possibility of mistaking a spoof image for a real image. In addition, the problem of dim specular reflections can be mitigated by testing for iris distance by examining iris diameter, which can be a reliable way of establishing distance to within approximately 20%. If an iris is determined to be within a distance expected to produce a saturated specularity and if, at that distance, it does not, the analysis module 112 can discredit the image as a fake iris.

In some embodiments, the system 550 can be used in combination with alternative systems described herein, with the determination of each system being weighted for the final decision of whether the subject is a live subject or a facsimile. For example, the system 550 can incorporate pupillometry to provide additional anti-spoofing protection for iris recognition under low ambient light conditions. For purposes of pupillometry, the system 550 can include one or more corneal area illumination sources 566 configured to illuminate a corneal area of the subject to instigate contraction of a pupil of the subject. The camera 556 is configured to capture a sequence of images 564 of the subject during contraction of the pupil. The analysis module 112 is configured to receive the images 564 and measures a diameter of the pupil before and during contraction to determine a liveliness of the subject. In particular, pupillometry measures the diameter of the pupil of the eye, the hole in the center of the iris that admits light into the eye. In most cases, a live human iris changes diameter in response to a perceptible change in ambient light level. Irises dilate as the ambient light level drops and contract as ambient light level rises.

If a subject is using the system 550 under bright or modestly lit ambient conditions, the pupils of the subject will likely be modest in size or small. Under these conditions, the same subject attempting to spoof the system 550 using a photograph of another subject's iris could create iris images 564 through the red-green-blue filter that show a specular reflection in the red-green-blue band due to the ambient light scattering from the bright spot of the fake iris photograph corresponding to the specular reflection. Such a presentation attack would therefore be thwarted by the spectral content and/or spectral reflection analysis.

If, however, a subject presents a spoof iris to the system 550 under dim or dark ambient conditions, the red-green-blue image 564 of the spectral content analysis may not display a specularity because the entire image would be dark in the red-green-blue band. The spectral content analysis would therefore not show an indication of a specular reflection, but the near infrared image of the spectral content analysis would show a specularity due to the near infrared illumination scattering from the fake specularity in the spoof image. The spectral content analysis may therefore be less effective in cases of very dim ambient lighting. The spectral reflection analysis may function appropriately under dim ambient lighting, although cases of distant irises may create unsaturated near infrared specularities.

An auxiliary visible light source (e.g., one or more visible wavelength light-emitting diodes (LEDs)) can be used to augment the ambient illumination. Alternatively, a visible spectra light emitted by a display screen of the graphical user interface 122 can provide a reasonable amount of ambient illumination for the camera 556 to capture images 564 that can be appropriately analyzed by the analysis module 112. The LED or bright display can provide extra ambient light that would illuminate the specular reflection of a fake iris photograph and would cause the spectral content analysis to indicate a specularity in a red-green-blue image 564, which would be determined by the analysis module 112 to be a spoof image. The LED or bright display can also cause a subject's pupils to contract to a size reasonable for iris recognition.

In some embodiments, pupil contraction can be captured by images 564 acquired in rapid sequence as the LED is turned on or the display is brightened, and could be captured in either the red-green-blue or near infrared bands. Therefore, in the case of dim or dark ambient lighting, the extra ambient light would enable the spectral content analysis to be performed and, in tandem, could detect liveness through pupillometry by searching for the contraction of a live iris. Detection of a lack of contraction in dark ambient conditions upon stimulation of a LED (or display) imaged in the near infrared band by the system 550 could indicate a presentation of a spoof in the form of an static iris printed on paper. The different embodiments or components of the system 550 can therefore be used individually or in combination to verify the liveness of the iris over a wide range of distances and ambient lighting conditions, creating a high level of difficulty in spoofing the system 550 via a presentation attack.

Figure 13A:
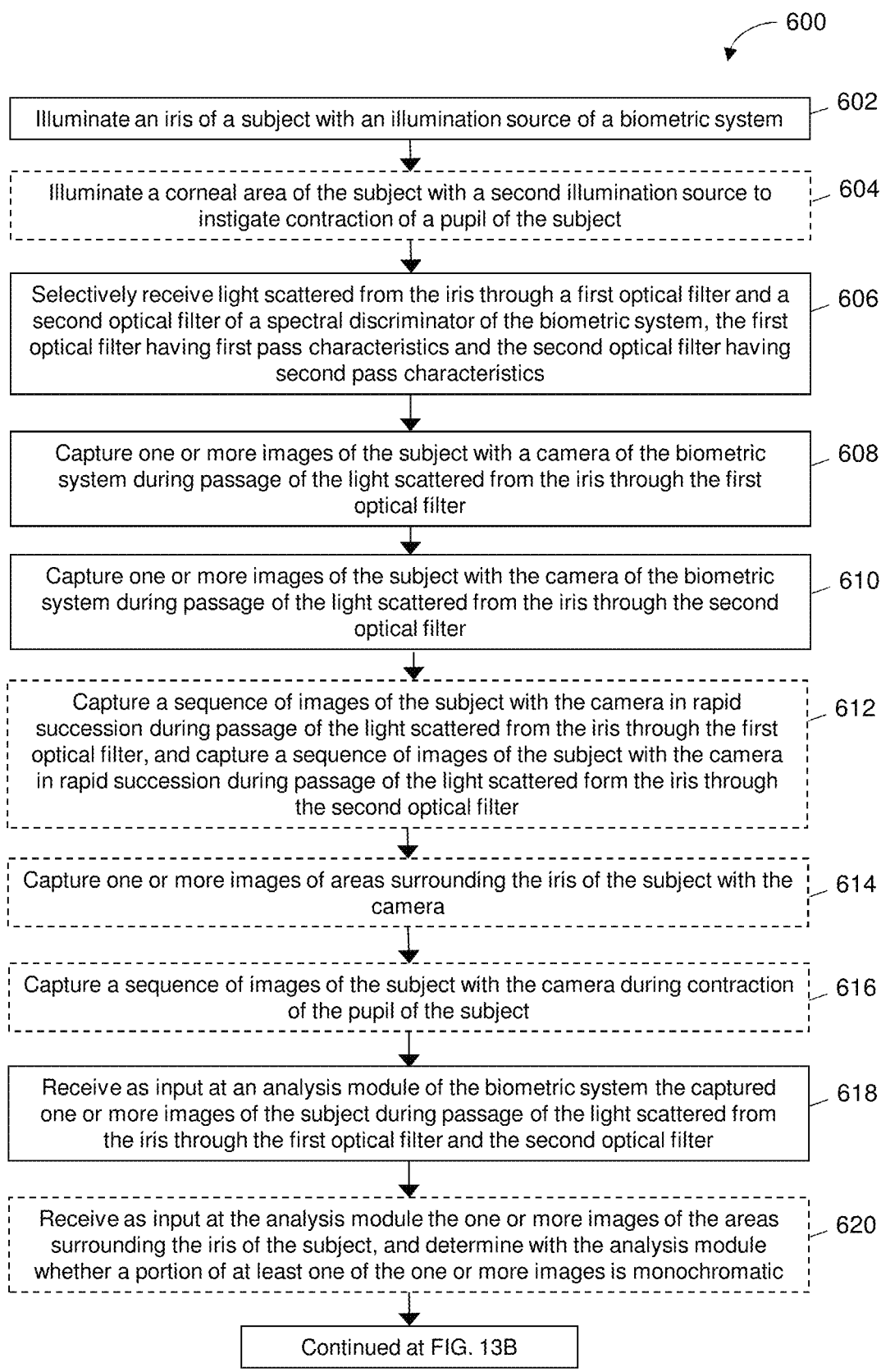
FIGS. 13A-13B are a flowchart illustrating an exemplary process of implementing the biometric analysis system of FIG. 12.
Figure 13B:
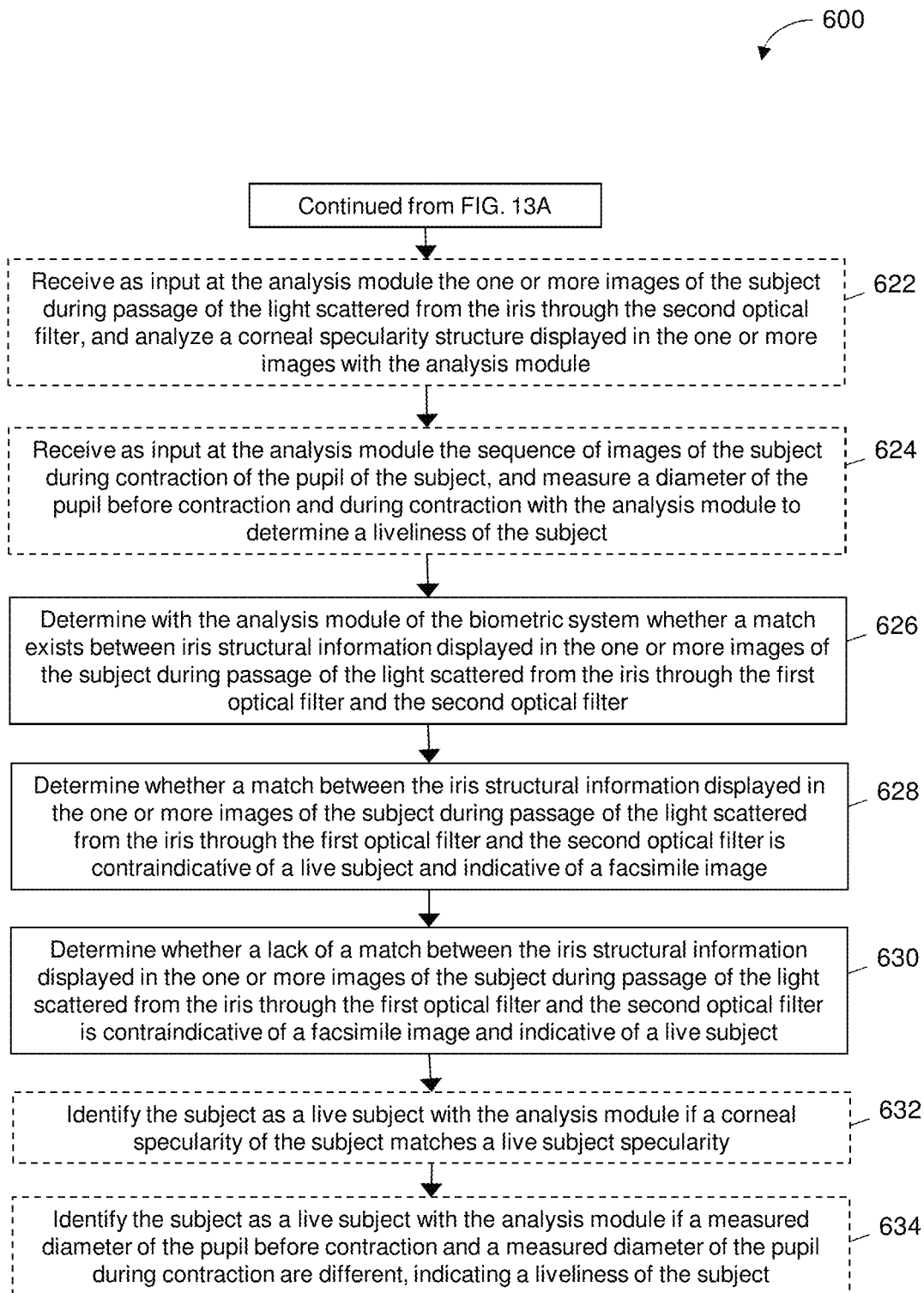

FIGS. 13A-13B are a flowchart illustrating an exemplary process 600 of implementing the system 550. To begin, at step 602, an iris of the subject is illuminated with an illumination source. Optionally, at step 604, a corneal area of the subject can be illuminated with a second illumination source to instigate contraction of a pupil of the subject. At step 606, light scattered from the iris is selectively received through a first optical filter and a second optical filter of a spectral discriminator, each filter having different sets of pass characteristics. At step 608, one or more images of the subject are captured with a camera during passage of the light scattered from the iris through the first optical filter. At step 610, one or more images of the subject are captured with the camera (or a different camera) during passage of the light scattered from the iris through the second optical filter. In some embodiments, steps 608 and 610 can occur substantially simultaneously.

Optionally, at step 612, a sequence of images of the subject can be captured with the camera in rapid succession during passage of the light scattered from the iris through the first optical filter, and subsequently a sequence of images of the subject can be captured with the camera in rapid succession during passage of the light scattered from the iris through the second optical filter. Optionally, at step 614, one or more images of areas surround the iris of the subject can be captured with the camera. Optionally, at step 616, a sequence of images of the subject can be captured with the camera during contraction of the pupil of the subject. At step 618, the analysis module receives as input the captured images during passage of the light scattered from the iris through the first and second optical filters. Optionally, at step 620, the analysis module can receive the images of the areas surrounding the iris and determines whether a portion of at least one of the images is monochromatic.

Optionally, at step 622, the analysis module can receive as input the images of the subject during passage of the light scattered from the iris through the second optical filter and analyzes a corneal specularity structure displayed in the images. Optionally, at step 624, the analysis module can receive as input the sequence of images of the subject during contraction of the pupil, and measures a diameter of the pupil before contraction and during contraction to determine a liveliness of the subject. At step 626, the analysis module determines whether a match exists between the iris structural information displayed in the images during passage of light scattered from the iris through the first and second optical filters. At step 628, the analysis module determines if a match between the iris structural information in the images is contraindicative of a live subject and indicative of a facsimile image, thereby discrediting the subject as a facsimile image if a match exists between the iris structural information in the images. At step 630, the analysis module determines if a lack of a match between the iris structural information in the images is contraindicative of a facsimile image and indicative of a live subject, thereby identifying the subject as a live subject if a match does not exist between the iris structural information in the images. Optionally, at step 632, the analysis module can identify the subject as a live subject if a corneal specularity of the subject matches a live subject specularity. Optionally, at step 634, the analysis module can identify the subject as a live subject if a measured diameter of the pupil before contraction and a measured diameter of the pupil during contraction are different, indicating a liveliness of the subject.

Figure 14:
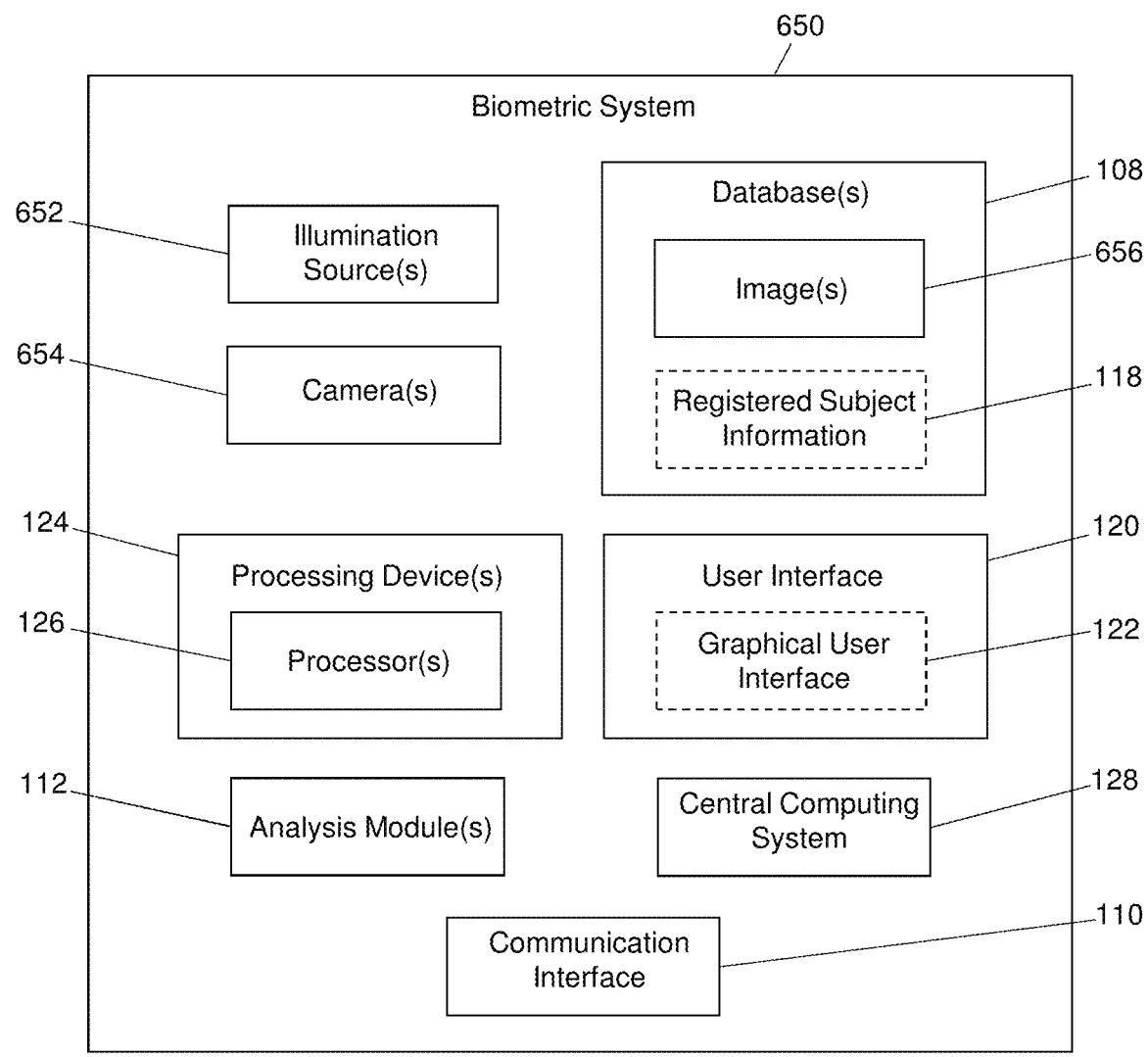
FIG. 14 is a block diagram of a sixth embodiment of an exemplary biometric analysis system in accordance with the present disclosure.

With reference to FIG. 14, a block diagram of a sixth embodiment of an exemplary biometric analysis system 650 (hereinafter "system 650") is provided. The system 650 ensures the liveness of a subject or user of an iris identification system by authenticating the specularity characteristic of the iris during illumination, thereby thwarting spoofing by a presentation attack. The system 650 includes one or more illumination sources 652 configured to illuminate the eye of the subject with near infrared light. Near infrared illumination is used to detect and display the iris texture through iris pigment which absorbs light in the visible but not the near infrared spectrum. The near infrared illumination source 652 ensures that the eye is sufficiently well illuminated for one or more cameras 654 to capture images 656 of the eye.

The near infrared illumination creates a small but strong specular reflection on the cornea. The images 656 display the specularity characteristics of the eye caused by the near infrared illumination source 652. Paper-based presentation attacks can try to mimic a specularity by printing the secularity to be captured by the system 650. However, the printed specularity is generally not as bright nor as uniform as a specularity from a real eye. The analysis module 112 analyzes the specularity in the image 656 and differentiates a specularity from a real eye from one created on a piece of paper. In particular, the analysis module 112 analyzes the brightness and/or uniformness of the specularity characteristics in the images 656 and determines the three-dimensionality and liveliness of the eye based on the detected specularity characteristics.

The system 650 does not require a response (autonomic or voluntary) from the subject. Instead, the system 650 detects that the subject possesses a three-dimensional eye with a shiny corneal surface based on the specularity characteristic of the eye. Live eyes are round and wet. When illuminated with near infrared light, live eyes produce a very bright and uniform specular reflection. The number and location of the secularities can change based on the number and location of the illumination sources 652. In a presentation attack involving a printed paper with an eye, the specularity is present in the printed eye on paper but is not created by the paper itself. The specularities in the facsimile image are typically dimmer and much less uniform than the specular reflections of authentic eyes. By analyzing the image 656 captured by the camera 654, the brightness and/or uniformness of the specularity can be measured. Based on the measured brightness and/or uniformness of the specularity, the analysis module 112 can determine whether the characteristics correspond to an authentic eye or a paper spoof.

Figure 15:
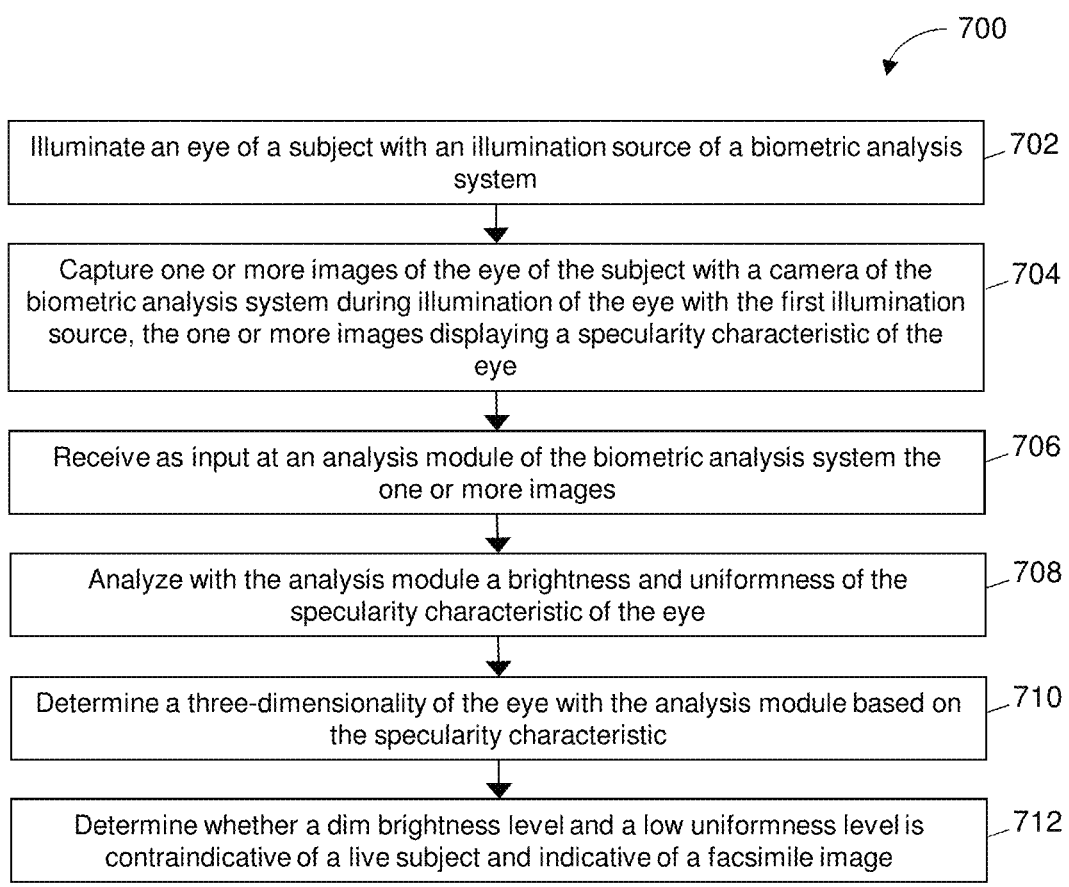
FIG. 15 is a flowchart illustrating an exemplary process of implementing the biometric analysis system of FIG. 14.

FIG. 15 is a flowchart illustrating an exemplary process 700 of implementing the system 650. To begin, at step 702, an eye of a subject is illuminated with an illumination source. At step 704, one or more images of the eye are captured with a camera during illumination of the eye with the first illumination source. The images display a specularity characteristic of the eye. At step 706, the analysis module receives as input the captured images. At step 708, the analysis module analyzes the brightness and/or uniformness of the specularity characteristic of the eye. At step 710, the analysis module determines a three-dimensionality of the eye based on the specularity characteristic. At step 712, the analysis module determines whether a dim brightness level and a low uniformness level of the specularity characteristics are contraindicative of a live subject and indicative of a facsimile image, thereby discrediting the subject as a facsimile image based on a dim brightness level and a low uniformness level of the specularity characteristics. The analysis module can determine whether bright and uniform specularity characteristics are contraindicative of a facsimile image and indicative of a live subject, thereby identifying the subject as a live subject if the specularity characteristics are bright and uniform.

Figure 16:
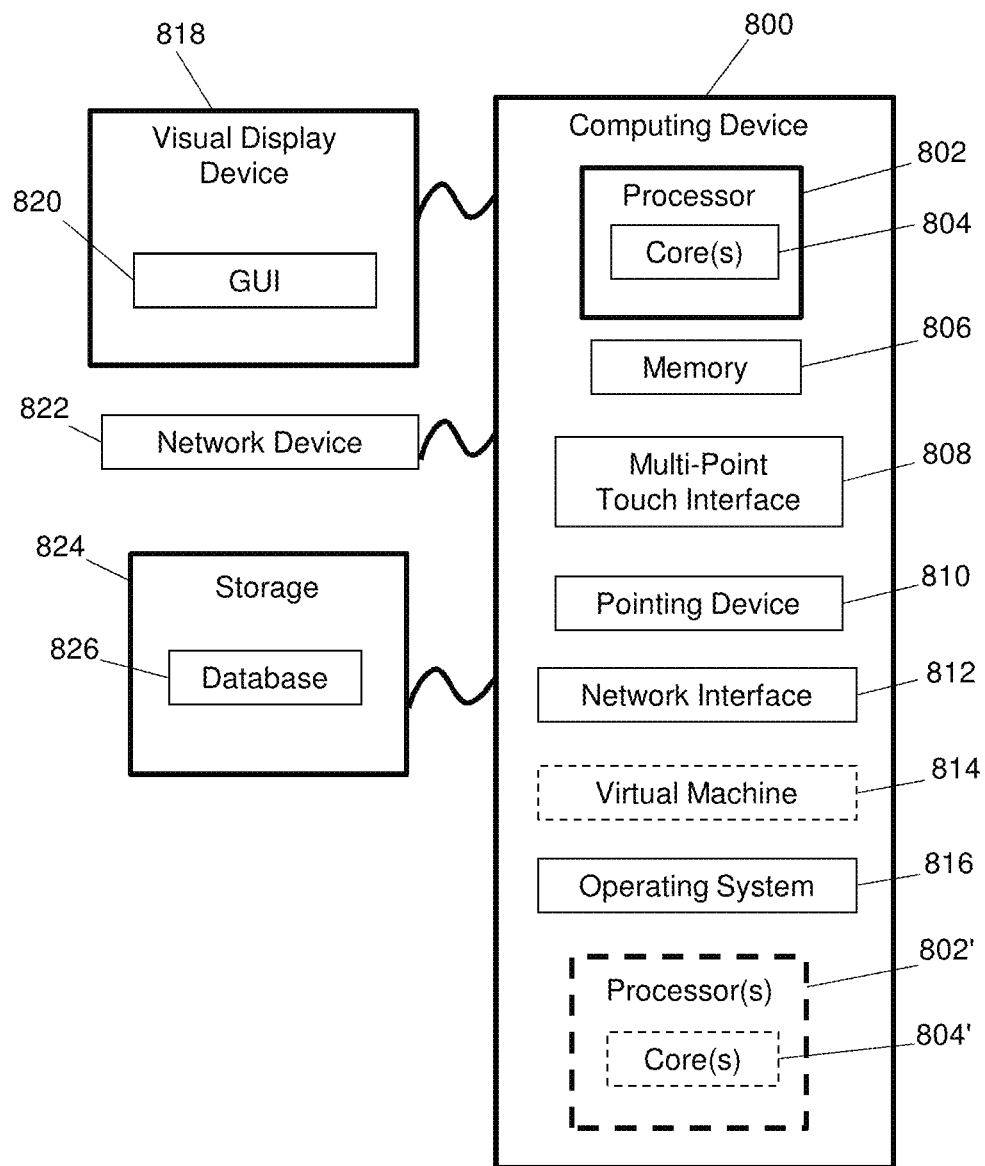
FIG. 16 is a block diagram of an exemplary computing device for implementing one or more of the exemplary biometric systems in accordance with the present disclosure.

FIG. 16 is a block diagram of a computing device 800 in accordance with exemplary embodiments of the present disclosure. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the present disclosure (e.g., instructions for operating the illumination source, instructions for operating the camera, instructions for operating the analysis module, instructions for operating the processing device, instructions for operating the user interface, instructions for operating the communication interface, instructions for operating the central computing system, instructions for operating any other components of the biometric analysis systems, combinations thereof, or the like). The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device 800 may be shared dynamically. A virtual machine 814 may be provided to handle a process running on multiple processors so that the process appears to be using only one computing resource rather than multiple computing resources. Multiple virtual machines may also be used with one processor. Memory 806 may include a computer system memory or random access memory, such as DRAM, SRAM, EDO RAM, and the like. Memory 806 may include other types of memory as well, or combinations thereof.

A user may interact with the computing device 800 through a visual display device 818 (e.g., a personal computer, a mobile smart device, or the like), such as a computer monitor, which may display one or more user interfaces 820 (e.g., a graphical user interface) that may be provided in accordance with exemplary embodiments. The computing device 800 may include other I/O devices for receiving input from a user, for example, a camera, a sensor, a keyboard or any suitable multi-point touch interface 808, a pointing device 810 (e.g., a mouse). The keyboard 808 and the pointing device 810 may be coupled to the visual display device 818. The computing device 800 may include other suitable conventional I/O peripherals.

The computing device 800 may also include one or more storage devices 824, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the biometric analysis systems described herein. Exemplary storage device 824 may also store one or more databases 826 for storing any suitable information required to implement exemplary embodiments. For example, exemplary storage device 824 can store one or more databases 826 for storing information, such as data relating to captured images, registered subject information, topographic maps, combinations thereof, or the like, and computer-readable instructions and/or software that implement exemplary embodiments described herein. The databases 826 may be updated by manually or automatically at any suitable time to add, delete, and/or update one or more items in the databases.

The computing device 800 can include a network interface 812 configured to interface via one or more network devices 822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 812 may include a built-in network adapter, network interface card, PCMCIA network card, PCI/PCIe network adapter, SD adapter, Bluetooth adapter, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 800 may run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

Figure 17:
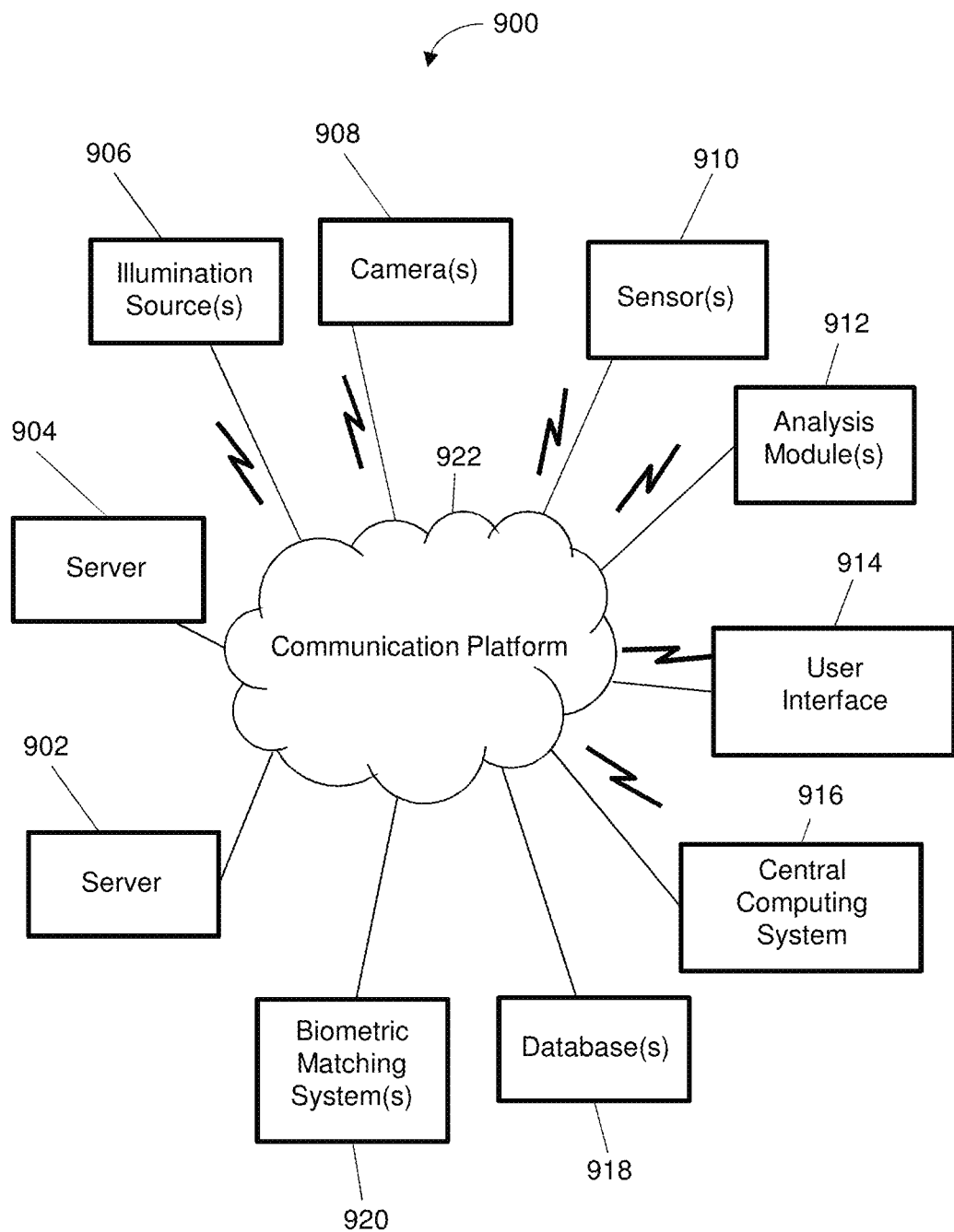
FIG. 17 is a block diagram of an exemplary biometric analysis system environment in accordance with the present disclosure.

FIG. 17 is a block diagram of an exemplary biometric analysis system environment 900 in accordance with exemplary embodiments of the present disclosure. The environment 900 can include servers 902, 904 configured to be in communication with one or more illumination sources 906, one or more cameras 908, one or more sensors 910, an analysis module 912, a user interface 914, and a central computing system 916 via a communication platform 922, which can be any network over which information can be transmitted between devices communicatively coupled to the network. For example, the communication platform 922 can be the Internet, Intranet, virtual private network (VPN), wide area network (WAN), local area network (LAN), and the like. In some embodiments, the communication platform 922 can be part of a cloud environment.

The environment 900 can include one or more biometric matching systems 920 for matching the detected scan with a registered scan, which can be in communication with the servers 902, 904, as well as the one or more illumination sources 906, one or more cameras 908, one or more sensors 910, analysis module 912, user interface 914, and central computing system 916, via the communication platform 922. The environment 900 can include repositories or databases 918, which can be in communication with the servers 902, 904, as well as the one or more illumination sources 906, one or more cameras 908, one or more sensors 910, an analysis module 912, a user interface 914, and a central computing system 916, via the communications platform 922.

In exemplary embodiments, the servers 902, 904, one or more illumination sources 906, one or more cameras 908, one or more sensors 910, analysis module 912, user interface 914, and central computing system 916 can be implemented as computing devices (e.g., computing device 800). Those skilled in the art will recognize that the database 918 can be incorporated into one or more of the servers 902, 904. In some embodiments, the database 918 can store data relating to captured images, registered subject information, topographic maps, combinations thereof, or the like. In some embodiments, data relating to captured images, registered subject information, topographic maps, combinations thereof, or the like, can be distributed over multiple databases 918.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A biometric analysis system, comprising:
   a first illumination source configured to emit a near infrared light to illuminate an iris of a subject;
   a second illumination source configured to emit a visible light to illuminate the iris of the subject;
   one or more cameras configured to capture one or more images of the subject during illumination of the subject with the first illumination source and the second illumination source, the captured one or more images of the subject during illumination of the subject with the first illumination source are monochromatic images, and the captured one or more images of the subject during illumination of the subject with the second illumination source are color images; and
   an analysis module configured to:
      (i) receive as input the one or more monochromatic images and the one or more color images,
      (ii) determine an iris texture based on the one or more monochromatic images,
      (iii) determine a color spectrum with pigmentation characteristics of the iris of the subject based on the one or more color images,
      (iv) compare the color spectrum with the pigmentation characteristics of the iris of the subject in the one or more color images to the one or more monochromatic images of the iris,
      (v) determine whether a match exists between the color spectrum with the pigmentation characteristics of at least a portion of the iris of the subject in the one or more color images and a corresponding portion in the one or more monochromatic images of the iris of the subject, and
      (vi) determine that the one or more color images are contraindicative of a live subject if the analysis module determines that the match exists.

2. The biometric analysis system of claim 1, wherein the one or more cameras are configured to simultaneously capture the one or more images of the subject during illumination of the subject with the first illumination source and the second illumination source.

3. The biometric analysis system of claim 1, wherein a determination by the analysis module that the match exists is indicative of a monochrome section in the portion of the iris of the subject in the one or more color images.

4. A method of biometric analysis, comprising:
   illuminating an iris of a subject with a near infrared light from a first illumination source of a biometric analysis system;
   illuminating the iris of the subject with a visible light emitted from a second illumination source of the biometric analysis system;
   capturing one or more images of the subject with one or more cameras of the biometric analysis system during illumination of the subject with the first illumination source and the second illumination source, the captured one or more images of the subject during illumination of the subject with the first illumination source are monochromatic images, and the captured one or more images of the subject during illumination of the subject with the second illumination source are color images;
   receiving as input at an analysis module of the biometric analysis system the one or more monochromatic images and the one or more color images;
   determining an iris texture with the analysis module of the biometric analysis system based on the one or more monochromatic images;
   determining a color spectrum with pigmentation characteristics of the iris of the subject with the analysis module of the biometric analysis system based on the one or more color images;
   comparing the color spectrum with the pigmentation characteristics of the iris of the subject in the one or more color images to the one or more monochromatic images of the iris;
   determining whether a match exists between the color spectrum with the pigmentation characteristics of at least a portion of the iris of the subject in the one or more color images and a corresponding portion in the one or more monochromatic images of the iris of the subject; and
   determining that the one or more color images are contraindicative of a live subject if the analysis module determines that the match exists.

5. The method of claim 4, comprising simultaneously capturing with the one or more cameras the one or more images of the subject during illumination of the subject with the first illumination source and the second illumination source.

6. The method of claim 5, wherein a determination by the analysis module that the match exists is indicative of a monochrome section in the portion of the iris of the subject in the one or more color images.

7. A non-transitory computer-readable medium storing instructions for biometric analysis that are executable by a processing device, wherein execution of the instructions by the processing device causes the processing device to:
   illuminate an iris of a subject with a near infrared light from a first illumination source of a biometric analysis system;
   illuminate the iris of the subject with a visible light emitted from a second illumination source of the biometric analysis system;
   capture one or more images of the subject with one or more cameras of the biometric analysis system during illumination of the subject with the first illumination source and the second illumination source, the captured one or more images of the subject during illumination of the subject with the first illumination source are monochromatic images, and the captured one or more images of the subject during illumination of the subject with the second illumination source are color images;
   receive as input at an analysis module of the biometric analysis system the one or more monochromatic images and the one or more color images;

determine an iris texture with the analysis module of the biometric analysis system based on the one or more monochromatic images;

determine a color spectrum with pigmentation characteristics of the iris of the subject with the analysis module of the biometric analysis system based on the one or more color images;

compare the color spectrum with the pigmentation characteristics of the iris of the subject in the one or more color images to the one or more monochromatic images of the iris;

determine whether a match exists between the color spectrum with the pigmentation characteristics of at least a portion of the iris of the subject in the one or more color images and a corresponding portion in the one or more monochromatic images of the iris of the subject; and determine that the one or more color images are contraindicative of a live subject if the analysis module determines that the match exists.

8. The biometric analysis system of claim 1, wherein the one or more cameras comprise a single camera configured to capture the one or more images of the subject during both illumination of the subject with the first illumination source and the second illumination source.

9. The biometric analysis system of claim 1, wherein the one or more cameras comprise a first camera configured to capture the one or more images of the subject during illumination of the subject with the first illumination source, and the one or more cameras comprise a second camera configured to capture the one or more images of the subject during illumination of the subject with the second illumination source.

10. The biometric analysis system of claim 1, wherein if the analysis module detects a monochromatic iris structure in the one or more monochromatic images, and detects the iris in the one or more color images to be entirely a color structure, the analysis module determines that the one or more color images of the subject are indicative of the live subject.

11. The biometric analysis system of claim 1, wherein the analysis module is configured to segment and generate templates for the one or more images in each spectral band.

12. The biometric analysis system of claim 11, wherein the analysis module is configured to perform a comparison analysis between the captured one or more images and the templates during authentication of the subject.

13. The method of claim 4, wherein the one or more cameras comprise a single camera, and the method comprises capturing the one or more images of the subject during both illumination of the subject with the first illumination source and the second illumination source with the single camera.

14. The method of claim 4, wherein the one or more cameras comprise a first camera and a second camera, and the method comprises capturing the one or more images of the subject during illumination of the subject with the first illumination source with the first camera, and capturing the one or more images of the subject during illumination of the subject with the second illumination source with the second camera.

15. The method of claim 4, comprising:
detecting with the analysis module a monochromatic iris structure in the one or more monochromatic images of the subject;
detecting with the analysis module that the iris in the one or more color images is entirely a color structure; and
determining with the analysis module that the one or more color images of the subject are indicative of the live subject.

16. The method of claim 4, comprising segmenting and generating templates with the analysis module for the one or more images in each spectral band.

17. The method of claim 16, comprising performing a comparison analysis with the analysis module between the captured one or more images and the templates during authentication of the subject.

* * * * *